United States Patent
Hankinson

(10) Patent No.: US 11,442,789 B2
(45) Date of Patent: Sep. 13, 2022

(54) METHOD AND SYSTEM FOR SECURE DISTRIBUTED SOFTWARE-SERVICE

(71) Applicant: AFFINIO INC., Halifax (CA)

(72) Inventor: Stephen James Frederic Hankinson, Hammonds Plains (CA)

(73) Assignee: AFFINIO INC., Halifax (CA)

( * ) Notice: Subject to any disclaimer, the term of this patent is extended or adjusted under 35 U.S.C. 154(b) by 0 days.

(21) Appl. No.: 17/470,308

(22) Filed: Sep. 9, 2021

(65) Prior Publication Data

US 2022/0019480 A1 Jan. 20, 2022

Related U.S. Application Data

(63) Continuation of application No. 17/243,512, filed on Apr. 28, 2021.

(60) Provisional application No. 63/051,591, filed on Jul. 14, 2020.

(51) Int. Cl.
*G06F 9/50* (2006.01)
*G06F 9/48* (2006.01)
*G06F 21/62* (2013.01)
*G06F 21/60* (2013.01)
*G06F 21/44* (2013.01)

(52) U.S. Cl.
CPC .......... *G06F 9/5072* (2013.01); *G06F 9/4881* (2013.01); *G06F 21/44* (2013.01); *G06F 21/602* (2013.01); *G06F 21/6218* (2013.01); *G06F 2221/2143* (2013.01)

(58) Field of Classification Search
CPC .... G06F 21/602; G06F 21/6218; G06F 21/44; G06F 2221/2143; G06F 9/5072; G06F 9/4881

USPC ............................................................ 726/26
See application file for complete search history.

(56) References Cited

U.S. PATENT DOCUMENTS 9,071,606 B2 * 6/2015 Braun ..................... H04L 63/10
10,642,856 B1 5/2020 Chu et al.
(Continued)

FOREIGN PATENT DOCUMENTS

CN 103246521 A 8/2013

OTHER PUBLICATIONS

NPL Search Terms (Year: 2021).*
(Continued)

*Primary Examiner* — Syed A Zaidi
(74) *Attorney, Agent, or Firm* — Maier & Maier, PLLC

(57) ABSTRACT

A method and a system for securely applying proprietary software functions of software sources to proprietary data of a population of users are disclosed. The proprietary data of a user is not exposed to software sources, and the proprietary software of a software source is not accessible to users. A collaboration software module, placed in at least one cloud, is configured to establish, and continually update, a data structure holding task permissions from grantors to grantees, a grantor being a software source or a user, and a grantee is also a software source or a user. The collaboration software module of a cloud applies software function of a software source, communicatively coupled to the cloud, to proprietary data of an originating user, communicatively coupled to the same cloud, to produce a requisite result which is only accessible to the originating user or any grantees of the originating user (the grantor).

20 Claims, 52 Drawing Sheets

(56) References Cited

U.S. PATENT DOCUMENTS

| | | | | |
|---|---|---|---|---|
| 2010/0146291 | A1* | 6/2010 | Anbuselvan | H04L 63/08 713/189 |
| 2013/0007094 | A1 | 1/2013 | Knox et al. | |
| 2013/0191650 | A1 | 7/2013 | Balakrishnan et al. | |
| 2014/0101310 | A1* | 4/2014 | Savage | H04L 43/00 709/224 |
| 2014/0123300 | A1* | 5/2014 | Jung | G06F 21/44 726/26 |
| 2015/0007274 | A1* | 1/2015 | Chang | H04L 63/0815 726/4 |
| 2015/0074409 | A1* | 3/2015 | Reid | G16H 10/60 713/171 |
| 2016/0277374 | A1* | 9/2016 | Reid | H04L 63/0435 |

OTHER PUBLICATIONS

Juve, Gideon, and Ewa Deelman. "Automating application deployment in infrastructure clouds." 2011 IEEE Third International Conference on Cloud Computing Technology and Science. IEEE, 2011. (Year: 2011).*

Jenkin, Michael, and Patrick Dymond. "A plugin-based privacy scheme for world-wide web file distribution." Proceedings of the Thirty-First Hawaii International Conference on System Sciences. vol. 7. IEEE, 1998. (Year: 1998).*

Bugiel, Sven, et al. "Twin clouds: An architecture for secure cloud computing." Workshop on cryptography and security in clouds (WCSC 2011). vol. 1217889. 2011. (Year: 2011).*

International Search Report dated Oct. 14, 2021, in connection with corresponding International application No. PCT/IB2021/056371; 3 pages.

Written Opinion of the International Searching Authority dated Oct. 14, 2021, in connection with corresponding International application No. PCT/IB2021/056371; 5 pages.

Justin Langseth, "Secure Joins: How to Join Data Between Companies While Respecting PII", Snowflake Inc., Inside the Data Cloud, Apr. 23, 2019, 8 pages.

* cited by examiner

*FIG. 11*

2200
Estimating requisite sample size

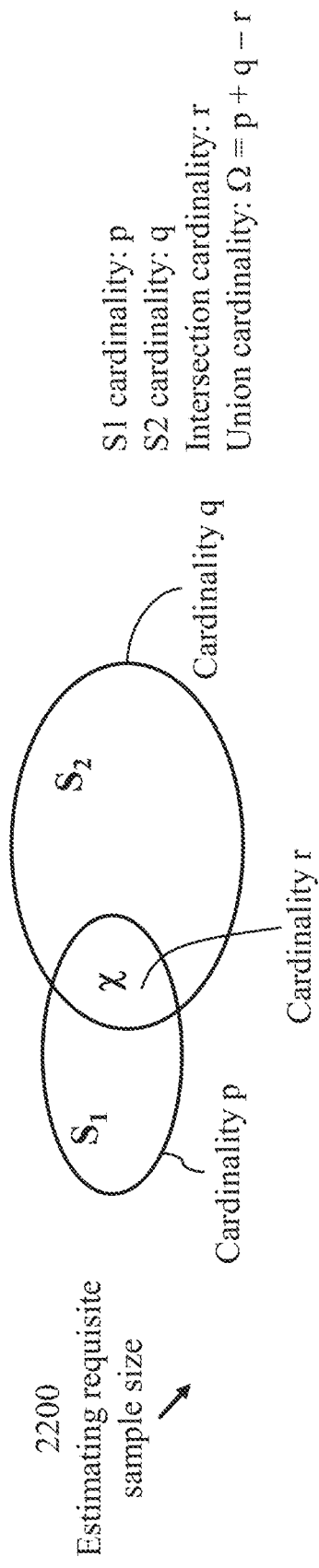

Cardinality q
Cardinality r
Cardinality p

S1 cardinality: p
S2 cardinality: q
Intersection cardinality: r
Union cardinality: $\Omega = p + q - r$ Intersection cardinality: r   Union cardinality: $\Omega = (p + q - r)$ Probability of picking one object not belonging to both sets: $\pi_1 = (1 - r/\Omega)$ Probability of picking two objects not belonging to both sets: $\pi_2 = \pi_1 \times (1 - r/(\Omega-1))$ Probability of picking k objects not belonging to both sets: $\pi_k = \prod_{j=1}^{j=k} (1 - r/(\Omega-j+1))$ If $k = (\Omega-r+1)$, then $(\Omega-k+1) = r$ and $\pi_k = 0.0$.

For example with p = 6, q = 8, r = 4, $\Omega$ = 10, the number of objects outside the intersection is 6. If k = $\Omega$−r+1, i.e., k = 7, $\pi_7 = 0.0$.

$$\pi^*_k = \prod_{j=1}^{j=k} (1 - r/\Omega) = (1 - r/\Omega)^k > \pi_k$$

FIG. 22

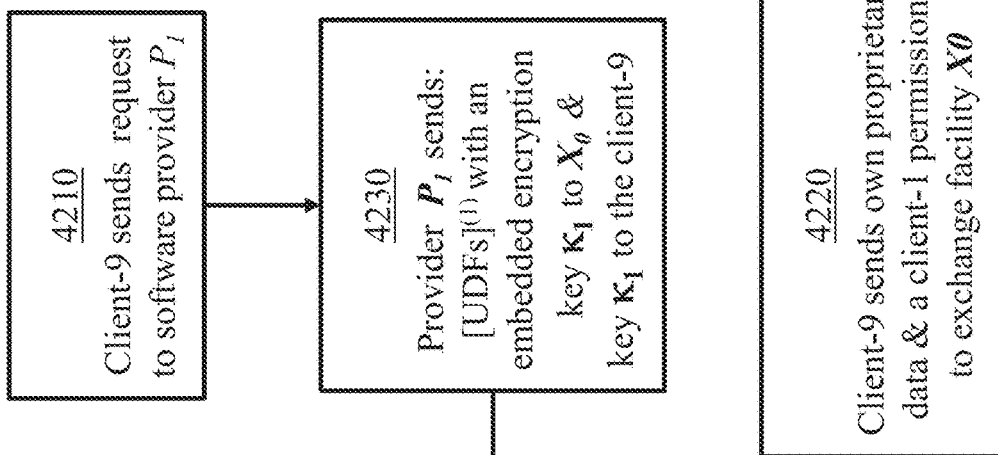
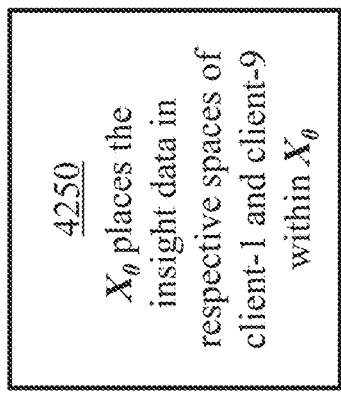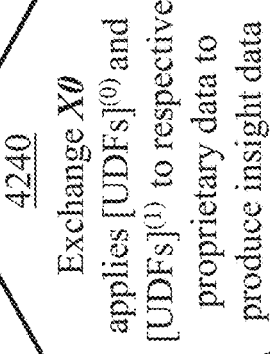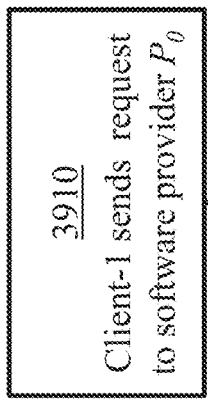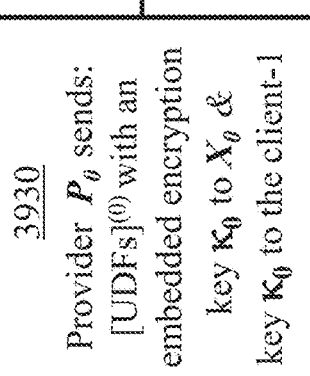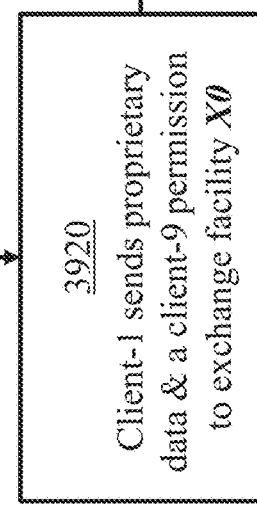
FIG. 42

4400
Transaction-control Table

| From ↓ \ To → | Provider | Client $C_0$ | Client $C_1$ | ••• | Client $C_{k-2}$ | Client $C_{k-1}$ |
|---|---|---|---|---|---|---|
| Provider | ▨ | Permission Vector-B | | | | |
| Client $C_1$ | Permission Vector-A | ▨ | Permission Vector-C | | | Permission Vector-E |
| Client $C_2$ | | | ▨ | | Permission Vector-D | |
| ••• | | | | | | |
| Client $C_{k-1}$ | | | | | ▨ | |
| Client $C_k$ | | | | | | ▨ |

METHOD AND SYSTEM FOR SECURE DISTRIBUTED SOFTWARE-SERVICE

CROSS-REFERENCE TO RELATED APPLICATIONS

The present application is a continuation of U.S. application Ser. No. 17/243,512 entitled "Method and System for Secure Distributed Software-Service", filed Apr. 28, 2021, which claims the benefit of U.S. Provisional Application No. 63/051,591 entitled "Swift Insight-Engine Processing Massive Data", filed Jul. 14, 2020, the entire content of which is incorporated herein by reference.

FIELD OF THE INVENTION

The invention relates to secure application of software functions acquired from software sources to proprietary data of a population of users. In particular, the invention is directed to a method and system for concealing proprietary data and proprietary software while applying the proprietary software to the proprietary data.

BACKGROUND

It is a common practice to apply software functions of a software source to propriety data of a user where the user imports software modules into the user's site from the software source to be applied securely at the user's processing facility. However, in some instants, the user may not possess requisite processing resources.

It is also a common practice to apply software functions of a software source to propriety data of a user where the user securely sends the proprietary data to the software source and the software source applies appropriate functions to the data and securely sends a result to the user. However, the user may not wish to expose the proprietary data, or the result, to the software source.

There is a need, therefore, to explore methods of applying proprietary software functions of software sources to proprietary data of users (clients of the software sources) without exposing the proprietary software, the proprietary data, or a result of application of the proprietary software to the proprietary data to an unauthorized party.

SUMMARY

The invention relates to a system of distributed application of software functions of a plurality of software providers to proprietary data of a plurality of clients. The system employs computing resources of a number of clouds. Each client is able to establish a secure two-way connection to any other client, to any software provider, or to any cloud. Likewise, each provider is able to establish a two-way secure connection to any cloud. The security issue addressed in the present invention relates to the need to conceal sensitive information while enabling processing such information.

In accordance with an aspect, the invention provides a method of secure software activation. The method comprises interaction of a plurality of clients with a software provider through a cloud. A first client, of the plurality of clients, sends a request to perform a task to the software provider and raw data to the cloud. The software provider maintains a library of user defined functions (UDFs). The cloud hosts a collaboration software module.

Upon receiving the request, the software provider identifies a set of UDFs of the library of UDFs applicable to performing the task. The software provider further embeds an encryption key into the set of UDFs to produce a set of secure UDFs then sends the secure UDFs and an identifier of the first client, referenced as a first identifier, to the cloud. The collaboration software module residing in the cloud causes a processor of the cloud to apply the set of UDFs to the raw data, subject to a determination that the first identifier matches a cloud's known identifier of the first client, and to place a result of applying the UDFs in a memory space of the cloud. The first client is permitted to accesses the result based on the first identifier.

The Secure UDFs are comparable to regular functions built into a typical database, or API. Users have the ability to call the functions from within a cloud APIs or database queries, but the source code behind those functions is not exposed. The software may be a "plugin" from a third party.

To grant a second client, of the plurality of clients, access to the result at the cloud, the first client may send an identifier, herein referenced as a second identifier, of the second client to the cloud. Upon receiving the second identifier at the cloud, the collaboration software module causes the processor to permit the second client to access the result subject to a determination that the second identifier matches an identifier, of the second client, known to the cloud. The second client may further process the result using the cloud's resources.

Alternatively, as a stricter security measure, the software provider sends the encryption key to the first client which, in turn, sends the received encryption key to a second client.

Additionally, the first client sends the second identifier to the cloud. Subsequently, the collaboration software module causes the processor to permit the second client's access to the result based on both the encryption key and a match of the second identifier to a cloud's known identifier of the second client.

To facilitate tracking and control of numerous software activations at the cloud, the collaboration software module causes the processor to establish a security-control data structure of task permissions. Preferably, each task permission is structured as a tuple:

{request index, grantor identifier, grantee identifier, permission list}, the grantor being any client of the cloud and the grantee being any other client of the cloud.

The permission list specifies at least one permissible action. The grantor assigns the request index. Preferably, the request index is a recycled integer within a specified range for ease of tracking.

The permission list may comprise itemized permissions of numerous actions such as UDF activation, UDF copying, access to raw data, modification of raw data, access to result, insertion of new data, and task expiry (hence removal of task data from the security-control data structure).

The method further comprises processes of any client, of the plurality of clients: (1) placing a specific set of UDFs into the cloud; (2) placing, in the security-control data structure, a specific task permission naming any other client, of the plurality of clients, as a grantee, and (3) prompting the collaboration software module to apply the specific set of UDFs to proprietary data of the named client without exposing the specific set of UDFs to the named client.

The method further comprises any client, of the plurality of clients: (a) placing a specific data file and a specific set of UDFs into the cloud; (b) placing a specific task permission in the security-control data structure naming any other client, of the plurality of clients, as a grantee; and (c)

prompting the collaboration software module to apply the set of UDFs to combined data of the data file and proprietary data of the named client to produce a respective result, and permit the named client to access said respective result.

The method further comprises placing the collaboration software module into each cloud of a set of designated clouds. The first client may then instruct the software provider to direct the secure UDFs to a specific cloud of the set of designated clouds. Each client of the plurality of clients is communicatively coupled to at least one cloud of the set of designated clouds.

In accordance with another aspect, the invention provides a network, for secure sharing of software applications among a plurality of clients. The network comprises a cloud hosting a collaboration software module and a software provider maintaining a library of user-defined functions (UDFs).

The software provider is configured to receive a request to perform a task from a first client, identify a set of UDFs applicable to the task, embed an encryption key into the set of UDFs to produce a set of secure UDFs, and send the secure UDFs and a first identifier of the first client to the cloud;

The collaboration software module is configured to cause a processor of the cloud to apply the set of UDFs to raw data of the first client, which is placed in the cloud, to produce requisite information subject to a determination that the first identifier matches a cloud's known identifier of the first client. The requisite information is placed in a memory space of the cloud. The first client is permitted to access the requisite information based on the first identifier.

The collaboration software module is further configured to cause the processor to receive from the first client a second identifier of a second client (list 4960, FIG. 49) and to permit the second client to access the requisite information subject to a determination that the second identifier matches a cloud's known identifier of the second client (processes 4981, 4982).

The collaboration software module is further configured to cause the processor to: receive from the first client a second identifier of a second client, of the plurality of clients; receive from the second client the encryption key; and permit the second client to access the requisite information based on the encryption key and a match of the second identifier to a cloud's known identifier of the second client.

The network further comprises a security-control data structure holding task permissions placed in a memory space of the cloud, each task permission being a tuple:

{request index, grantor identifier, grantee identifier, permission list}, where the grantor is any client of the cloud, the grantee is any other client of the cloud, the grantor assigns the request index, and the permission list specifies at least one permissible action. The request index is preferably a recycled integer within a specified range.

The collaboration software module is configured to receive from a client a specific task permission naming another client, of the plurality of clients, as a grantee. The collaboration software module then causes a processor to apply a proprietary set of UDFs of the client, which is placed into the cloud, to proprietary data of the other client without exposing the specific set of UDFs to the other client.

The collaboration software module is also configured to receive from a client a specific data file and a specific task permission naming another client, of the plurality of clients, as a grantee with permissions to: apply the set of UDFs to the data file as well as proprietary data of the other client, which is placed into the cloud, to produce a respective result; and permit the other client to access the respective result.

In accordance with a further aspect, the invention provides a network for secure sharing of software applications among a plurality of clients. The network comprises a plurality of clouds. each hosting a collaboration software module, and a plurality of software providers, each software provider maintaining a respective library of user-defined functions (UDFs).

Each software provider is configured to:
  (a) receive from a specific client, of the plurality of clients, a request to perform a task and an identifier of a specific cloud for placing a result of the task;
  (b) identify a set of UDFs applicable to the task; and
  (c) send the UDFs and an identifier of the specific client to the specific cloud;

The collaboration software module of the specific cloud is configured to cause a processor to:
  (A) apply the set of UDFs to raw data of the specific client placed in the specific cloud to produce requisite information subject to a determination that the identifier matches an identifier of the specific client known to the specific cloud;
  (B) place the requisite information in a memory space of the specific cloud; and
  (C) permit the specific client to access the requisite information based on the identifier.

The collaboration software module of the specific cloud is further configured to cause the processor to enable clients, other than the specific client, to access the requisite information subject to permissions received at the specific cloud from the specific client.

Thus, the invention provides a method and a system for enabling a user of software services of a provider to analyze proprietary data and gain specific insights using software modules of the provider without exposing the proprietary data to the provider. The system further enables the user to share the specific insights with other users.

Instead of requiring that the user share proprietary data with the provider to analyze and gain insight, the provider securely shares software with the user at an exchange facility so that the user can get insights without the provider accessing the data or even being aware of the use of the software. The user is further able to share insights gained from analysis of respective proprietary data to other parties privately and securely where only aggregate information is made accessible to the other parties. The proprietary data of a user need not be disclosed to any other user.

The system is based on employing an exchange facility configured to enable the software-service provider to write UDFs to be executed at the exchange facility and enable a user to gain and share insights based on the user's proprietary data without disclosing any part of the proprietary data.

BRIEF DESCRIPTION OF THE DRAWINGS

Embodiments of the present invention will be further described with reference to the accompanying exemplary drawings, in which:

FIG. 11 illustrates a scheme of random shuffling and identifier translation of the plurality of objects, for use in an embodiment of the present invention;

coarse filtering and fine filtering of key-specific sets of objects

Figure 1:
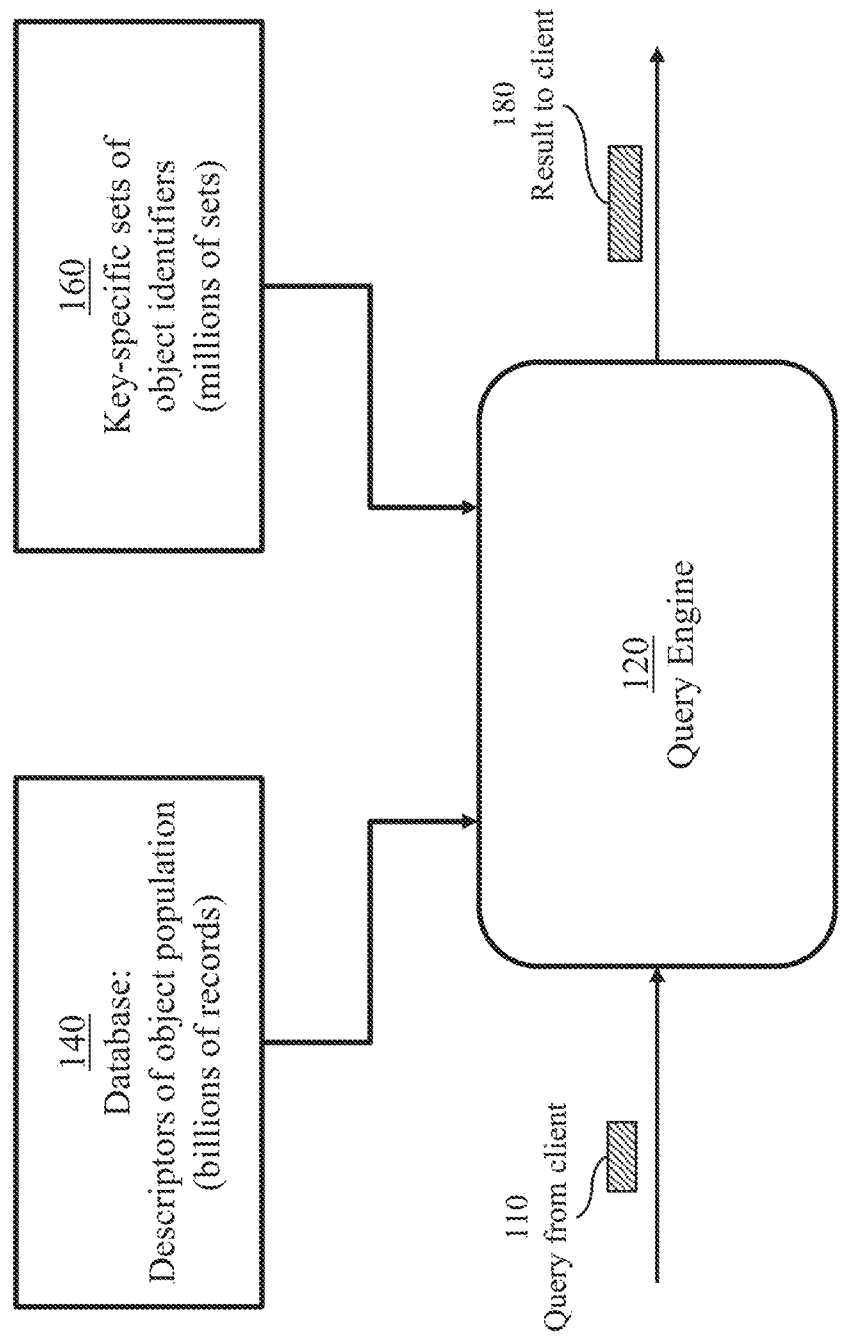
FIG. 1 is an overview of a query-processing system, in accordance with an embodiment of the present invention.
Figure 7:
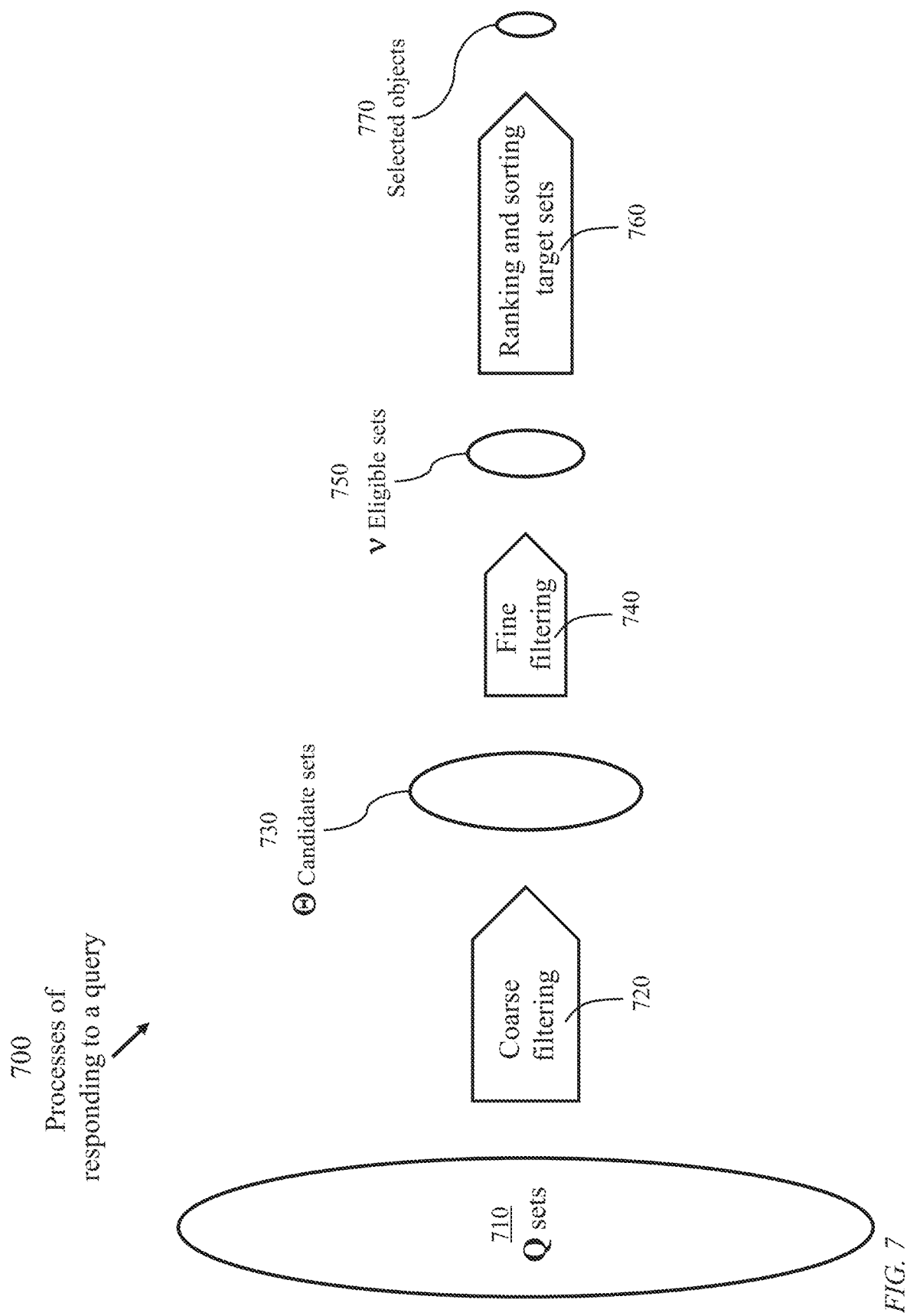
FIG. 7 illustrates processes of generating a response to a specific query, including a process of coarse filtering and fine filtering of key-specific sets of objects, in accordance with an embodiment of the present invention.
Figure 21:
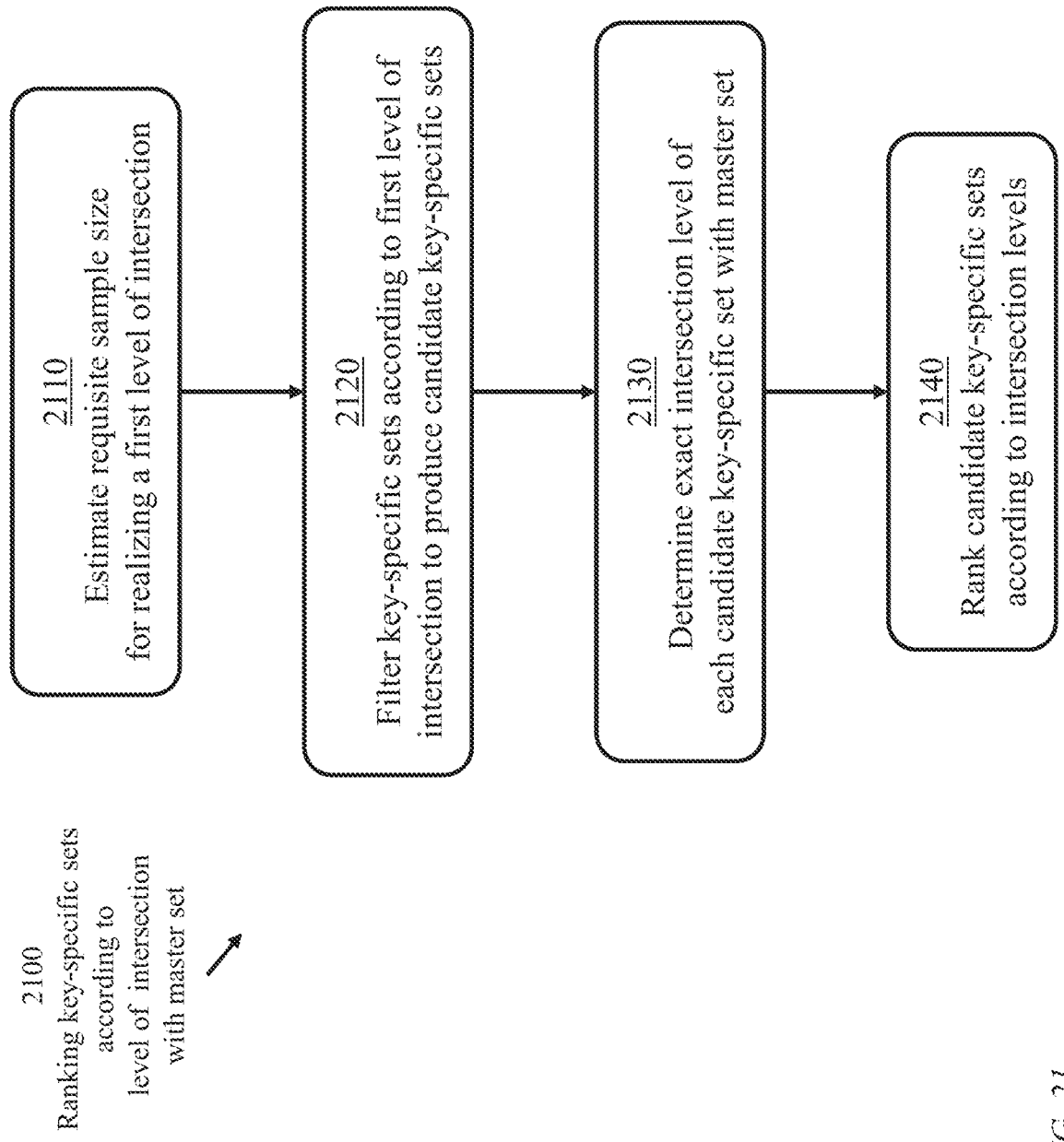
Figure 23:
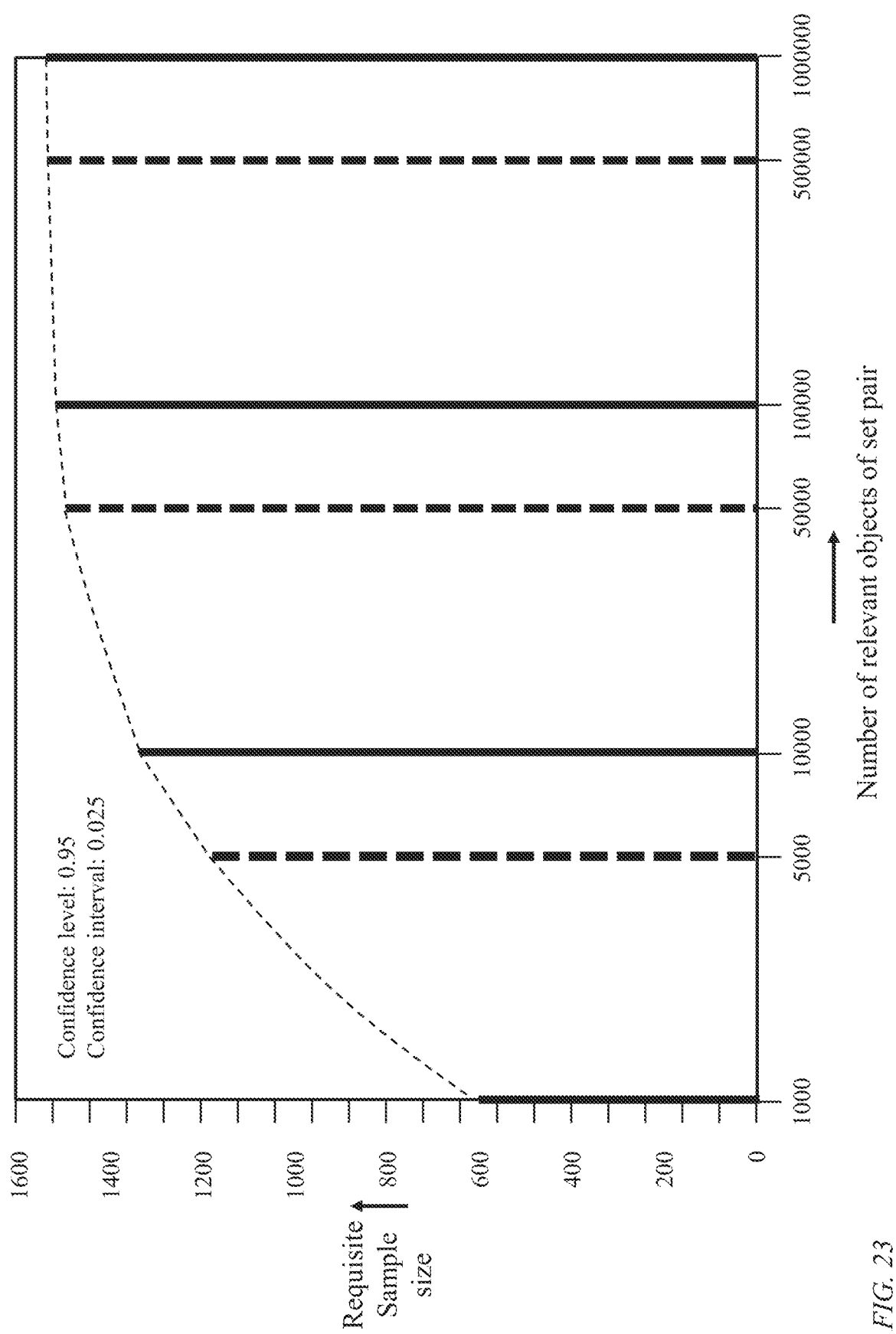
Figure 24:
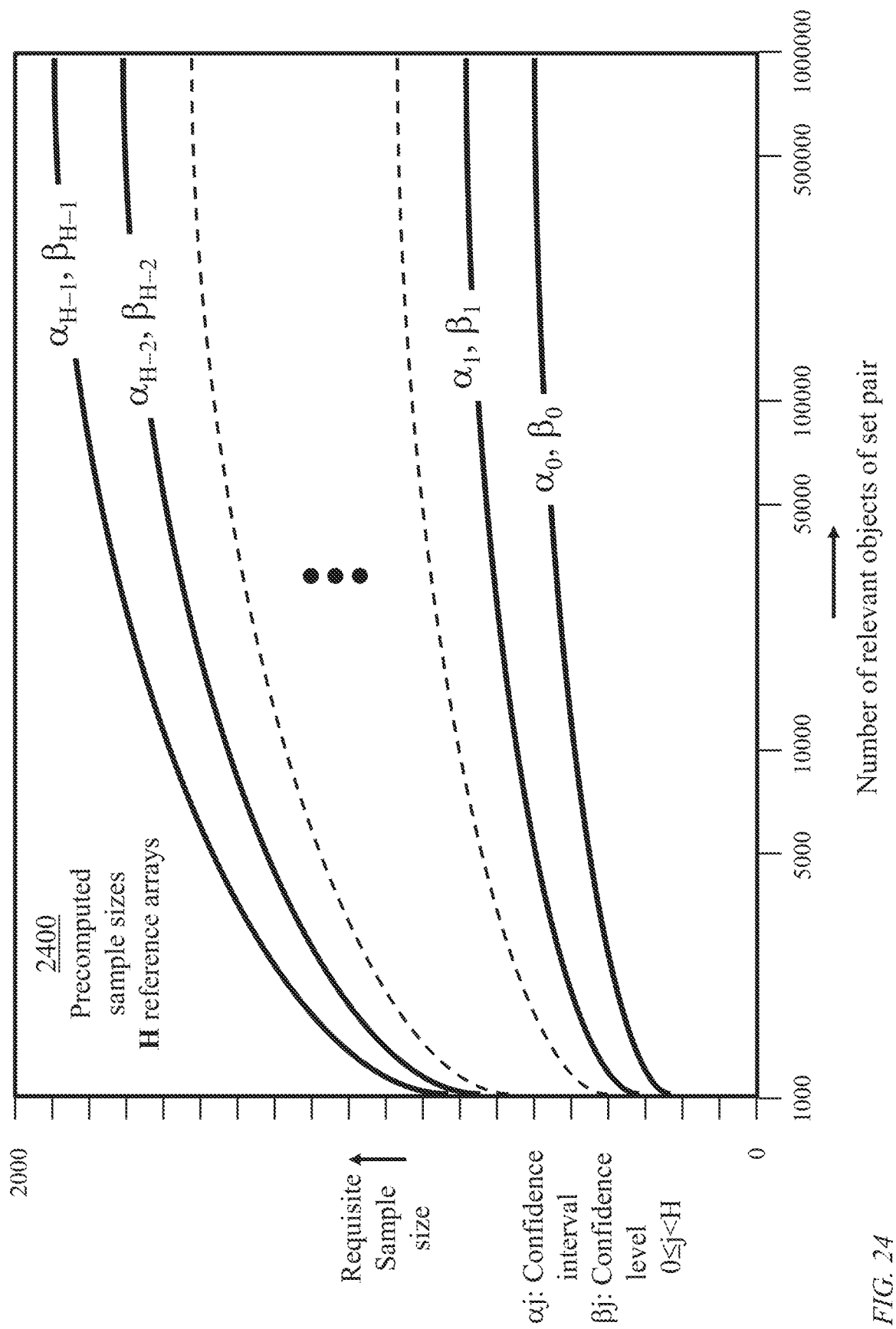
Figure 25:
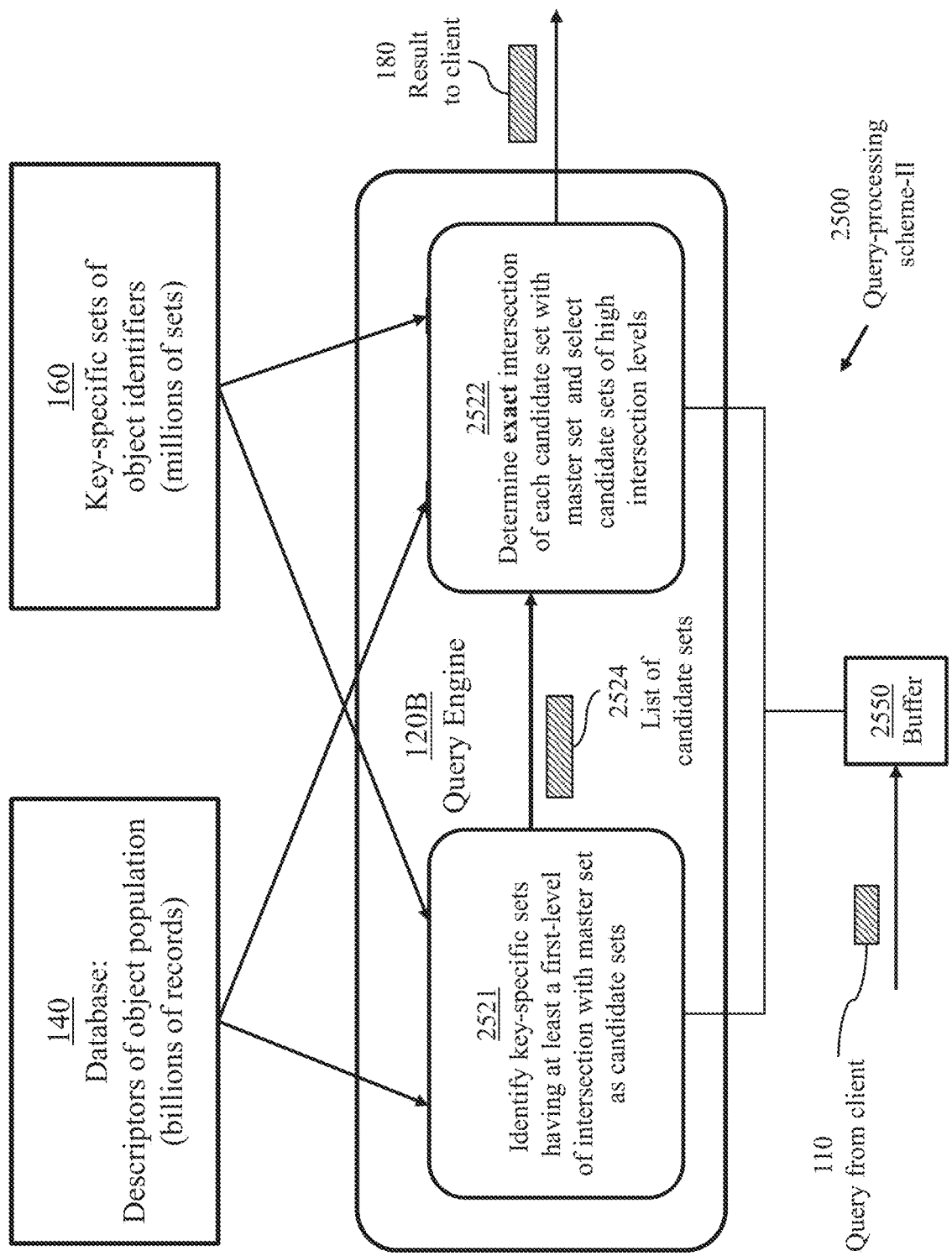
Figure 26:
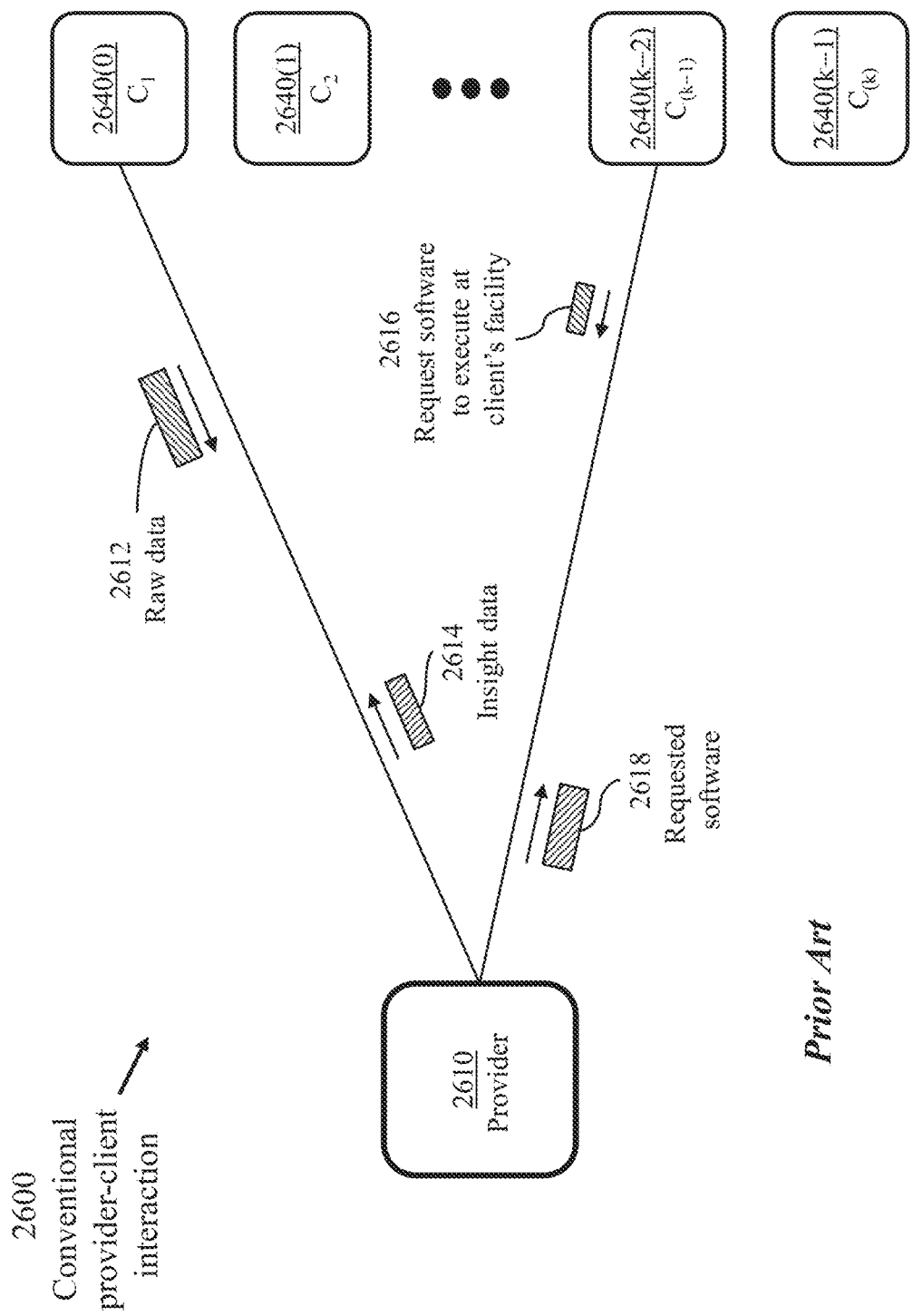
Figure 27:
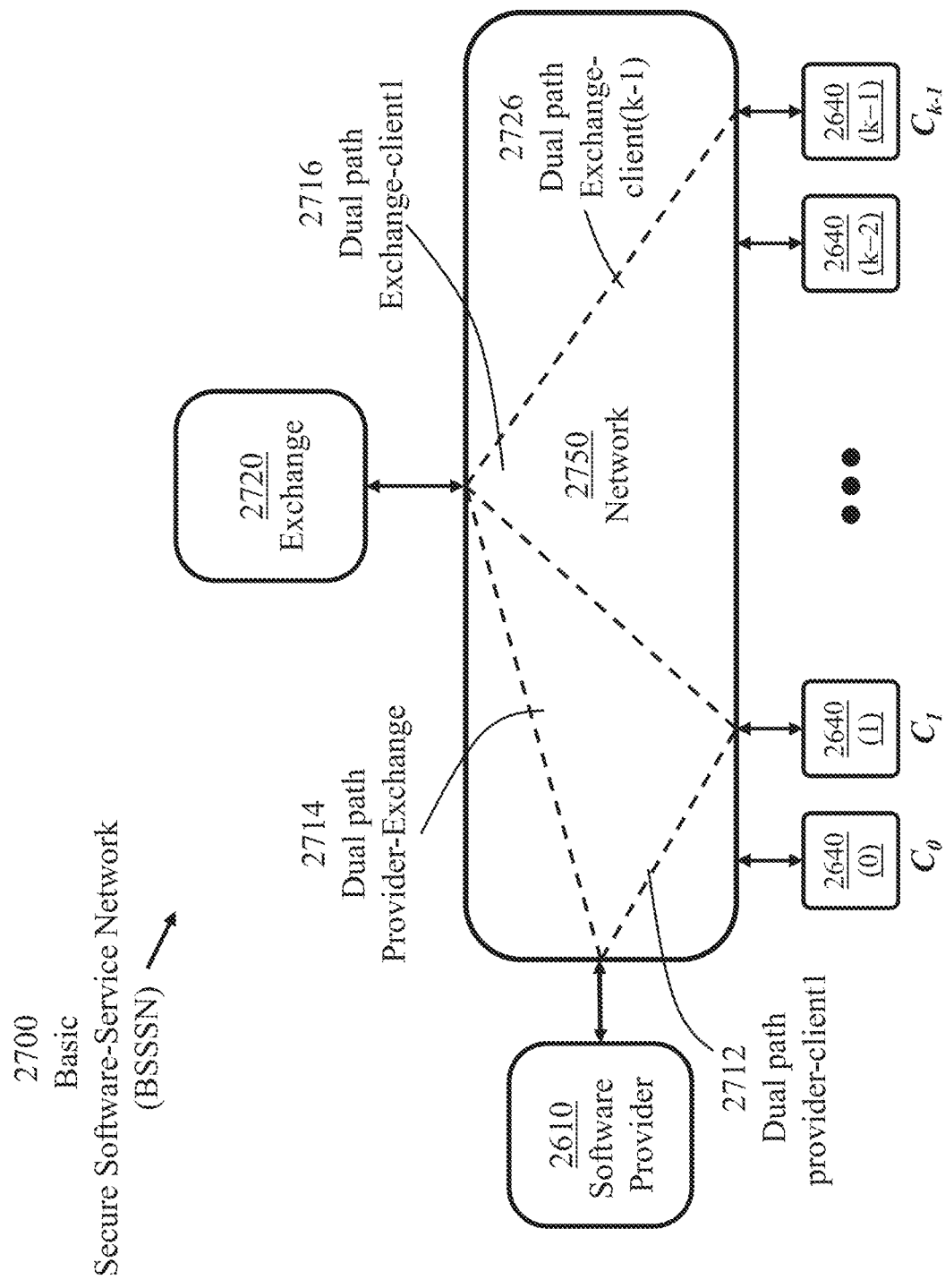
Figure 28:
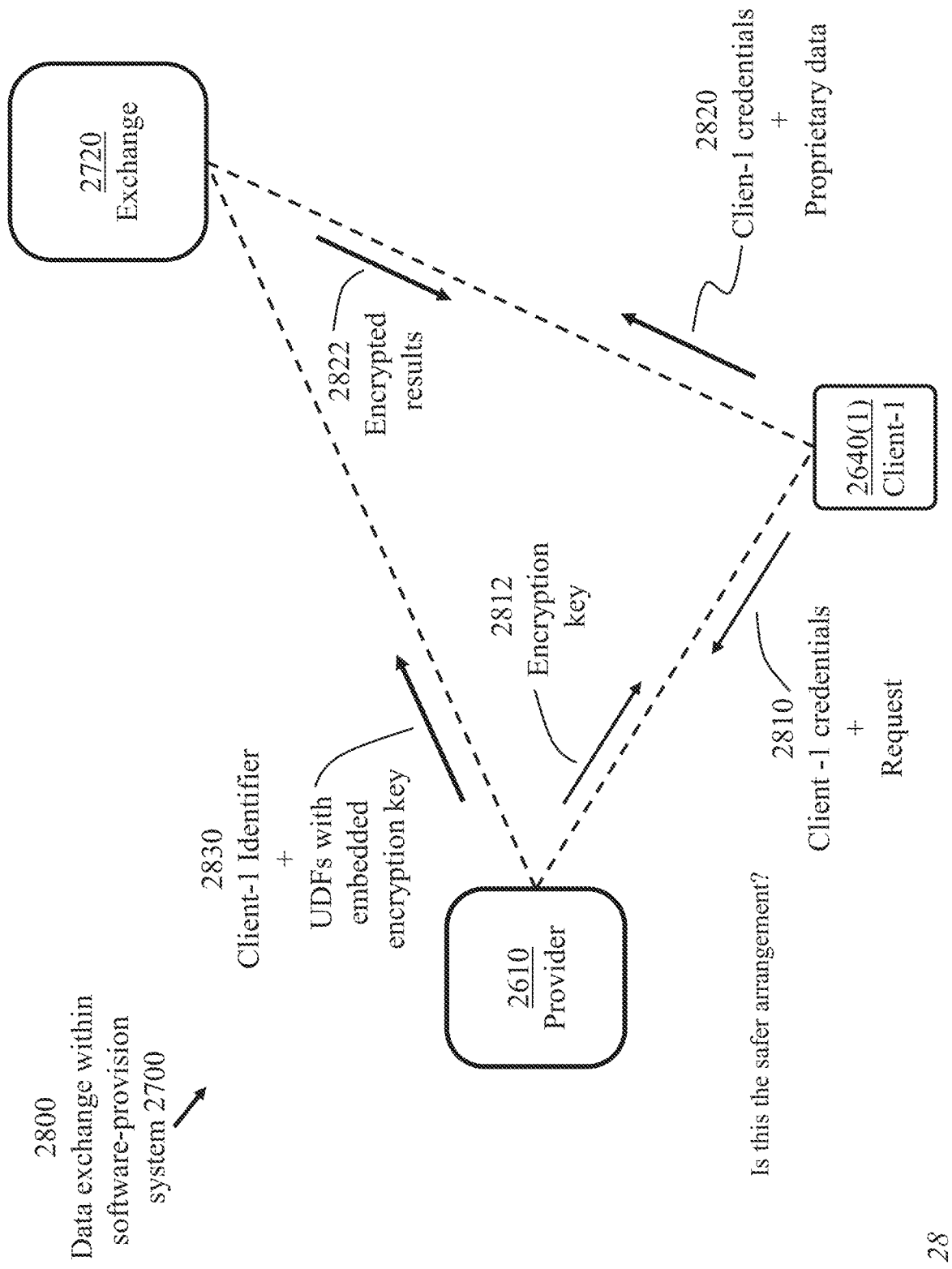
Figure 29:
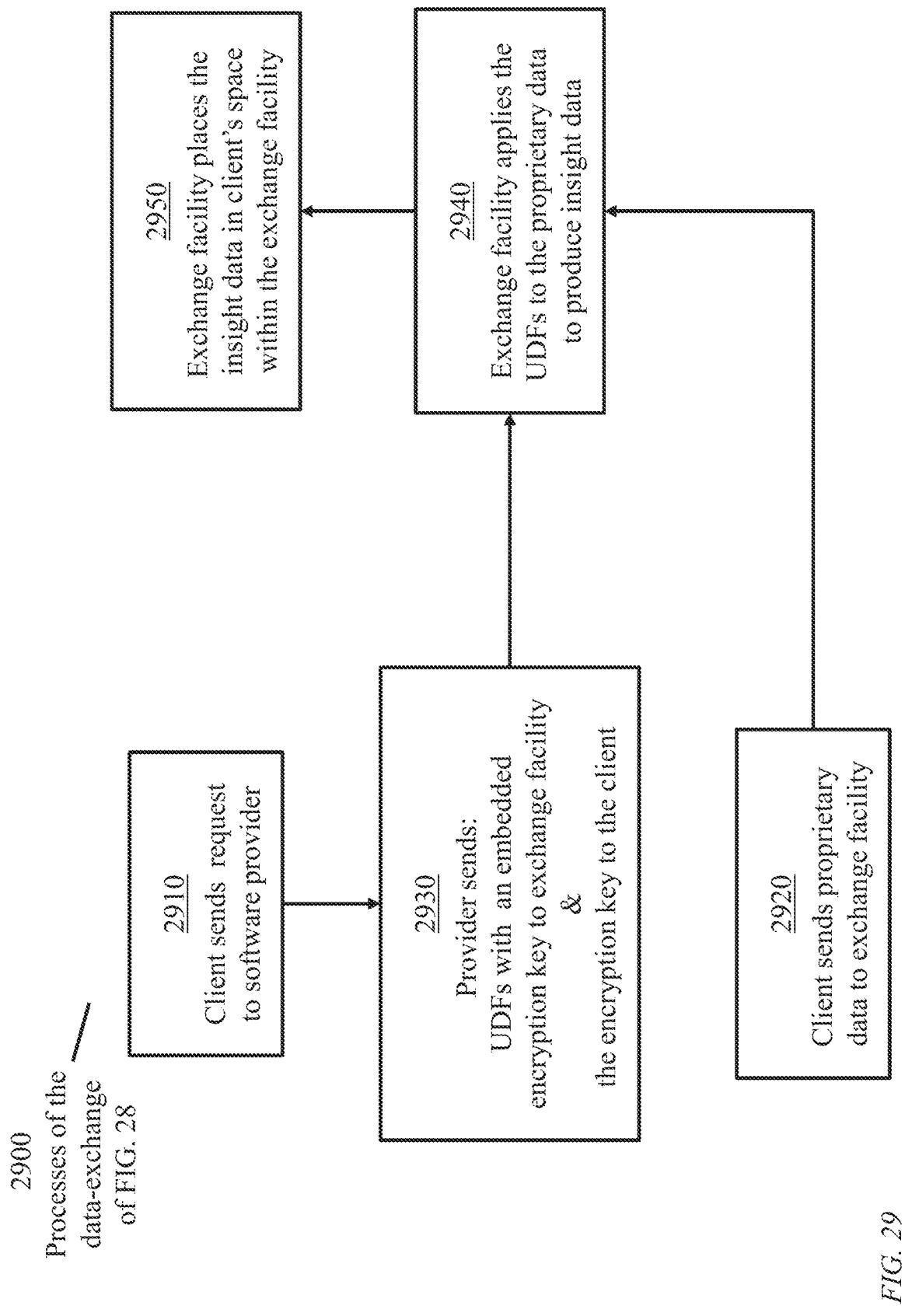
Figure 30:
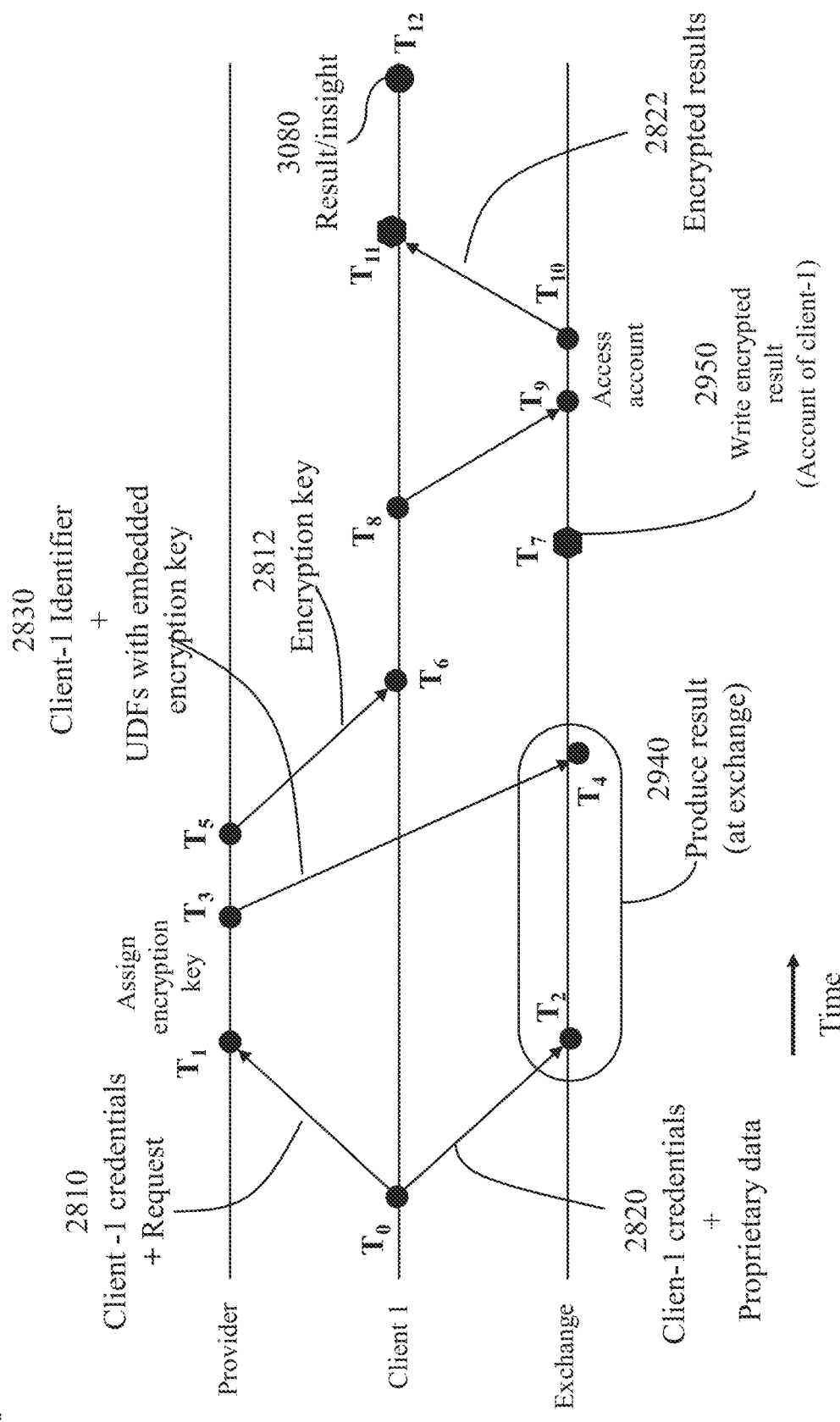
Figure 31:
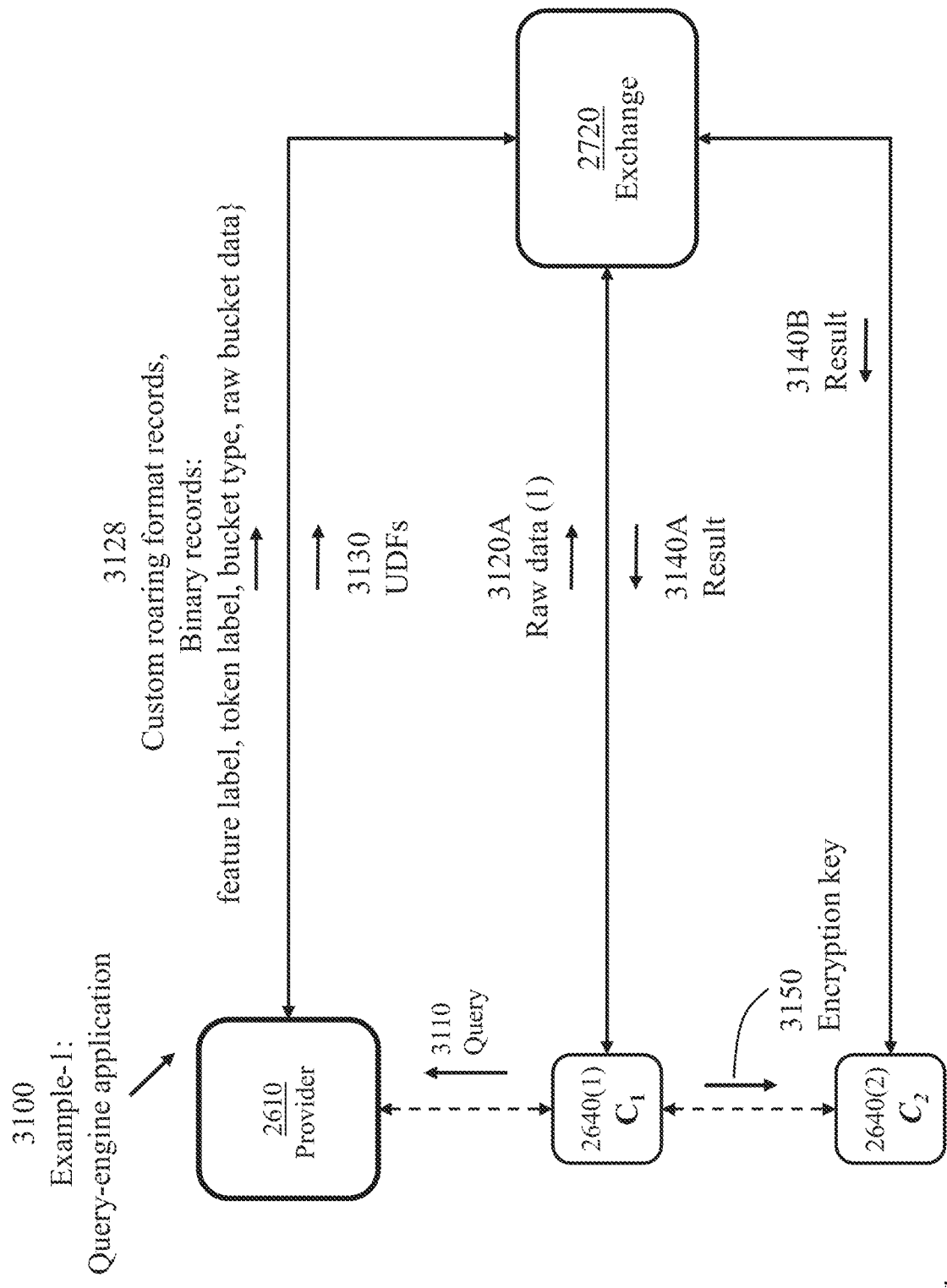
Figure 32:
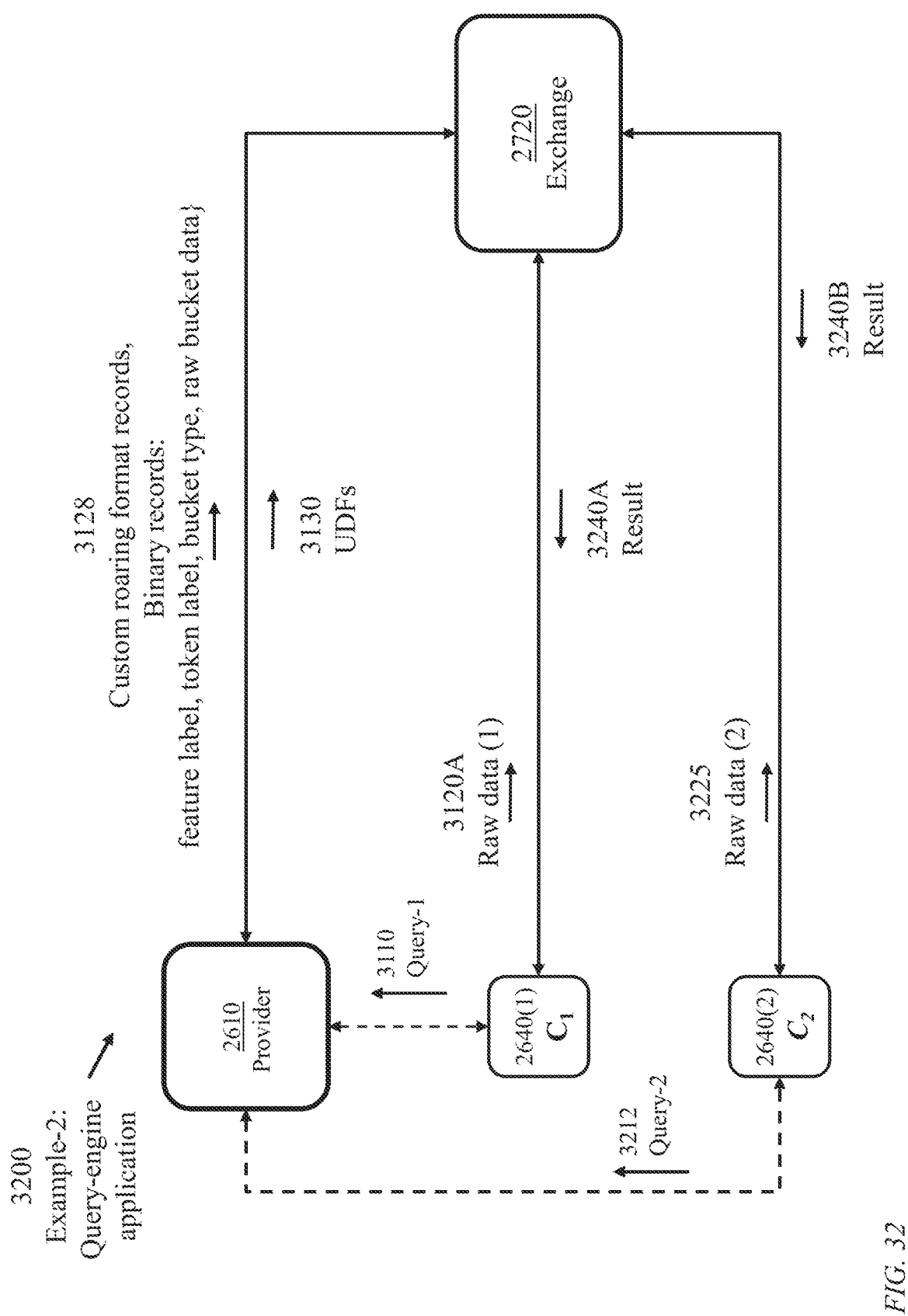
Figure 33:
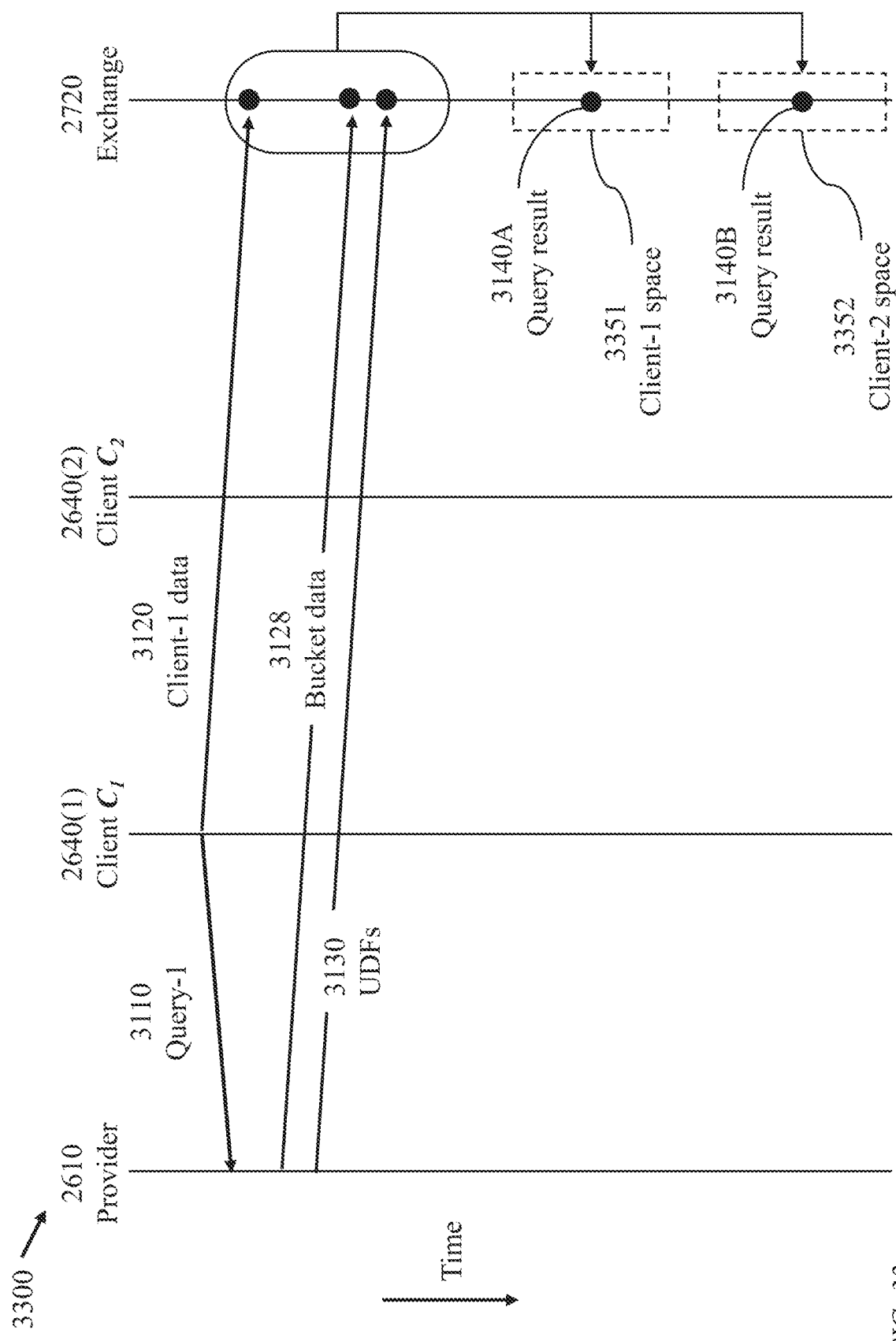
Figure 34:
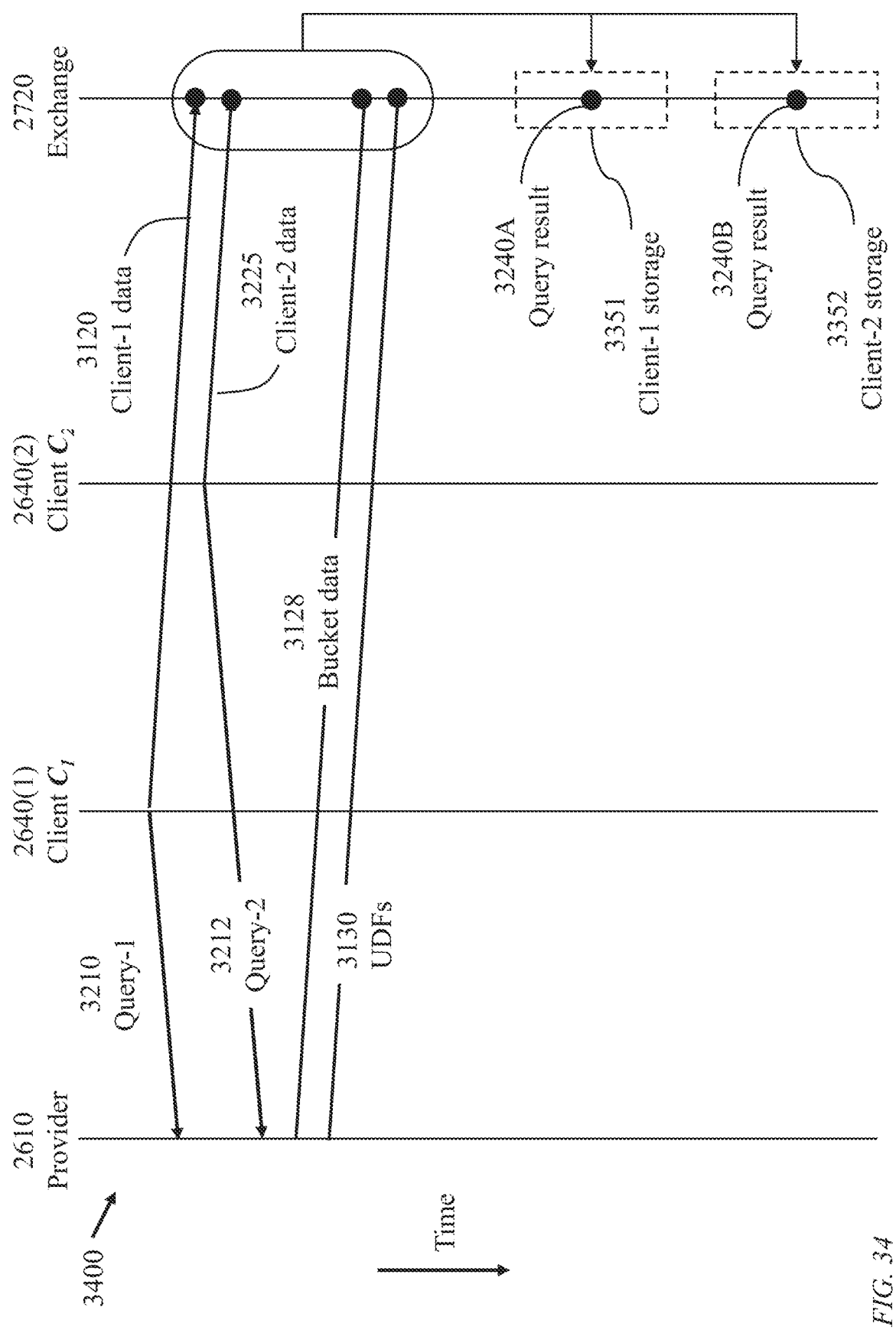
Figure 35:
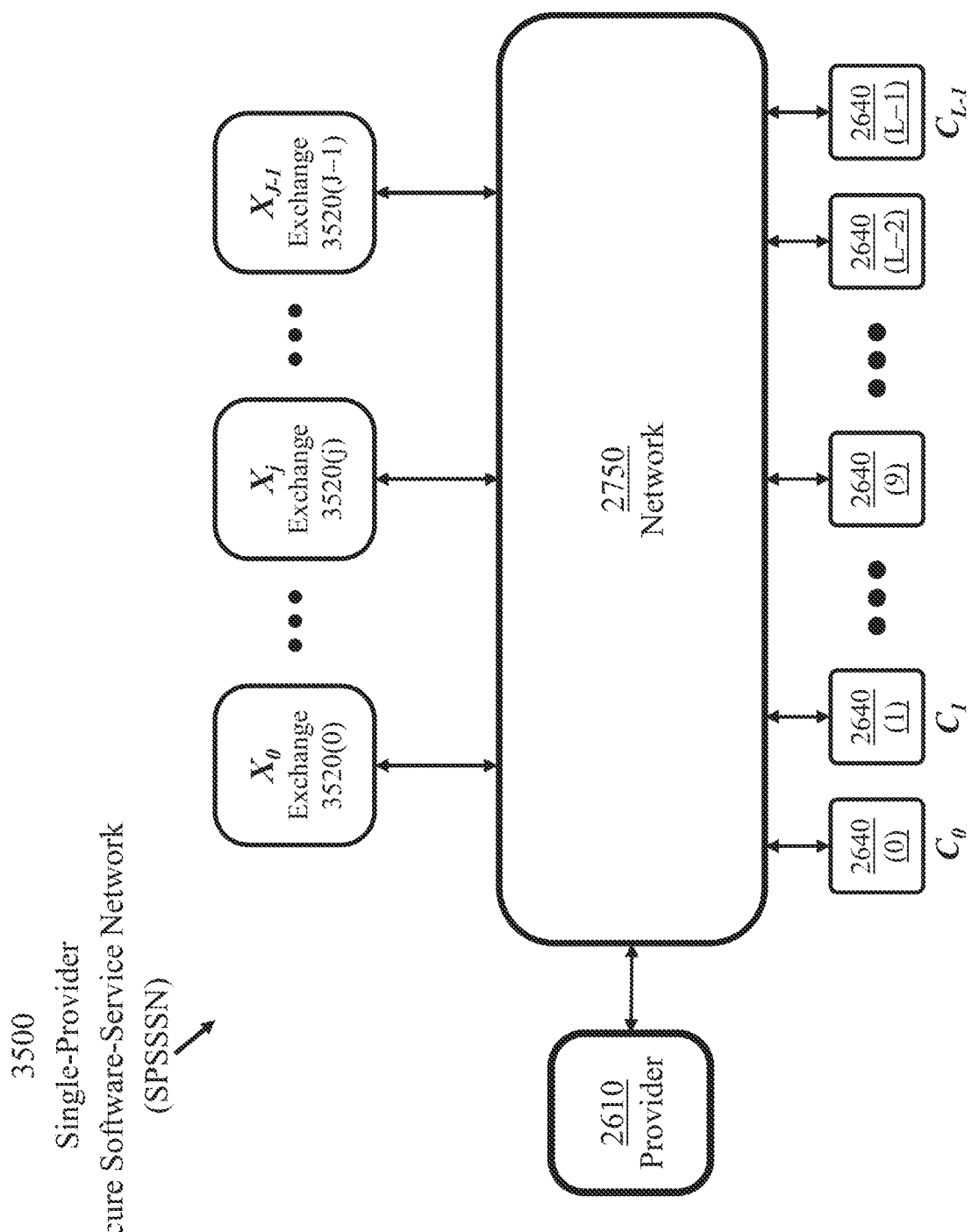
Figure 36:
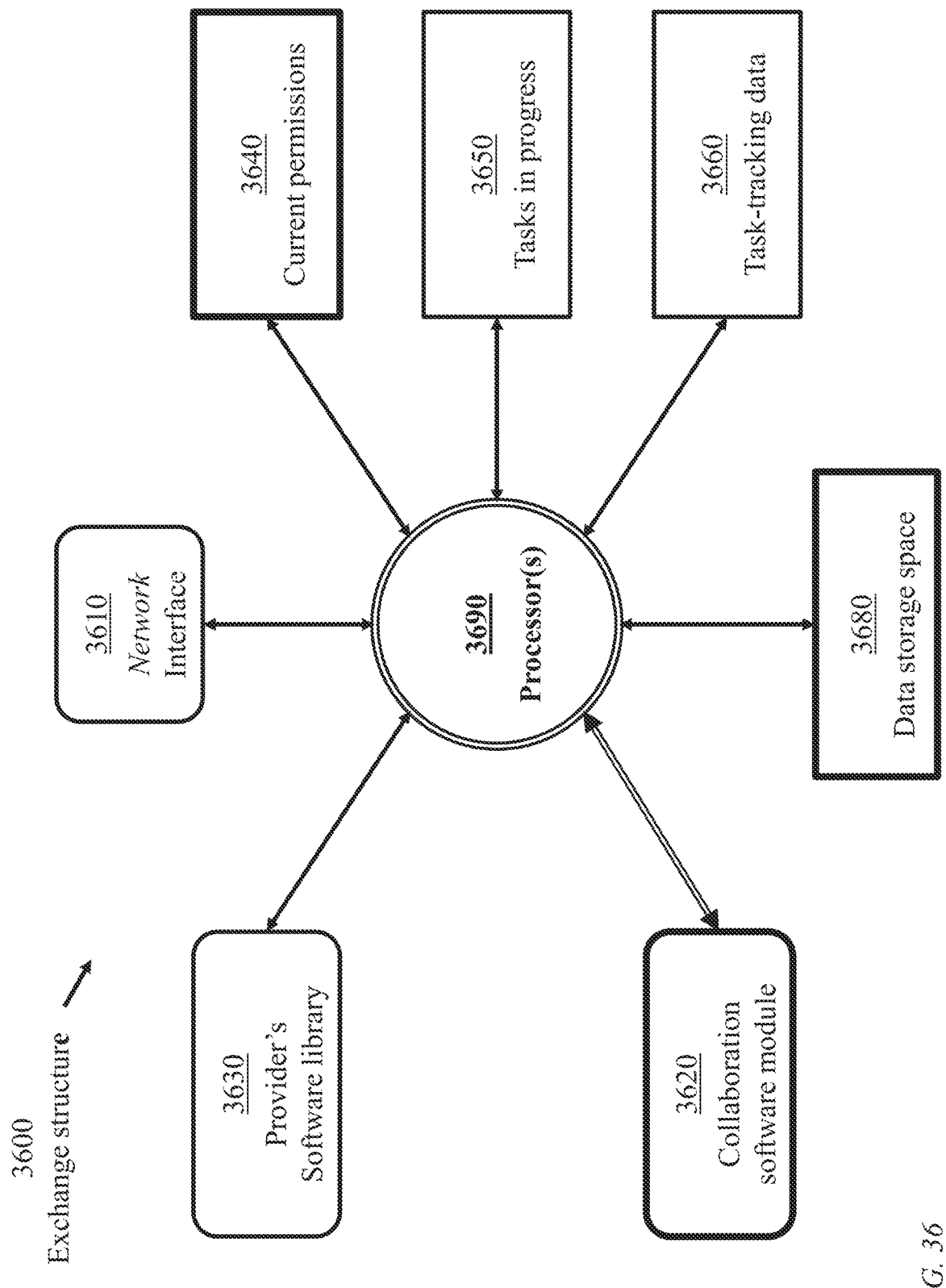

FIG. 21 illustrates criteria for implementation of the processes of FIG. 7, in accordance with an embodiment of the present invention;

FIG. 22 illustrates a method of estimating a critical number of object samples (requisite sample size) of a selected key-specific set of objects to be used for determining the likelihood of a significant similarity of the selected key-specific set to a master set of objects, in accordance with an embodiment of the present invention;

FIG. 23 illustrates an exemplary dependence of the requisite sample size on the total number of relevant objects (the number of objects of the smaller of a set pair) to realize a specified confidence level (e.g., 95%) and a specified confidence interval (2.5%. for example);

FIG. 24 illustrates exemplary pre-computed requisite sample sizes versus different values of a total number of relevant objects for different confidence parameters;

FIG. 25 illustrates a second implementation of the query-processing system of FIG. 1, FIG. 26 illustrates conventional data exchange between a general software provider and a number of clients;

FIG. 27 illustrates a system for enabling clients of a software provider to securely apply the provider's software to clients' proprietary data without importing the provider's software into the clients' processing facilities or exposing the proprietary data to the provider, in accordance with an embodiment of the present invention;

FIG. 28 illustrates data exchange within the system of FIG. 27;

FIG. 29 illustrates processes of the data exchange of FIG. 28;

FIG. 30 illustrates temporal order of the processes of FIG. 29, in accordance with an embodiment of the present invention;

FIG. 31 illustrates data exchange within the system of FIG. 27 for a query-engine application where a first client shares insight data with a second client, in accordance with an embodiment of the present invention;

FIG. 32 illustrates exemplary transactions between two clients, in accordance with an embodiment of the present invention;

FIG. 33 illustrates temporal order of the data exchange of FIG. 31;

FIG. 34 illustrates temporal order of the data exchange of FIG. 32;

FIG. 35 illustrates a system similar to the system of FIG. 27 but employing multiple exchanges, in accordance with an embodiment of the present invention;

FIG. 36 illustrates an exemplary structure of an exchange of the system of FIG. 35, in accordance with an embodiment of the present invention.

Figure 37:
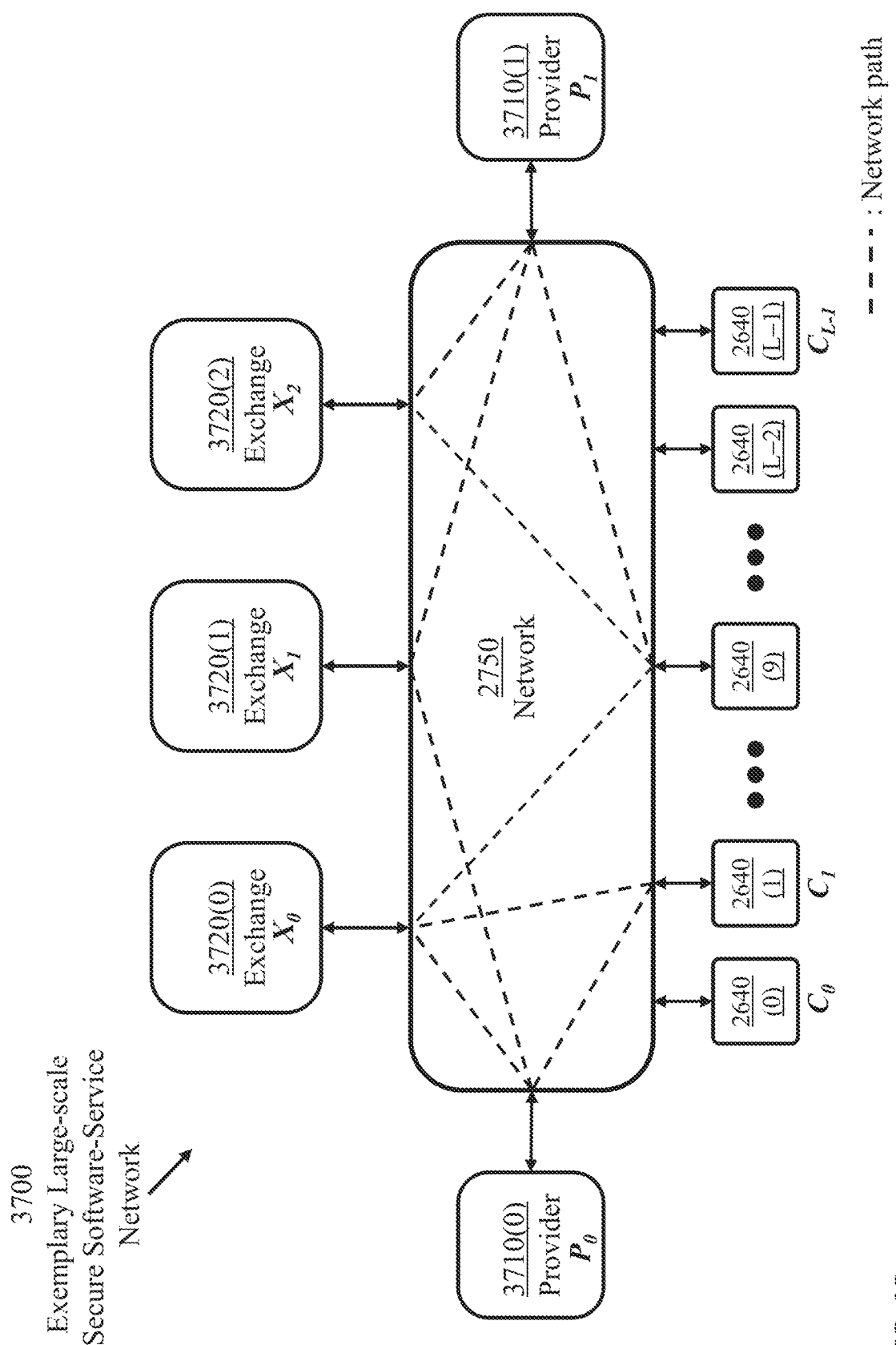
Figure 38:
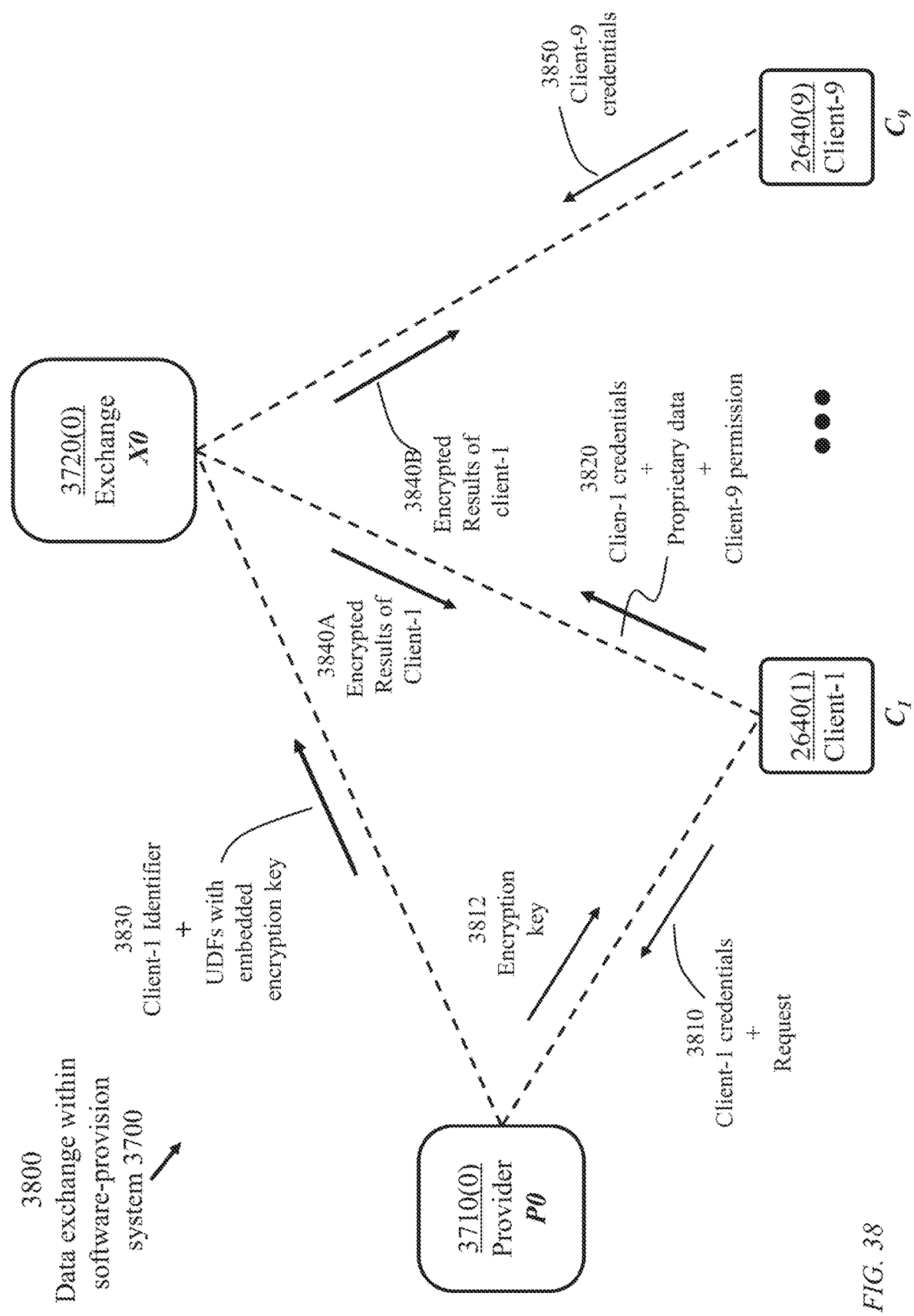
Figure 39:
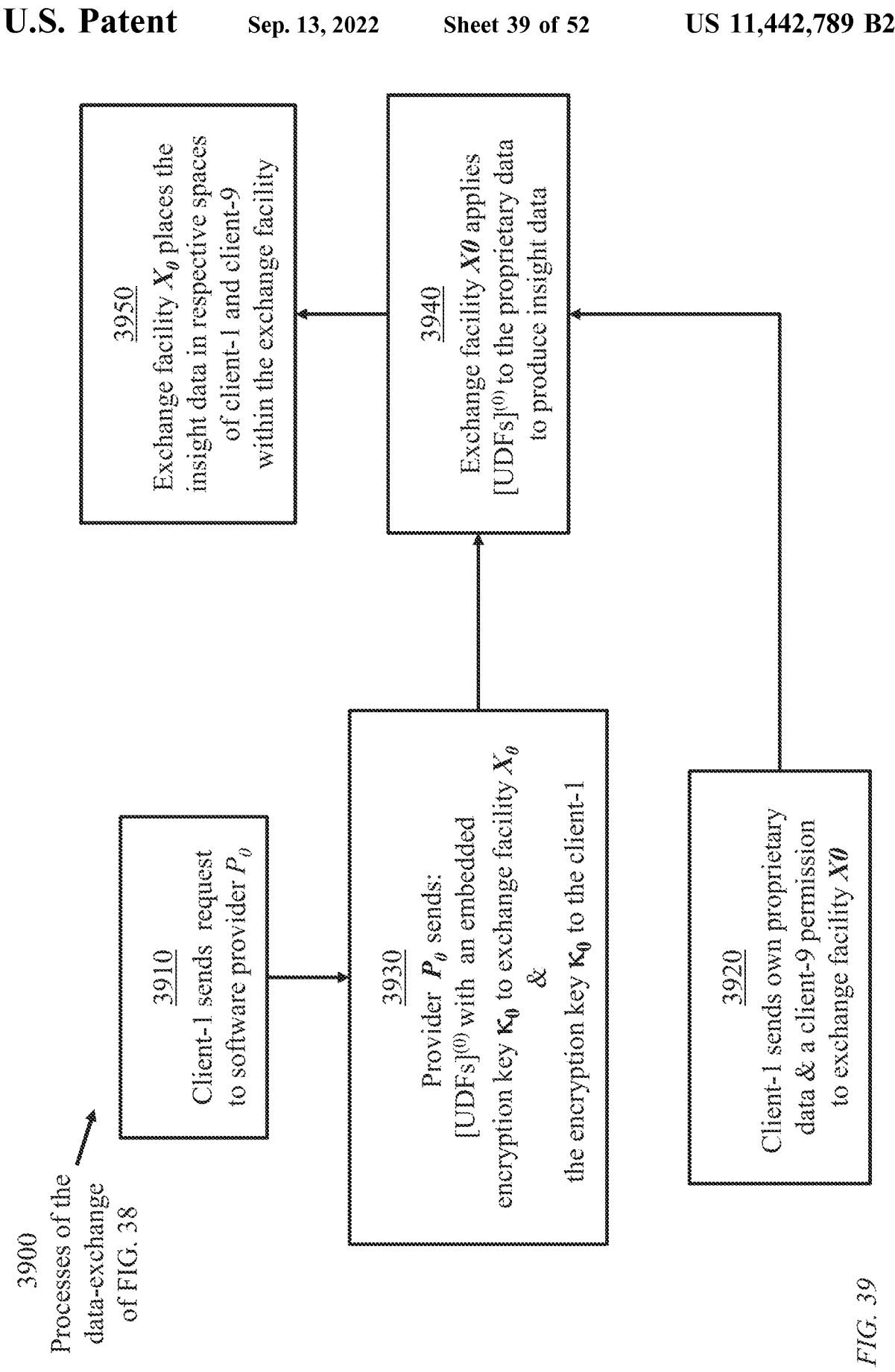
Figure 40:
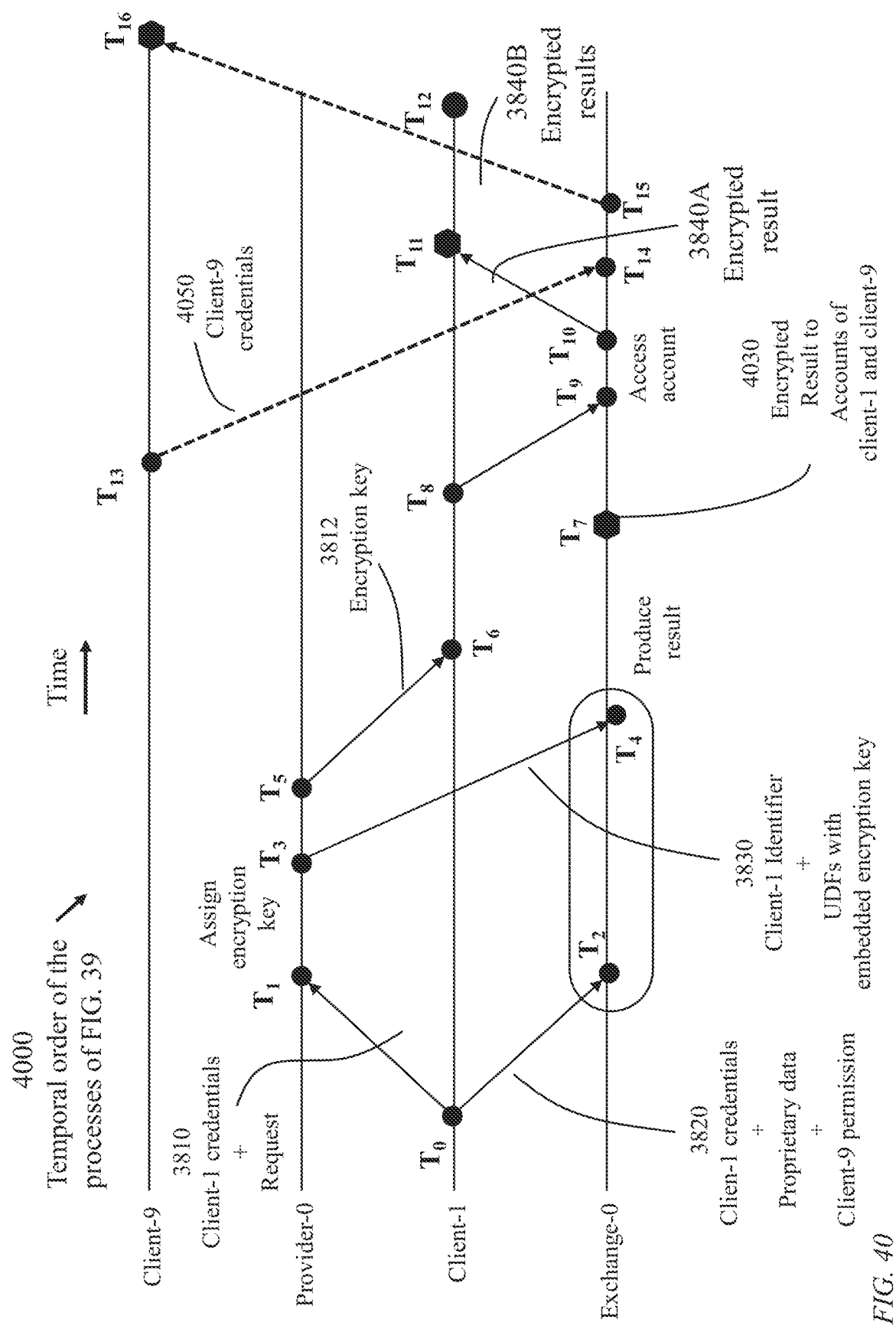
Figure 41:
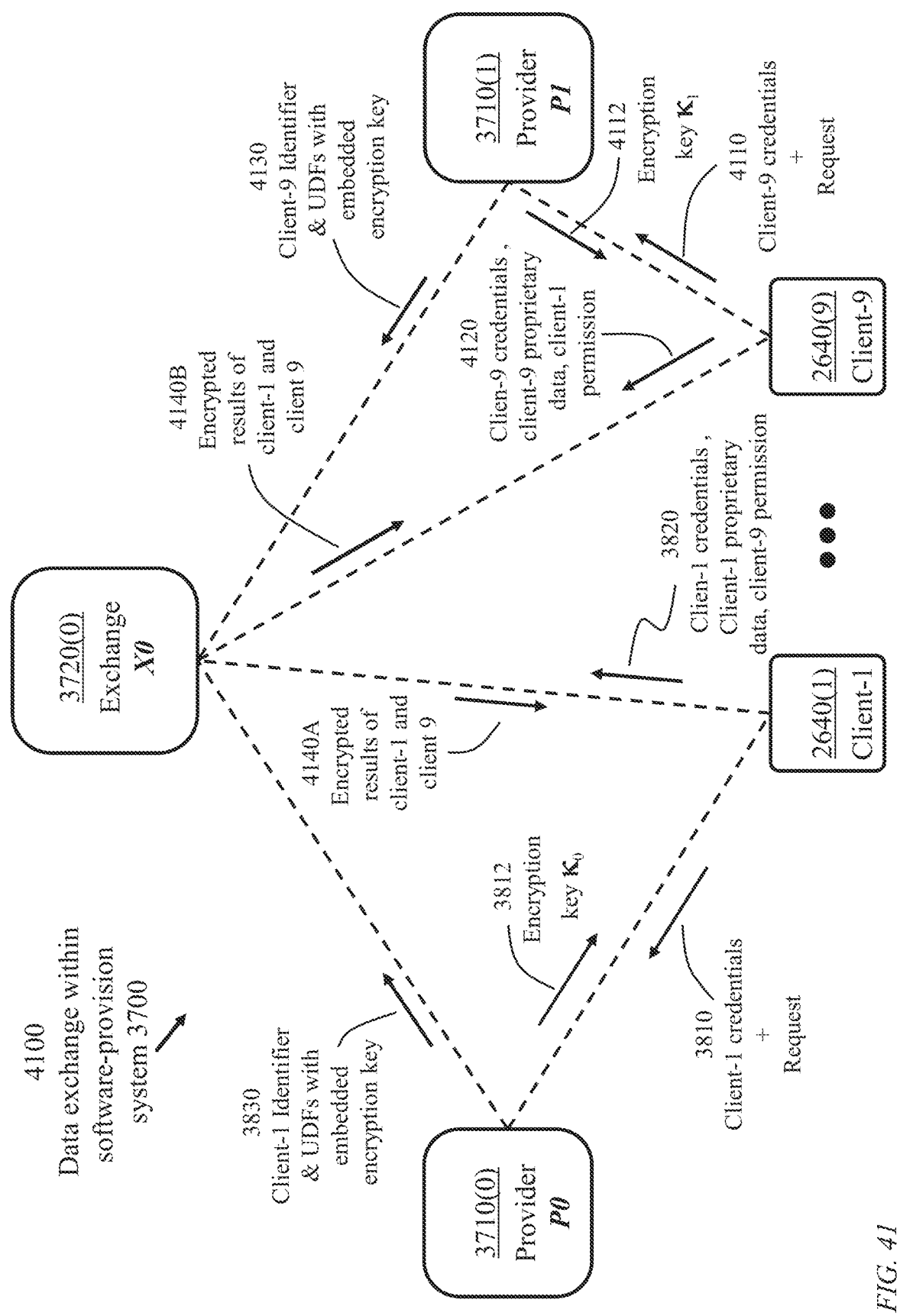
Figure 43:
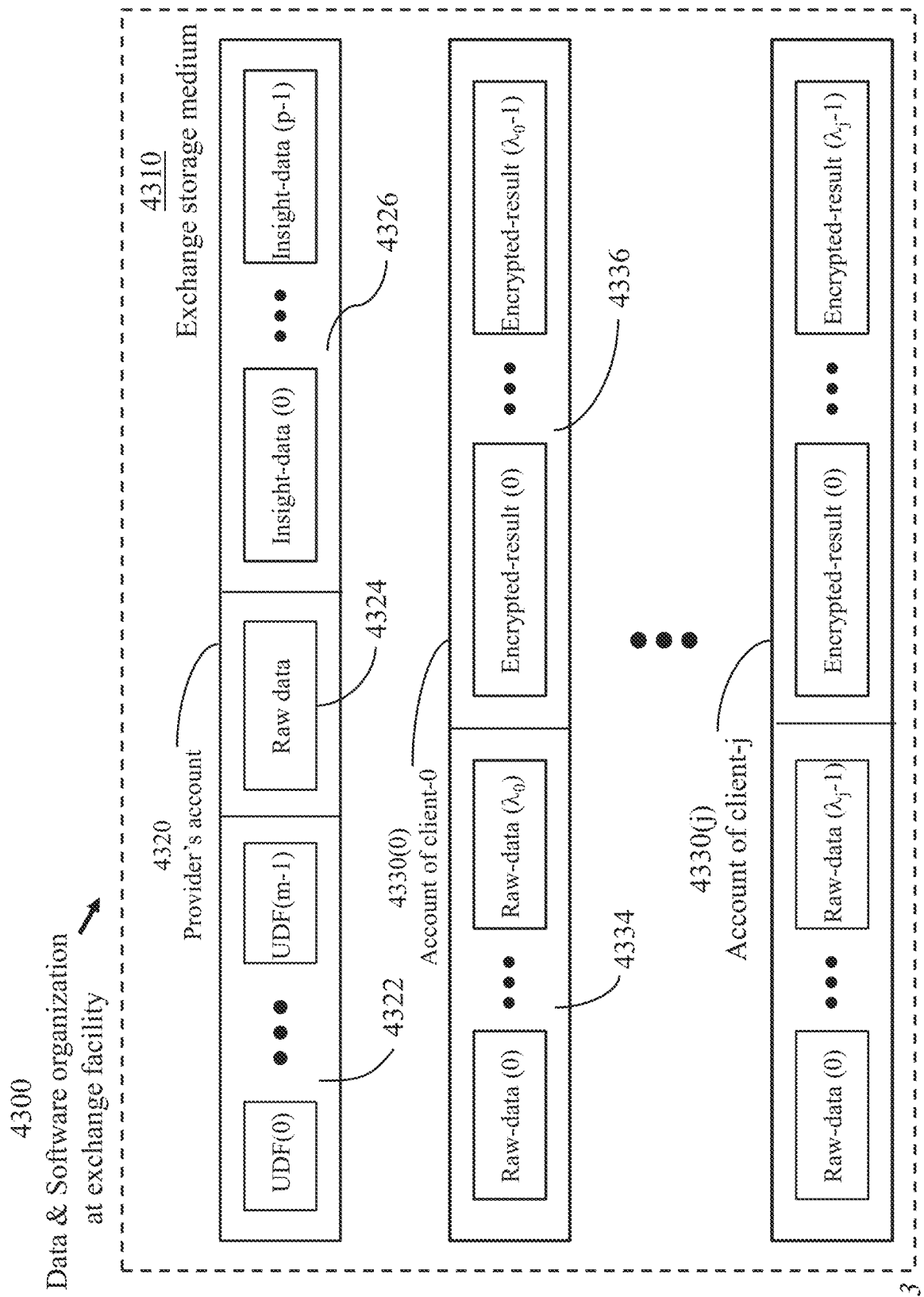

FIG. 37 illustrates a large-scale system similar to the system of FIG. 27 but employing two software providers and three exchange facilities, in accordance with an embodiment of the present invention;

FIG. 38 illustrates a first example of data exchange of the system of FIG. 37, in accordance with an embodiment of the present invention;

FIG. 39 illustrates processes of the data exchange of FIG. 38;

FIG. 40 illustrates temporal order of the processes of FIG. 39, in accordance with an embodiment of the present invention;

FIG. 41 illustrates a second example of data exchange of the system of FIG. 37, in accordance with an embodiment of the present invention;

FIG. 42 illustrates processes of the data exchange of FIG. 41;

FIG. 43 illustrates an exemplary organization of content data and software modules maintained at an exchange facility associated with the system of FIG. 27, in accordance with an embodiment of the present invention;

FIG. 44 illustrates a transaction-control table maintained at the exchange facility associated with the system of FIG. 27, in accordance with an embodiment of the present invention.

Figure 45:
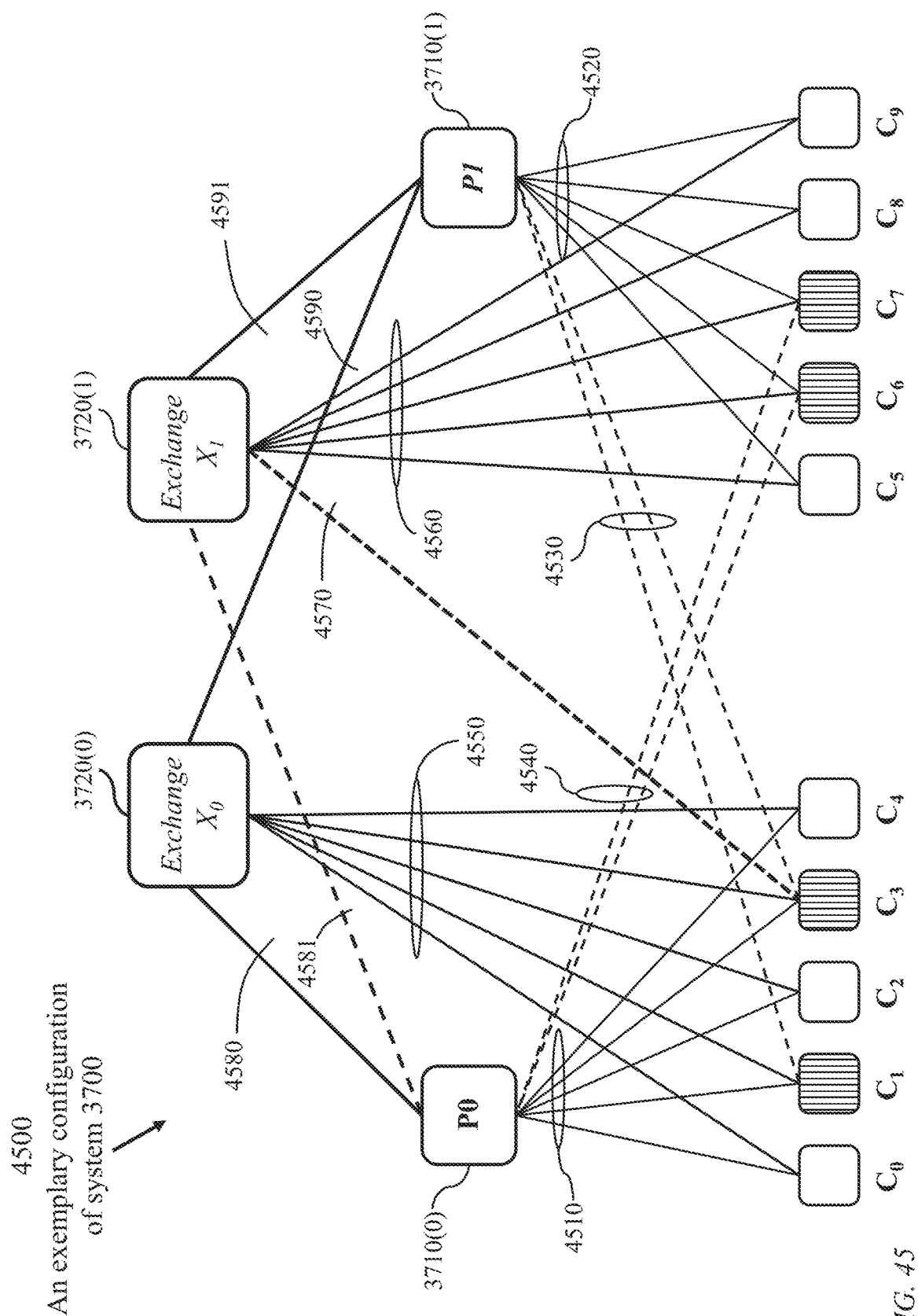
Figure 47:
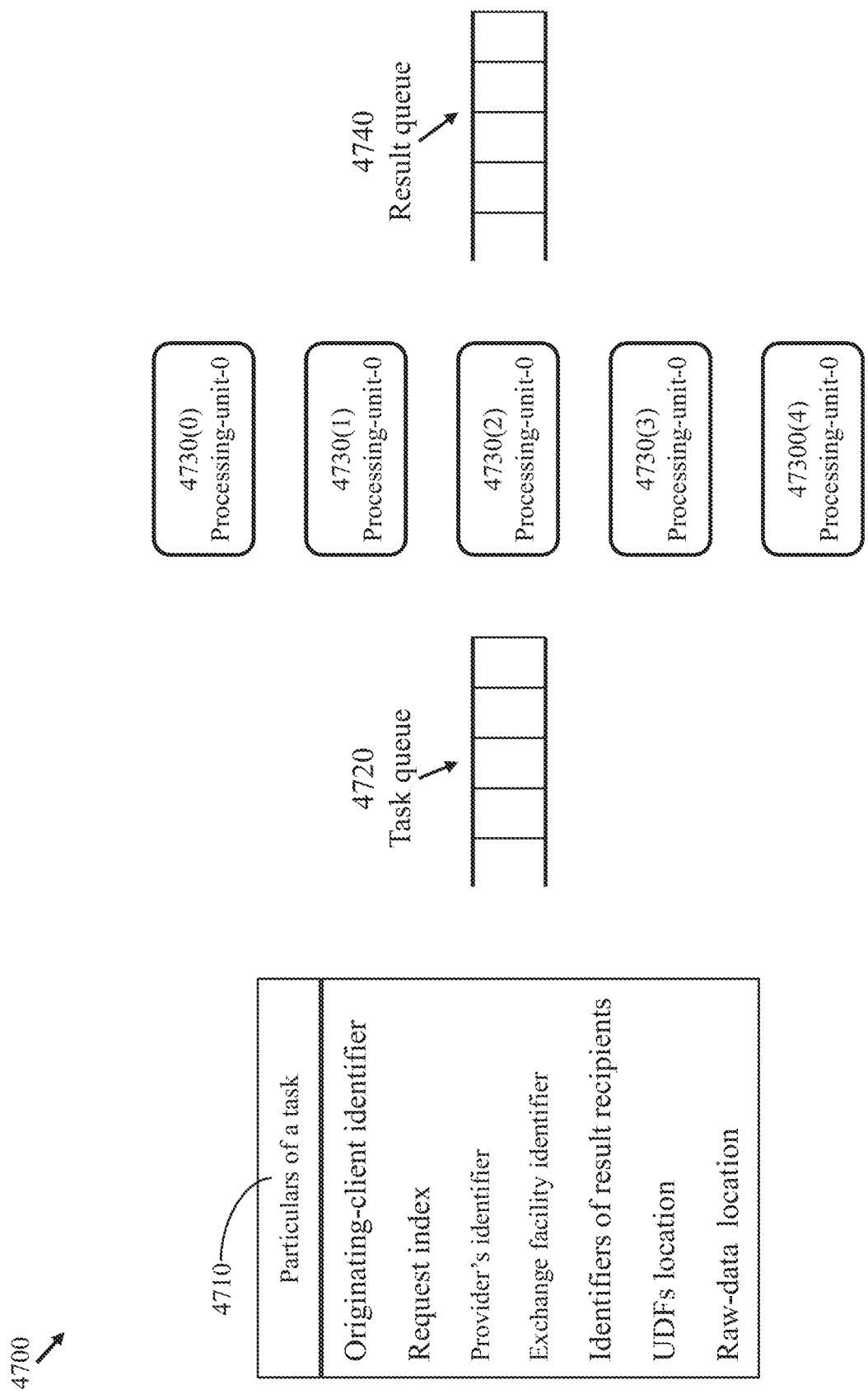
Figure 48:
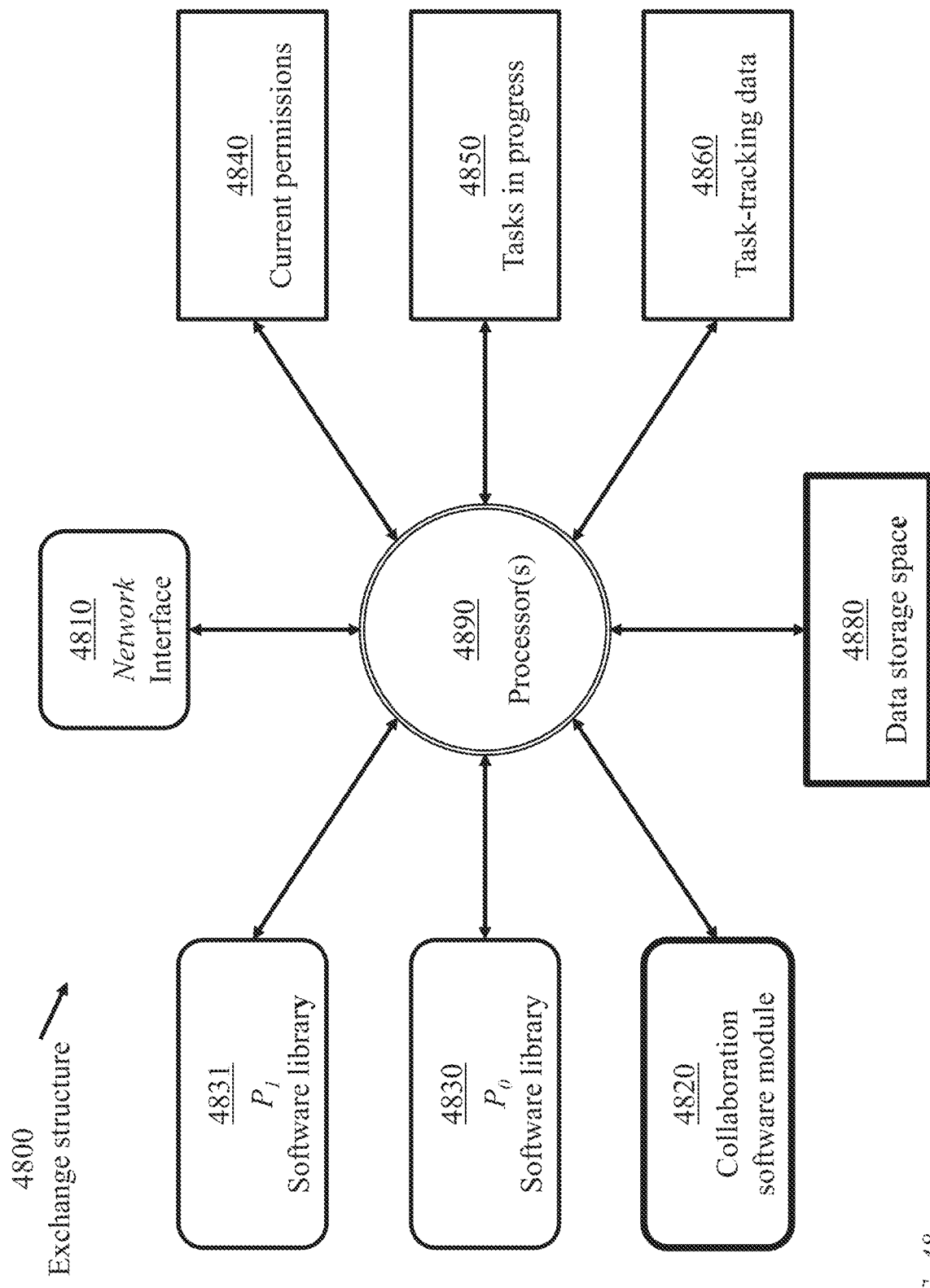
Figure 49:
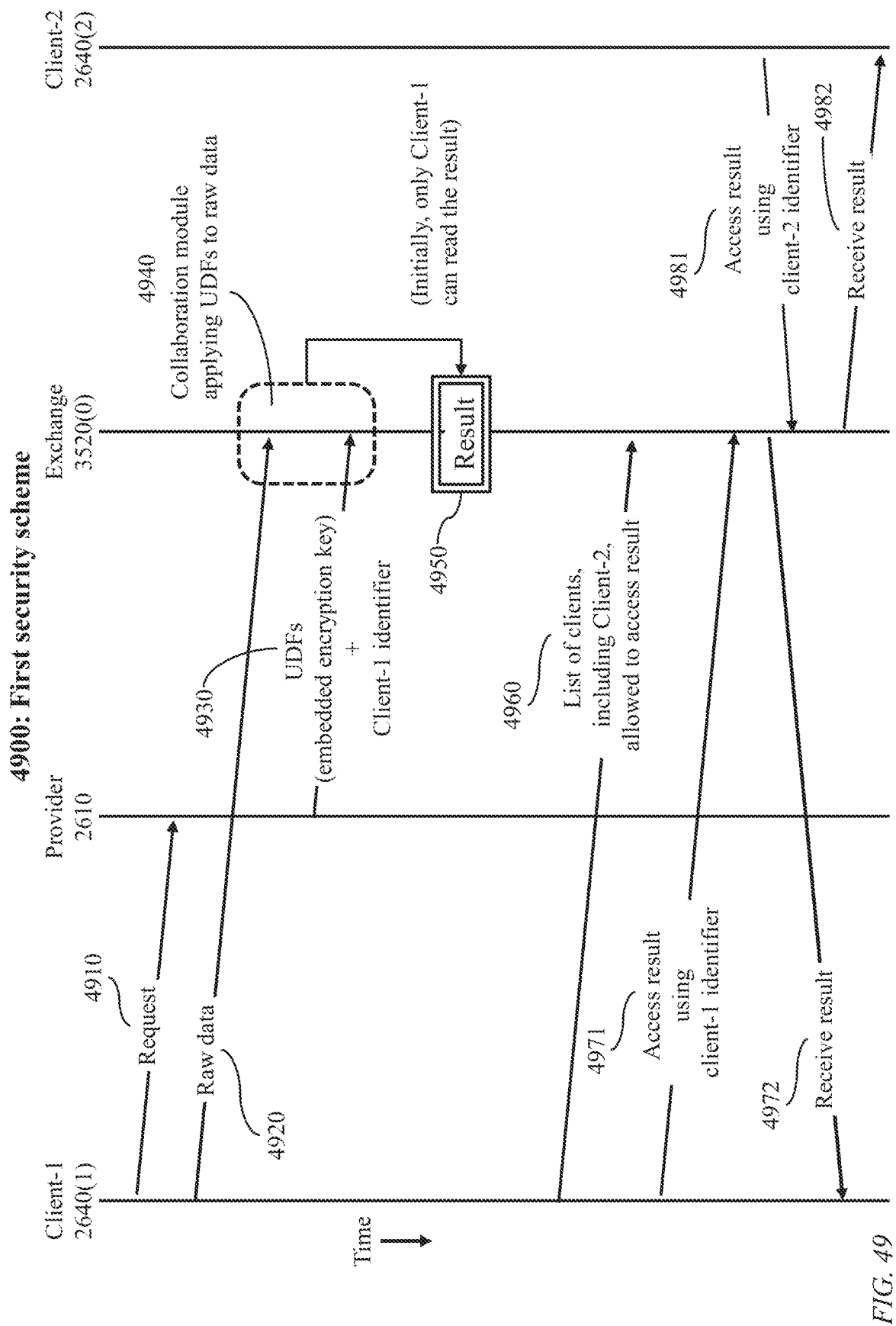
Figure 50:
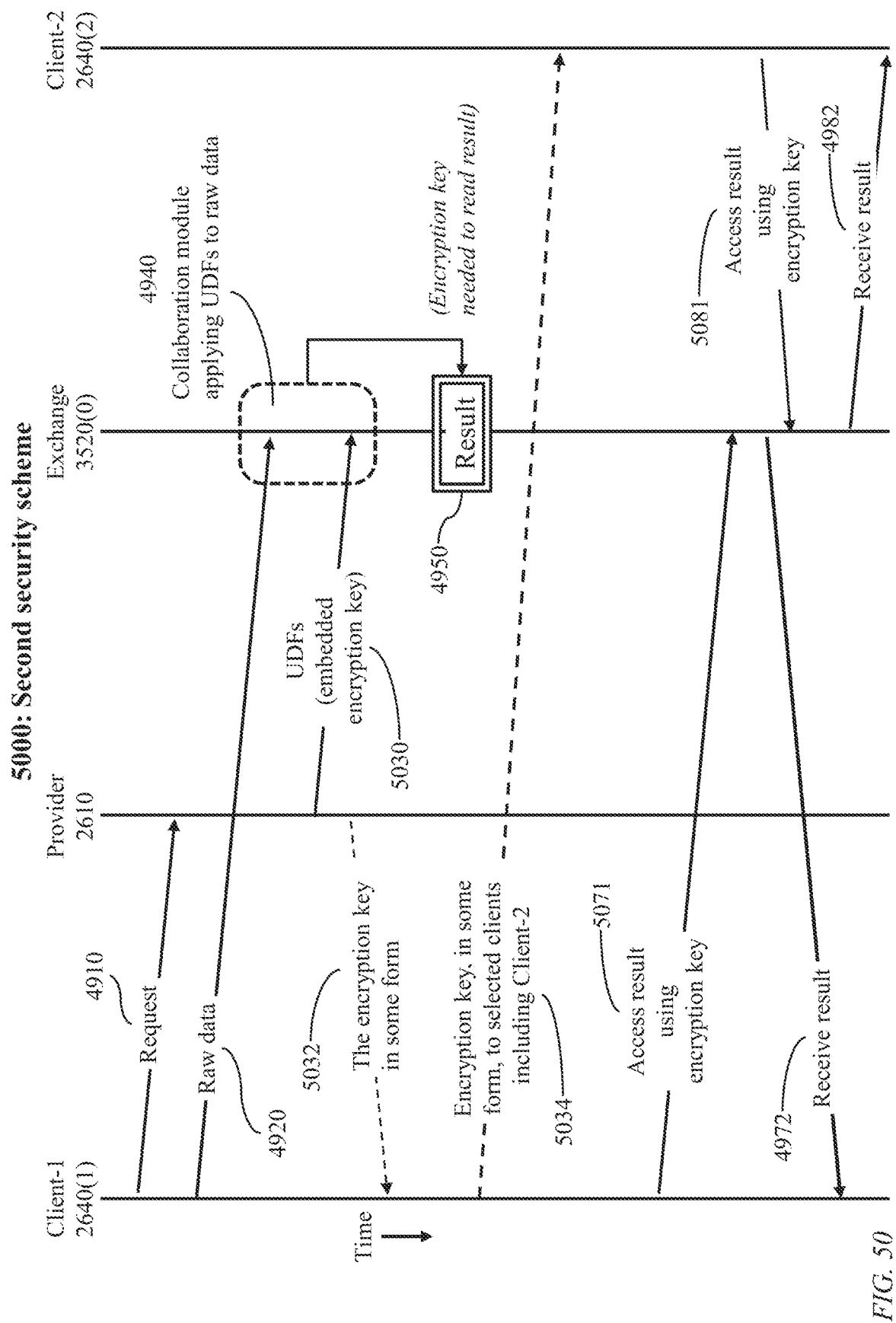
Figure 51:
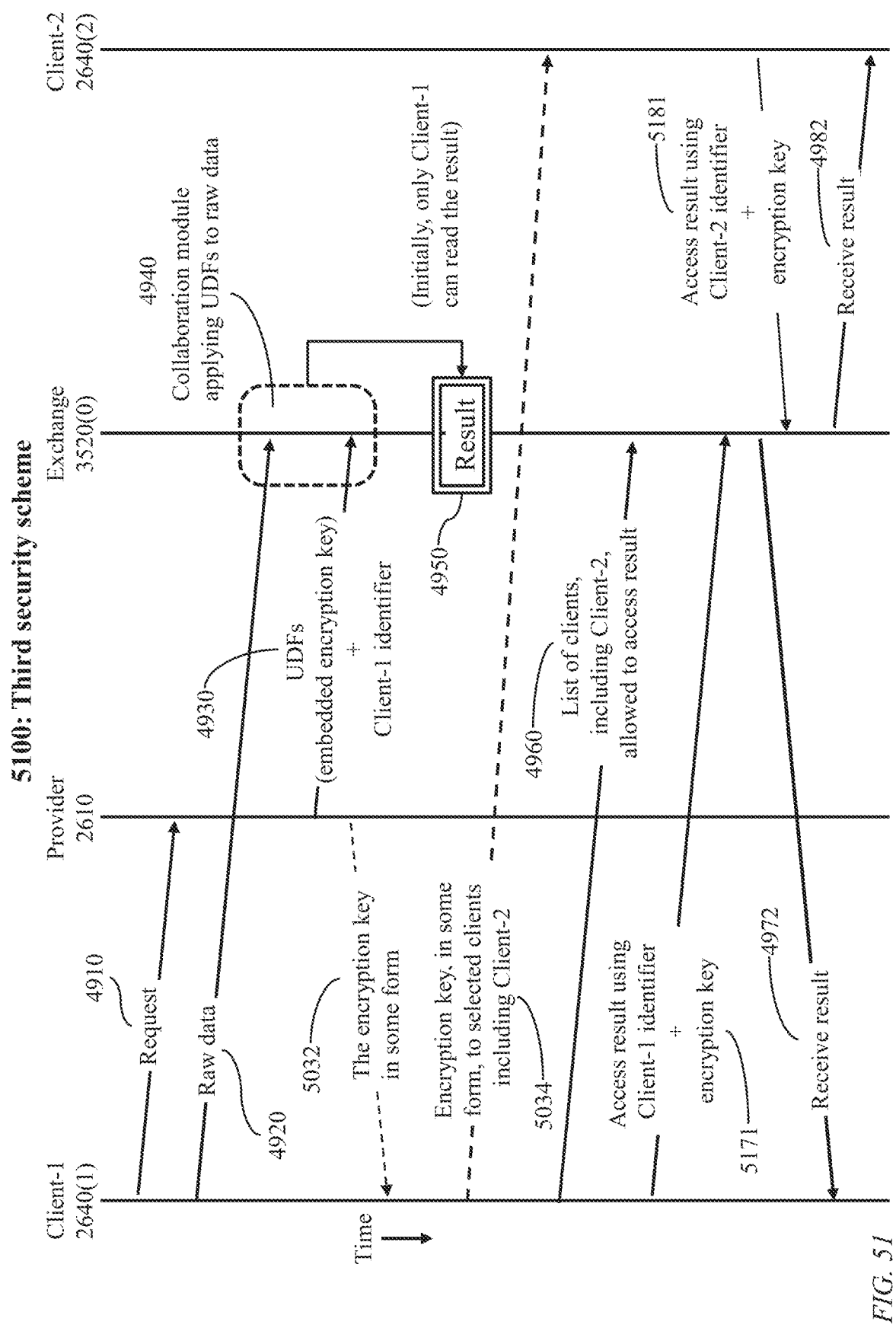
Figure 52:
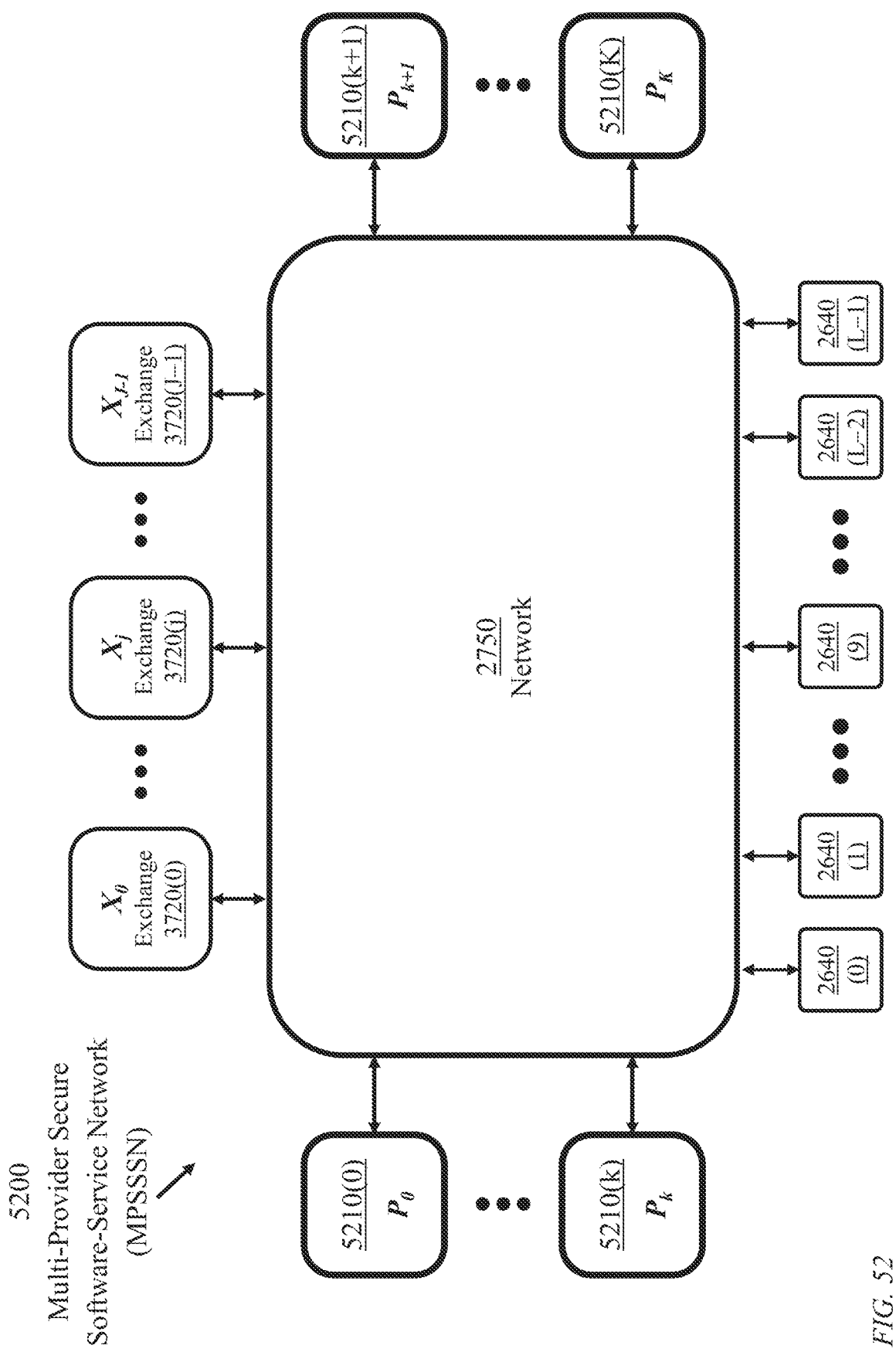

FIG. 45 illustrates exemplary configuration of the large-scale system of FIG. 37 employing two software providers communicatively coupled to two exchange facilities, in accordance with an embodiment of the present invention;

Figure 46:
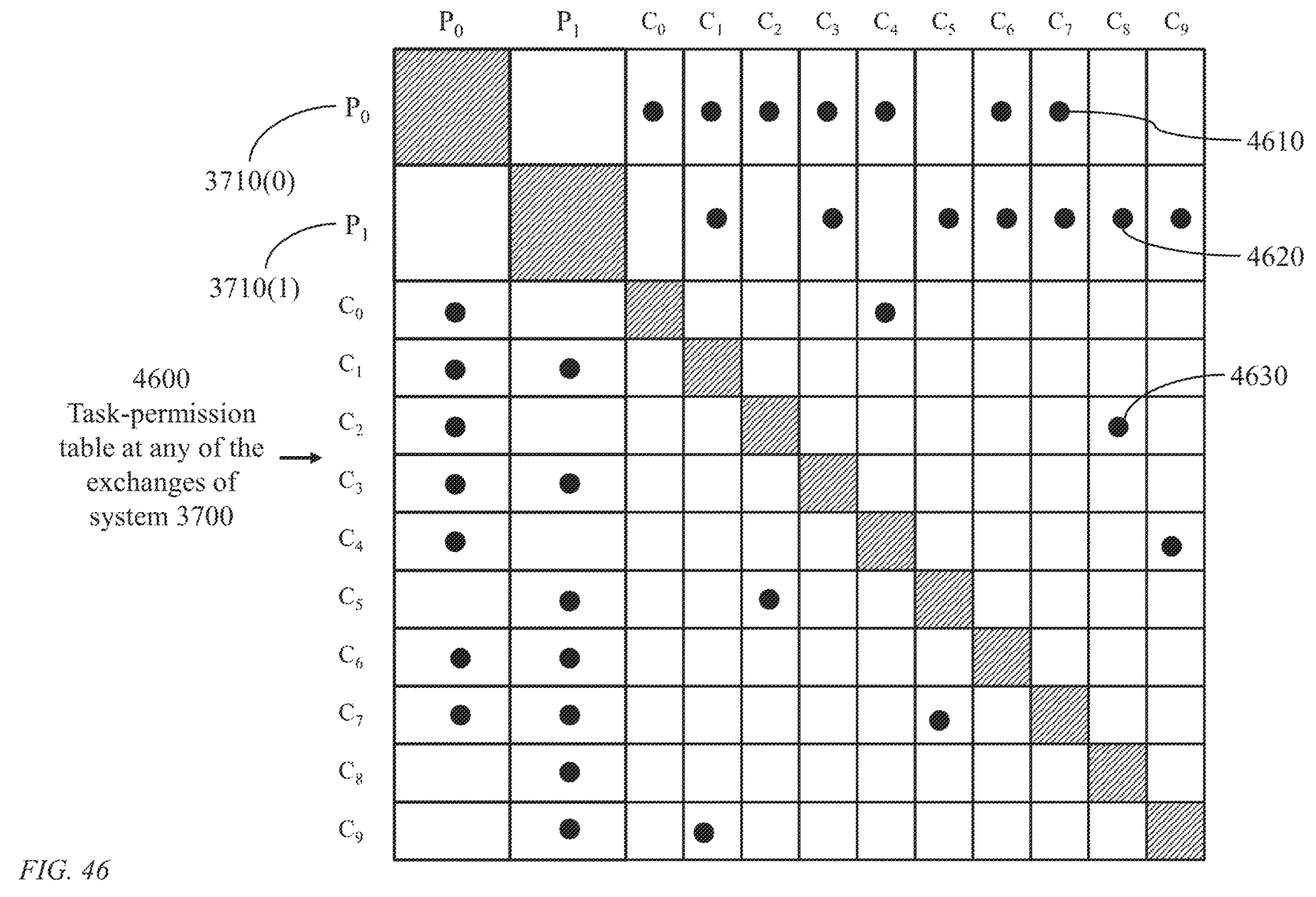

FIG. 46 illustrates a transaction-control table maintained at an exchange facility associated with the system of FIG. 37, in accordance with an embodiment of the present invention;

FIG. 47 illustrates task handling at an exchange facility, in accordance with an embodiment of the present invention;

FIG. 48 illustrates an exemplary structure of an exchange of the system of FIG. 37, in accordance with an embodiment of the present invention;

FIG. 49 illustrates a first scheme of realizing secure software services, in accordance with an embodiment of the present invention;

FIG. 50 illustrates a second scheme of realizing secure software services, in accordance with an embodiment of the present invention;

FIG. 51 illustrates a third scheme of realizing secure software services, in accordance with an embodiment of the present invention; and FIG. 52 illustrates a multi-provider secure software-service network (MPSSSN), supporting a plurality of clients, comprising a plurality of software providers and a plurality of clouds in accordance with an embodiment of the present invention.

NOTATION

N: Total number of objects (1000,000,000, for example)
Q: The total number of descriptor keys (1000000, for example), hence the total number of Key-specific sets of objects
$\Theta$: Number of candidate key-specific sets of objects, $\Theta<Q$
$\Phi$: Number of eligible key-specific sets of objects, $\Phi<\Theta$
$\Lambda$: Upper bound of the number of buckets
X: Upper bound of a number of objects per bucket, $\Lambda \times \lambda \geq N$

REFERENCE NUMERALS

100: A query-processing system
110: A query from a client
120: Query engine
140: Descriptors of object population
160: Key-specific sets of object identifiers
180: Query result
210: An array of objects
212: Object identifier
214: Object descriptors
220: Key-specific sets of objects
230: Index of object in array 210
320: Query example
340: Query-result example
400: Query-specific relevant sets of objects
500: Master set of objects formed as a union of relevant sets
520: Union of four sets A, B, C, D
600: Master set of objects formed as overlapping subsets of four sets A, B, C, and D
700: Processes of responding to a query
710: A collection of Q key-specific sets, Q>>1
720: A process of coarse filtering to identify a subset of $\Theta$ of candidate key-specific sets of the Q key-specific sets based on an initial screening process to eliminate any key-specific set that is unlikely to be relevant to the query
730: Identified subset of candidate key-specific sets
740: A process of fine filtering to select eligible key-specific sets from the $\Theta$ candidate sets according to a stringent screening process.
750: A set of eligible key-specific sets
760: A process of ranking and sorting the eligible key-specific sets
770: Ranked selected objects
800: First implementation of query-processing system 100
810: Buffer holding queries 110 received from clients
821: Coarse hyperMinHash filter
822: Fine HyperMinHash filter
824: List of candidate key-specific sets
900: Exemplary dependence of requisite processing effort on permissible estimation error of a coefficient of similarity
1000: Exemplary dependence of count of candidate key-specific set on permissible estimation error of a coefficient of similarity
1110: Primary objects' identifiers
1120: Randomly shuffled primary objects' identifiers
1130: Secondary users' identifiers
1140: Objects' descriptors corresponding to the primary objects' identifiers 1110
1150: Translation array indicating for each primary identifier in array 1110 a translated (secondary) identifier
1210: Exemplary key-specific sets of objects for a case of Q=9 and N=23, each set contains translated (secondary) object identifiers sorted in an ascending order
1220: Translated objects
1300: Processes of object-identifier translation
1310: Process of accessing storage of N objects, N>>1
1320: Process of generating unique random integers in the range 0 to (N−1)
1330: Process of translating object identifiers according to the generated random integers
1340: Process of accessing storage of Q key-specific sets of objects
1350: Process of translating primary identifiers of objects of each key-specific set to corresponding secondary identifiers
1360: Process of sorting the secondary identifiers of objects of each key-specific set in an ascending order
1400: Process of segmenting object sets into buckets
1410: Process of determining a Master Set of objects according to key-specific sets corresponding to query-specified keys
1420: process of selecting an upper bound of a number of objects within a bucket of a specified number of buckets
1430: Process of segmenting the Master Set of objects into buckets
1440: Process of segmenting each key-specific set of objects into respective buckets
1500: Process of segmenting sets of objects into buckets
1510: A first set of translated object identifiers
1520: A second set of translated object identifiers
1550: Buckets of the first set 1510 of translated object identifiers
1560: Buckets of the second set 1520 of translated object identifiers
1600: A method of determining candidate key-specific sets of objects (processes 1610, 1620, 1630, 1632, 1640, 1642, 1650, 1660, 1662, 1670, 1680)
1700: An implementation of process 1420 (FIG. 14) of selecting a number of buckets and contents per bucket
1710: Bucket index
1720: Range of object indices
1720: Object index within a bucket
2000: Buckets' content
2020: Bitmaps 2020 of the master set of FIG. 18
2040: Bit maps 2040 of the key-specific set of FIG. 19
2060: Intersection bitmaps
2100: Process of ranking key-specific sets according to level of intersection with master set
2110: Process of estimating requisite sample size for realizing a first level of intersection.

2120: Process of filtering key-specific sets of objects according to first level of intersection to produce candidate key-specific sets
2130: Process of determining exact intersection level of each candidate key-specific set with the master set
2140: process of ranking key-specific sets according to intersection levels
2200: Method of estimating requisite sample size
2300: Exemplary dependence of the requisite sample size on the total number of relevant objects
2400: Exemplary results of a method 2400 of pre-computing requisite sample sizes
2500: Second implementation of query-processing system 100
2510: Buffer holding queries 110 received from clients
2521: Process of identifying key-specific sets having at least a first-level of intersection with a master set as candidate sets
2522: Process of determining exact intersection of each candidate set with the master set
2524: List of candidate key-specific sets
2600: Conventional exchange of data (content data and/or software instructions) between clients 2640 and a software provider 2610
2610: Software provider offering software applications, such as the query engine 120 of FIG. 1, UDF sharing, secure coordination of clients' interaction, etc.
2612: Raw proprietary data sent from a specific client to the provider
2614: Results (such as insight data) sent from the provider to the specific client
2616: Request sent from a particular client to the provider 2610 to acquire specific software modules
2618: Requested software modules sent from the provider to the particular client
2640: Clients of the provider
2700: A Basic Secure Software-Service Network (BSSSN) enabling clients of a software provider to securely apply the provider's software to clients' proprietary data without importing the provider's software into the clients' processing facilities or exposing the proprietary data to the provider
2720: Computing and data-exchange facility (referenced as "exchange facility" or simply "exchange")
2712: Dual network path between provider 2610 and client 2640(1)
2714: Dual network path between provider 2610 and exchange 2720
2716: Dual network path between exchange 2720 and client 2640(1)
2726: Dual network path between exchange 2720 and client 2640(k−1)
2750: Network interconnecting the software provider, the exchange facility, and the clients
2800: An example of data exchange through network 2700
2810: Client-1 credentials and task request sent to provider 2610
2812: Encryption key, which may be embedded within a UDF, from provider 2610
2820: Client-1 credentials and client-1 proprietary data sent to exchange facility
2822: Encrypted results acquired from the exchange facility 2720
2830: Client-1 identifier and a set of UDFs relevant to the requested task
2900: Processes of the data exchange of FIG. 28
2910: Process of sending a request to perform a task from a client to the provider 2610
2920: Process of sending raw data (proprietary data) from the client to the exchange facility
2930: Process of sending a set of UDFs, with an embedded encryption key, from the provider 2610 to the exchange facility 2720
2940: Process of applying the set of UDFs to the raw data, performed at the exchange facility, to produce insight data
2950: Process of placing the insight data into a storage space assigned to the client within the exchange facility
3000: Temporal order of the processes of FIG. 29
3080: Insight data
3100: A first example of data exchange within the system of FIG. 27 where the requested task is a query presented to query engine 120 (FIG. 1)
3110: Query from a client 2640(1), denoted $C_1$ to the provider 2610
3120: Raw data sent from client $C_1$ to the exchange facility 2720
3128: Custom data sent from the provider to the exchange facility 2720
3130: A set of UDFs relevant to the query sent from the provider to the exchange facility
3140: Result (response to the query) based on data 3120 placed within the exchange facility 2720
3142: $C_1$ acquired result
3150: Encryption key sent from client $C_1$ to another client 2640(2), denoted $C_2$ which may not be a client of provider 2610
3200: A second example of data exchange within the system of FIG. 27 where the requested task is a query presented to query engine 120 (FIG. 1)
3225: Raw data sent from client $C_2$ to the exchange facility 2720
3212: Query from the second client 2640(2), denoted $C_1$ to the provider 2610
3300: Temporal order of the data exchange of FIG. 31
3351: Storage space within the exchange facility assigned to client $C_1$
3352: Storage space within the exchange facility assigned to client $C_2$
3400: Temporal order of the data exchange of FIG. 32
3500: A Single-Provider Secure Software-Service Network (SPSSSN) similar to the Basic Secure Software-Service Network (BSSSN) of FIG. 27 but employing multiple exchanges
3520: Exchanges of network 3500
3600: Exchange structure
3610: Network interface of an exchange
3620: Collaboration software module
3630: Software library of provider 2610
3640: A security-control data structure holding current permissions, from provider 2610 and clients 2640, occupying a memory space of a cloud
3650: Tasks in progress
3660: Task-tracking data
3680: Data-Storage space of exchange 3600
3690: A hardware processor or a set of hardware processor operating concurrently in a parallel arrangement or a pipelined arrangement
3700: A large-scale system similar to the system of FIG. 27 but employing two software providers and three exchange facilities
3710: Software provider of system 3700 (first provider 3710(0), second provider 3710(1))

3720: Exchange facilities of system 3700 (first exchange facility 3720(0), second exchange facility 3720(1), third exchange facility 3720(2))
3800: A first example of data exchange of system 3700
3810: Client-1 credentials and a first task request sent to provider 3710(0)
3812: Encryption key, which may be embedded within a UDF, from provider 3710(0)
3820: Client-1 credentials, client-1 proprietary data, and client-9 permission sent to exchange facility
3830: Client-1 identifier and a set of UDFs relevant to the requested task
3840: Encrypted results accessible to client-1 and client-9 (3840A and 3840B, respectively)
3850: Client-9 credentials
3900: Processes of the data exchange of FIG. 38
3910: Process of a first client sending a request to a first software provider
3920: Process of the first client sending raw data and access permission to a second client to a selected exchange facility
3930: Process of the first software provider sending UDFs to the selected exchange facility
3940: Process of generating insight data at the selected exchange facility
3950: Process of placing the insight data into a storage space assigned to the first client and a storage space assigned to the second client
4000: Temporal order of the processes of FIG. 39
4030: Encrypted result
4100: A second example of data exchange of the system of FIG. 37
4110: Client-9 credentials and a second task request sent to provider 3710(0)
4112: Encryption key, which may be embedded within a UDF, from provider 3710(1)
4120: Client-9 credentials, client-9 proprietary data, and client-1 permission sent to exchange facility
4130: Client-9 identifier and a set of UDFs relevant to the second task
4140: Encrypted results accessible to client-1 and client-9 (4140A and 4140B, respectively)
4200: Processes of the data exchange of FIG. 38
4210: Process of a second client sending a request to a second software provider
4220: Process of the second client sending own raw data and access permission to the first client to a selected exchange facility
4230: Process of the second software provider sending UDFs to the selected exchange facility
4240: Process of generating insight data at the selected exchange facility
4250: Process of placing the insight data into a storage space assigned to the first client and a storage space assigned to the second client
4300: Exemplary organization of content data and software modules maintained at exchange 2720
4310: Storage medium associated with exchange 2720
4320: A memory space within exchange 2720 reserved for provider 2610
4322: Software implementation of a specific user-defined function
4324: Provider's Raw data
4326: Generated insight data
4330: A memory space within exchange 2720 reserved for a client 2640
4334: Raw data (potentially proprietary data) of a specific client 2640
4336: Encrypted results, belonging to the specific client, of applying specific UDFs
4400: Transaction control table of the system of FIG. 27
4500: An exemplary configuration of the large-scale system of FIG. 37
4510: Network paths from a first set of clients 2640 (labelled $C_0$, $C_1$, $C_2$, $C_3$, and $C_4$) to software provider 3710(0), labeled $P_0$
4520: Network paths from a second set of clients 2640 (labelled $C_5$, $C_6$, $C_7$, $C_8$, and $C_9$) to software provider 3710(1), labeled $P_1$
4530: Network path from clients $C_1$ and $C_3$ to $P_1$
4540: Network path from clients $C_6$ and $C_7$ to $P_0$
4550: Network paths from the first set of clients 2640 to a first exchange facility 3720(0), labeled $X_0$
4560: Network paths from the second set of clients 2640 to a second exchange facility 3720(1), labeled $X_1$
4570: Network path from client $C_3$ to $X_1$
4580: Network path from $P_0$ to $X_0$
4581: Network path from $P_0$ to $X_1$
4590: Network path from $P_1$ to $X_0$
4591: Network path from $P_1$ to $X_1$
4600: Transaction control table of the system of FIG. 37
4610: Task permission from grantor $P_0$ to grantee $C_7$
4620: Task permission from grantor $P_1$ to grantee $C_8$
4630: Task permission from grantor $C_2$ to grantee $C_8$
4700: Task handling at an exchange
4710: Exemplary particulars of a task
4720: Task queue
4730: Processing unit of a cloud hosting an exchange
4740: Result queue
4800: Exchange structure
4810: Network interface of an exchange
4820: Collaboration software module
4830: Software library belonging to provider $P_0$
4831: Software library belonging to provider $P_1$
4840: A security-control data structure holding current permissions, from providers and clients, occupying a memory space of a cloud
4850: Tasks in progress
4860: Task-tracking data
4880: Data-Storage space of an exchange
4890: A hardware processor or a set of hardware processors operating concurrently in a parallel arrangement or a pipelined arrangement (belonging to a cloud hosting the exchange)
4900: A first scheme of realizing secure software services
4910: Request from client 2640(1), labeled client-1, of the Single-Provider Secure Software-Service Network (SPSSSN) 3500 to provider 2610 to perform a specific task
4920: Raw data from client-1 to a selected exchange 3520(0), labeled $X_0$, with which both client-1 and provider 2610 have respective accounts
4930: UDFs, with an embedded encryption key, as well as an identifier of client-1, sent from client-1 to exchange $X_0$
4940: A process of applying the UDFs to raw data 4920 to produce a result defined in the specific task; the process is performed at exchange $X_0$ using the collaboration software module 3620
4950: The result
4960: A list of identifiers of clients of exchange $X_0$, including client 2640(2), labeled client-2, that are eligible to access result 4950

4971: A message from client-1 to exchange $X_0$ requesting access to result 4950, based on the identifier of client-1
4972: Delivered copy of result 4950
4981: A message from client-2 to exchange $X_0$ requesting access to result 4950, based on the identifier of client-2
4982: Delivered copy of result 4950
5000: A second scheme of realizing secure software services
5030: UDFs, with an embedded encryption key sent from client-1 to exchange $X_0$
5032: Encryption key sent, in any form, from provider 2610 to client-1
5034: The encryption key sent from client-1 to client-2
5071: A message from client-1 to exchange $X_0$ requesting access to result 4950, based on the encryption key
5081: A message from client-2 to exchange $X_0$ requesting access to result 4950, based on the encryption key
5100: A third scheme of realizing secure software services
5171: A message from client-1 to exchange $X_0$ requesting access to result 4950, based on the identifier of client-1 and the encryption key
5181: A message from client-2 to exchange $X_0$ requesting access to result 4950, based on the identifier of client-2 and the encryption key
5200: A multi-provider secure software-service network
5210: Software provider of software applications

DETAILED DESCRIPTION

FIG. 1 is an overview 100 of a query-processing system comprising a query engine 120 configured to access a database 140 storing identifiers and descriptors of a plurality of objects and storage of a plurality of key-specific sets 160 of object identifiers. The query engine 120 configured to receive a query 110 from a client and return a list 180 of target objects of the plurality of objects. The query engine 120 employs at least one hardware processor for performing the processes described in the disclosure.

Figure 2:
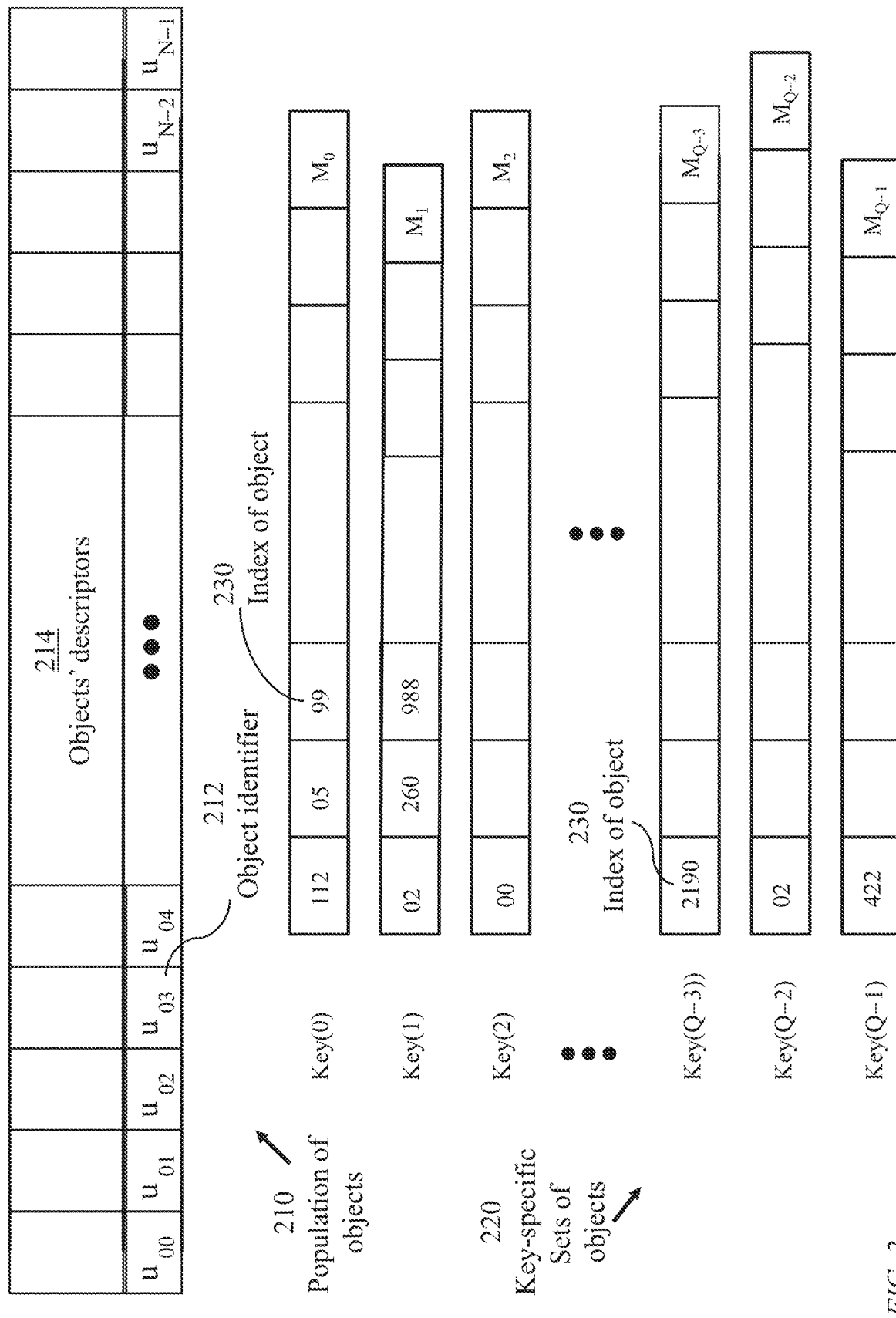
FIG. 2 illustrates the plurality of objects and the key-specific sets, for use in an embodiment of the present invention.

FIG. 2 illustrates the plurality of objects and the key-specific sets of objects 220. The plurality of objects comprises N objects, indexed as 0 to (N−1), labeled $u_0$ to $u_{N-1}$. Database 140 stores an identifier 212 and descriptors 214 of each object. Storage 160 contains data relevant to Q key-specific sets of objects. The storage maintains for each key-specific set an array of respective object indices 230. The number N of objects may be of the order of a billion and the number Q of key-specific sets may be of the order of several millions.

Figure 3:
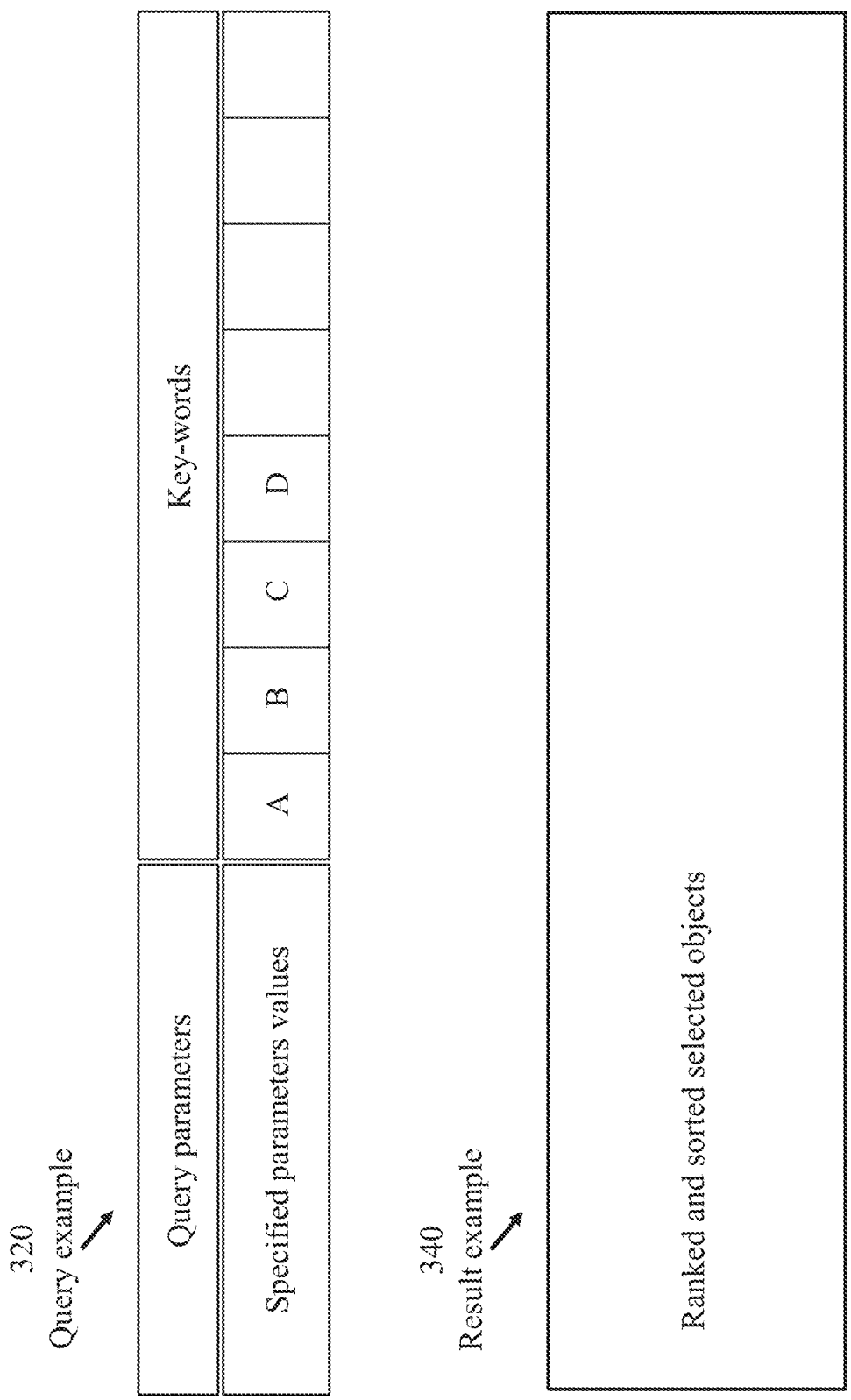
FIG. 3 illustrates an exemplary query.

FIG. 3 illustrates an exemplary query 320 indicating predefined query parameters and respective specified values as well as a number of search keywords. The query engine provides a response 340 indicating relevant objects ranked according to a level of relevance.

Figure 4:
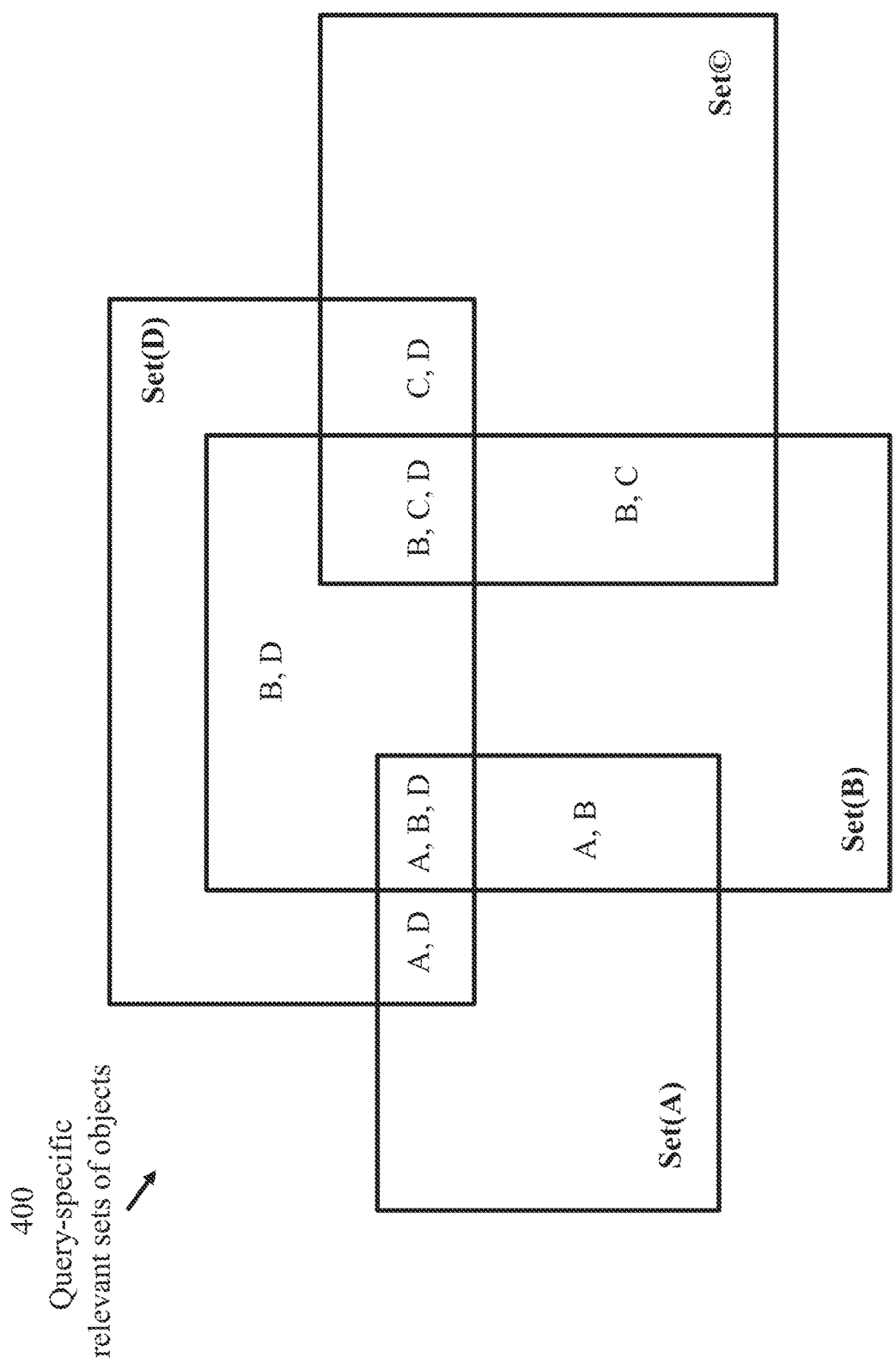
FIG. 4 illustrates four key-specific sets of objects.
Figure 5:
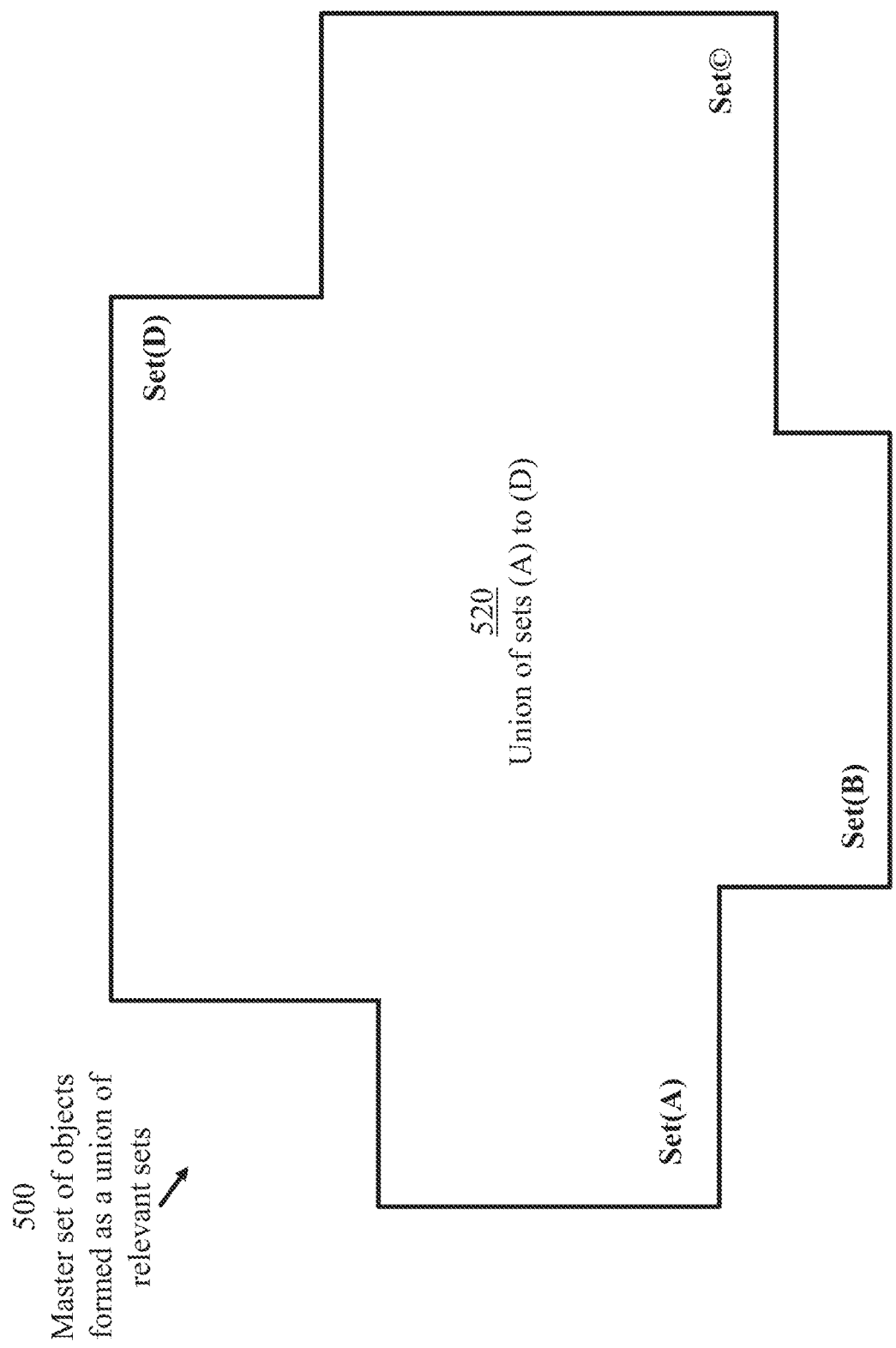
FIG. 5 illustrates a master set of objects formed as a union of four sets of objects, in accordance with an embodiment of the present invention.
Figure 6:
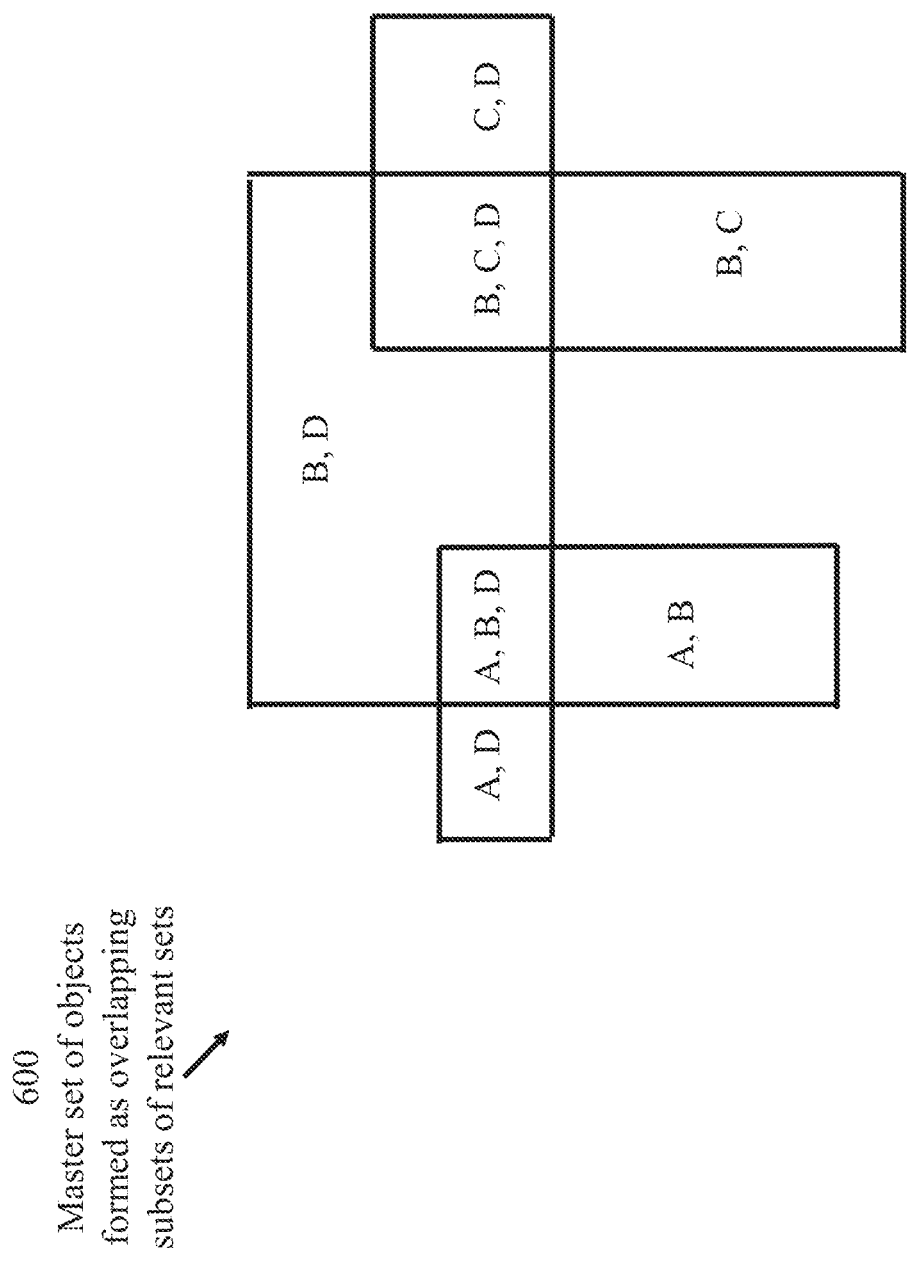
FIG. 6 illustrates a master set combining all overlapping subsets of the four sets of objects, in accordance with an embodiment of the present invention.

FIG. 4 illustrates four key-specific sets of objects, denoted "A", "B", "C", and "D" corresponding to keywords stated in a specific query. A master set is determined based on the contents of the four key-specific sets. FIG. 5 illustrates a master set 500 based on the union 520 of the four sets. FIG. 6 illustrates a master set combining all overlapping subsets of the four sets.

FIG. 7 illustrates processes 700 of generating a response to a specific query. A process 720 of coarse filtering selects a number Θ of candidate key-specific sets 730 from the Q key-specific sets 710 based on an initial screening process to eliminate any key-specific set that is unlikely to be relevant to the query. This is based on the size of a key-specific set under consideration or a high probability of dissimilarity to the master set. Either of two techniques, illustrated in FIG. 8 and FIG. 25, may be used for coarse filtering. The number Θ of candidate key-specific sets would be orders of magnitude smaller than the total number Q of sets. A process 740 of fine filtering selects a number ν of eligible key-specific sets 750 from the Θ candidate sets 730 according to a stringent, computationally intensive, screening process. It is noted that while process 740 is computationally intensive, it is applied to a much smaller number of key-specific sets (Θ<<Q). The number ν of eligible key-specific sets is, in turn, much smaller than Θ. The ν eligible key-specific sets are ranked according to levels of similarity to the master set and sorted in order for clear interpretation.

Figure 8:
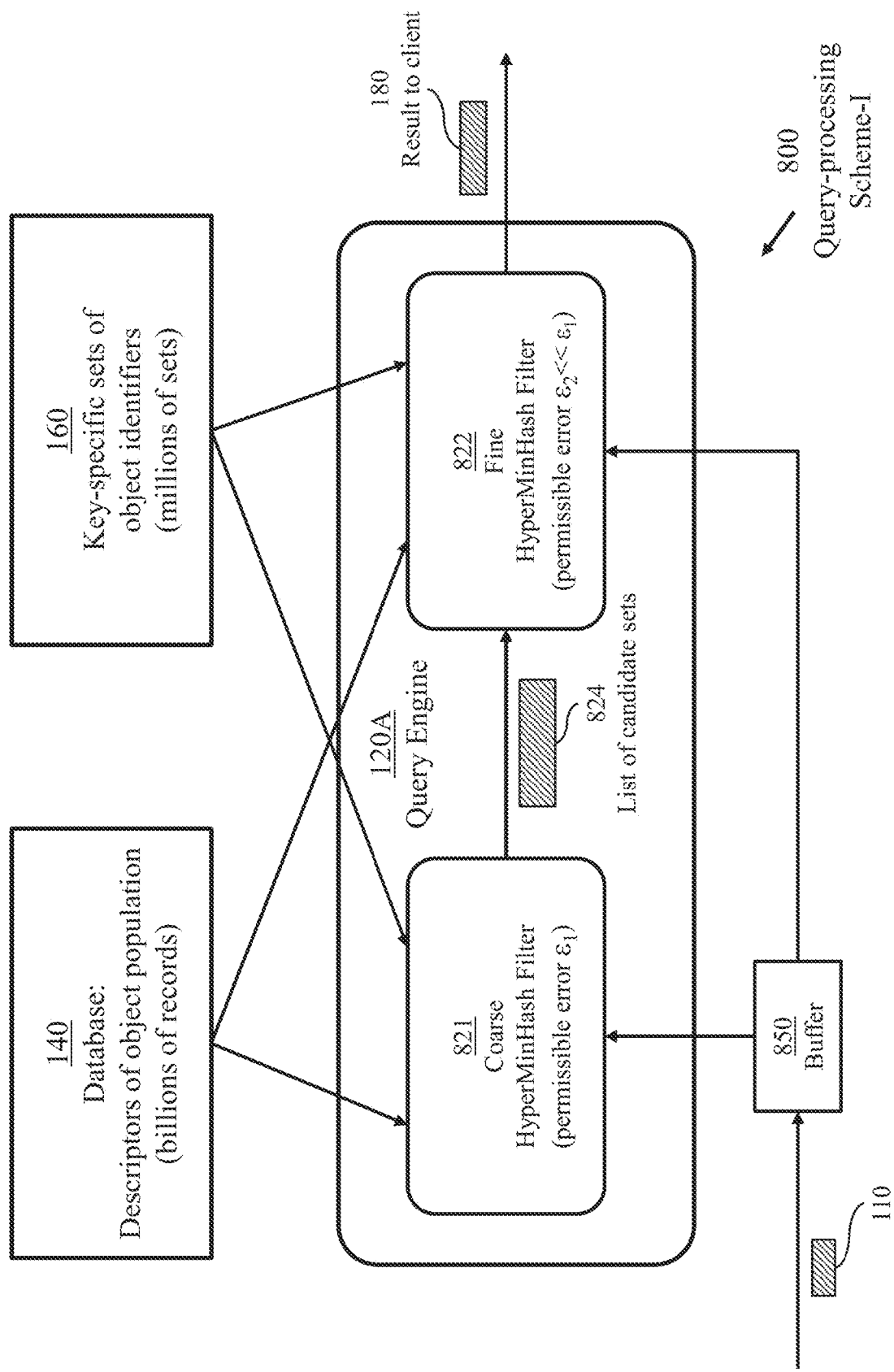
FIG. 8 illustrates a first implementation of the query-processing system of FIG. 1, in accordance with an embodiment of the present invention.

FIG. 8 illustrates a first implementation 800 of the query-processing system of FIG. 1. A HyperMinHash filter 821 implements the coarse-filtering process 720. Filter 821 determines a level of similarity of each of the Q key-specific sets 710 to the master set based on applying the HyperMinHash algorithm with a relatively high permissible error $\varepsilon_1$. Filter 821 produces a list 824 of candidate key-specific sets corresponding to the Θ candidate sets 730 of FIG. 7. Filter 822 determines a level of similarity of each of the Θ key-specific sets 730 to the master set based on applying the HyperMinHash algorithm with a permissible error £2, which is much smaller than $\varepsilon_1$. Filter 822 produces the ν eligible key-specific sets which is processed within the query engine 120A (implementing the ranking-sorting process 760) to produce result 180 which includes selected objects 770 of FIG. 7.

Figure 9:
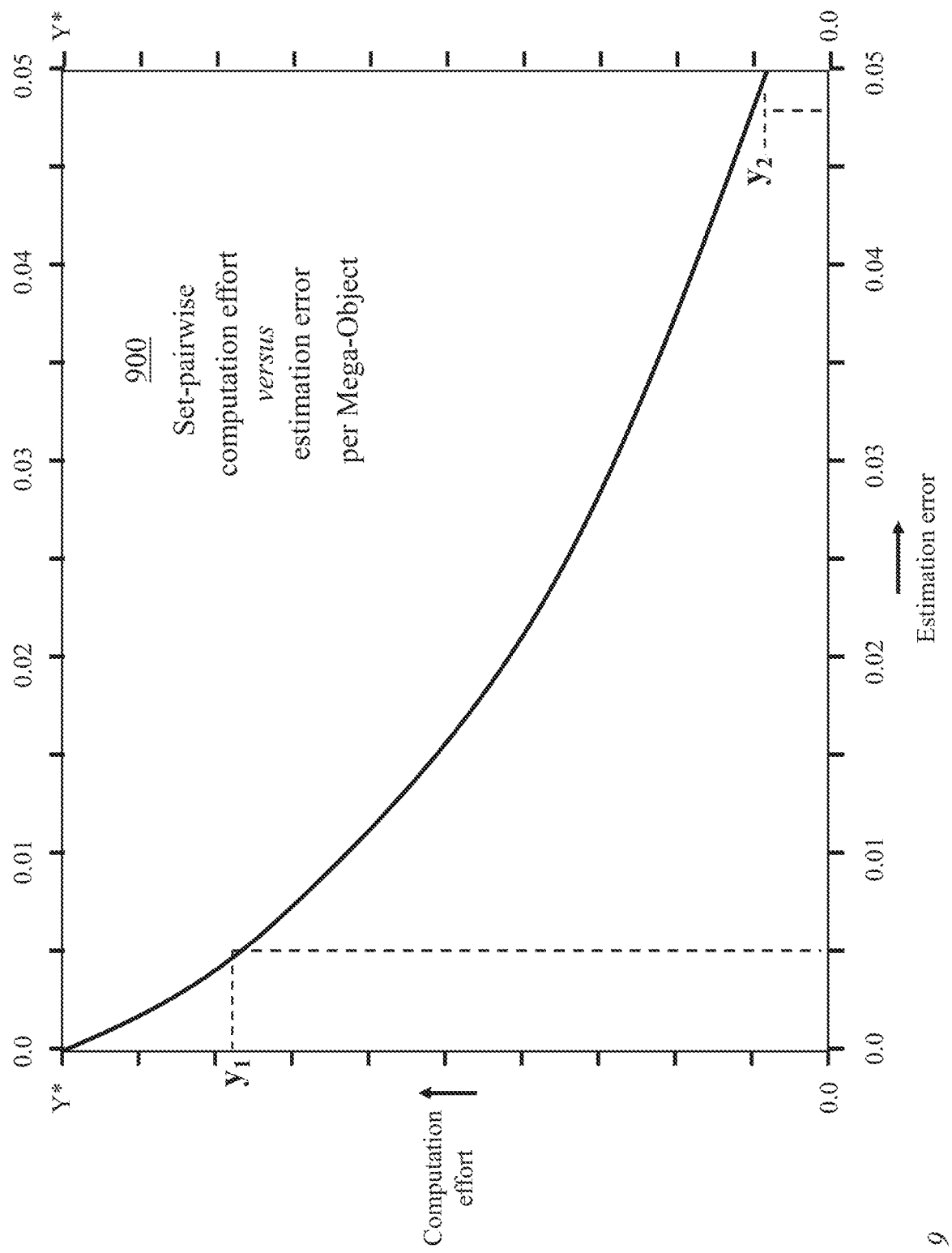
FIG. 9 illustrates dependence of requisite processing effort for determining a coefficient of similarity of two sets of objects on permissible estimation error.

FIG. 9 illustrates dependence 900 of requisite processing effort for determining a coefficient of similarity of two sets of objects on permissible estimation error. Naturally, the computation effort depends on the total number of objects of the two sets. A hypothetical total number of one mega object may be used. The coefficient of similarity may be defined as the ratio of the number of common objects in the two sets to the number of objects of the union of the two sets. This ratio can be determined exactly, hence with an estimation error of zero. However, the requisite computation effort may be excessive. Methods of approximating the ratio to reduce the computation error are known. The computation effort for implementing approximate coefficient of similarity typically decreases significantly as the permissible estimation error increases. As illustrated in FIG. 9, the computation effort, denoted $E_1$, needed for determining a similarity coefficient with a permissible error of 0.005 is significantly larger than the computation effort, denoted $E_2$, needed for determining a similarity coefficient with a permissible error of 0.05. This property may be exploited to avoid unnecessary computations in a process of determining individual similarity coefficients of a large number (one million for example) of key-specific sets to a master set. In an initial coarse filtering process 720 (FIG. 7) the similarity coefficient of each of Q key-specific set to the master set may be determined with a permissible error of 0.05, for example. This results in weeding out a large proportion of the key-specific sets as being unlikely to bear any significant similarity to the master set. Thus, starting with one million key-specific sets (Q=1000000), the number Θ of candidate-sets 730 (FIG. 7) corresponding to a relatively large permissible error, may be of the order of 1000. Now, in a fine filtering process 740 (FIG. 7) the similarity coefficient of each of the Θ candidate key-specific sets to the master set may be determined with a much smaller permissible error of 0.005, for example, or may even be determined exactly as illustrated in FIG. 25.

The total computation effort for performing fine filtering process of all key-specific sets is $Q\times E_1$. The total computation effort for performing the initial coarse filtering process is $Q \times E_2$. The total computation error for performing the fine filtering process is $\Theta \times E_1$. Typically, $E_2 \ll E_1$, and with a relatively large permissible error, $\Theta \ll Q$. Thus, $(Q \times E_2 + \Theta \times E_1) \ll Q \times \varepsilon_1$.

Figure 10:
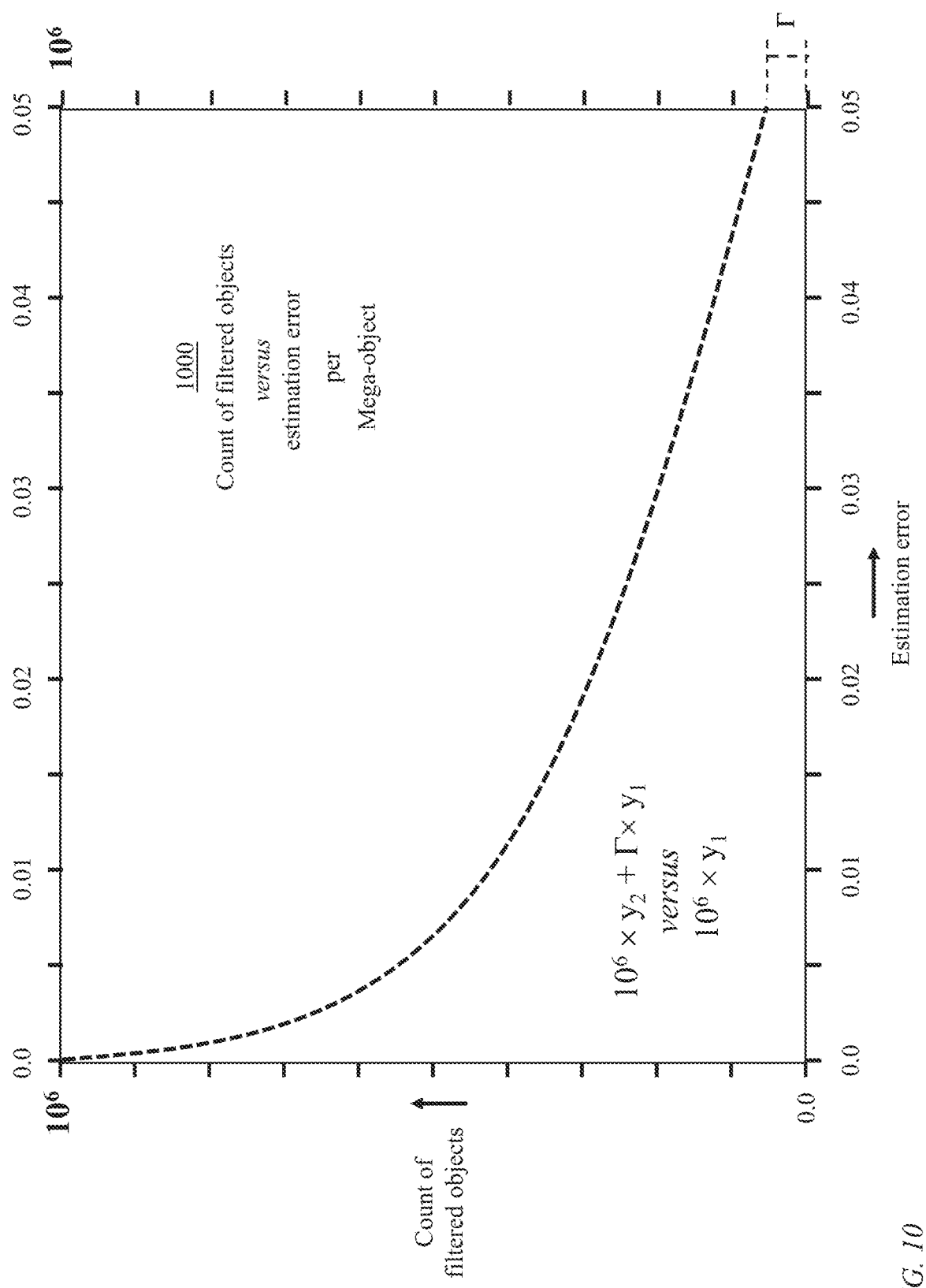
FIG. 10 illustrates dependence of the number of candidate-sets on the permissible estimation error.

FIG. 10 illustrates variation 1000 of the number $\Theta$ of candidate sets as the permissible error is varied between 0.0 and 0.05. Naturally, zero permissible error implies that no filtering process takes place and the number of candidate sets equals the total number Q of key-specific sets.

Figure 11:
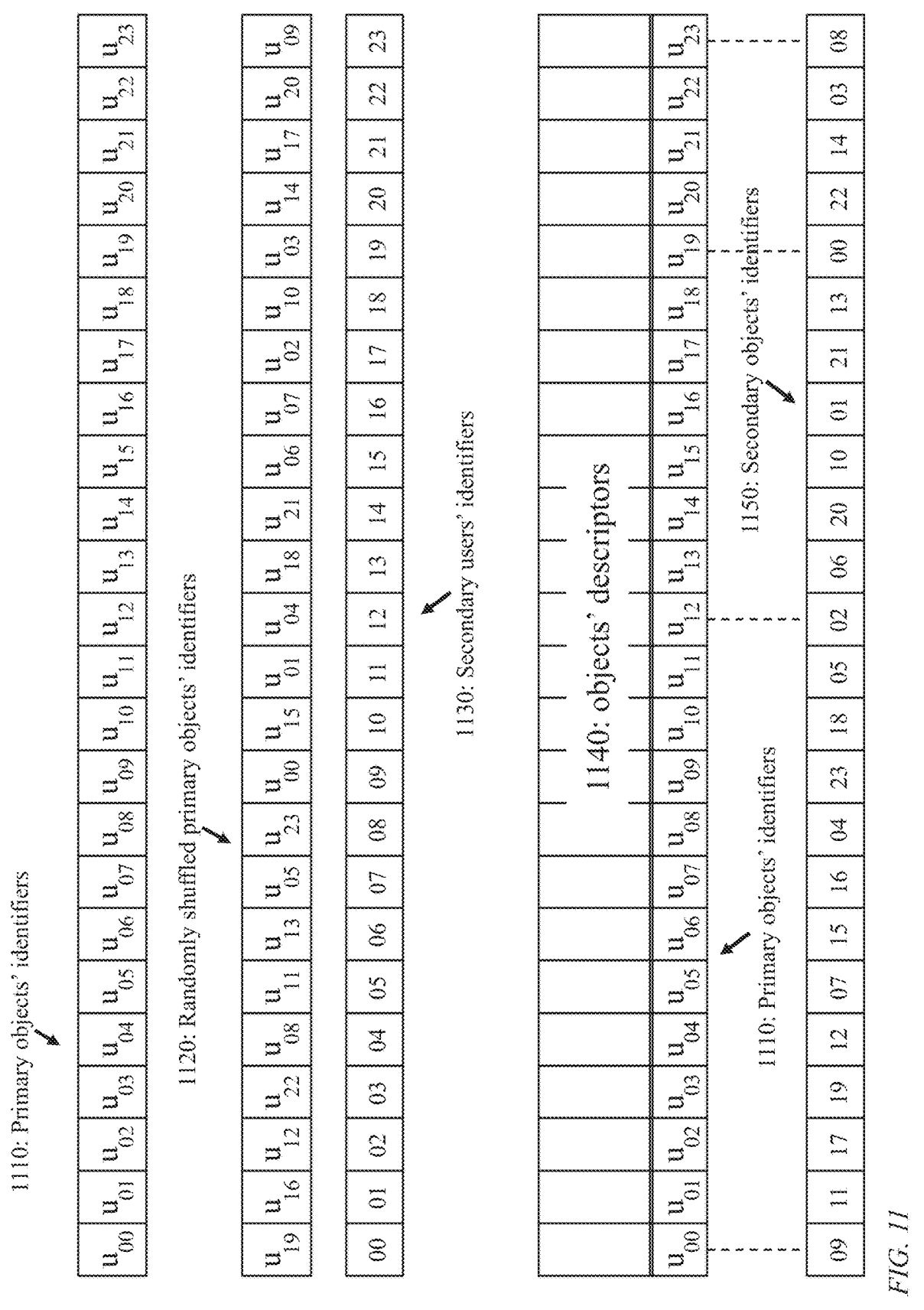

FIG. 11 illustrates exemplary random shuffling and identifier translation of the plurality 210 of objects of FIG. 2 with N=24. Objects of array 1110 of primary (raw) object identifiers, labelled $u_0$ to $u_{23}$, are logically randomly shuffled and placed in array 1120 in the order $u_{19}, u_{16}, \ldots, u_{09}$. For example, the object of primary object identifier $u_{19}$ is the first selected object and is placed in the first position of array 1130, the object of primary object identifier $u_{16}$ is second selected object and placed in the second position of array 1130, and so in.

The logically shuffled identifiers are translated into secondary object identifiers 0, 1, . . . , 23 (reference 1130). Based on the shuffled pattern of arrays 1120 and 1130, translation array 1150 is generated to indicate for the index of each primary (raw) identifier in array 1110 a translated (secondary) identifier. Thus, primary identifier $u_{00}$ is translated to secondary identifier 09 of the same object. Primary identifier $u_{19}$ is translated to secondary identifier 0 of the same object. The secondary identifier of an object is basically the rank of the object in the logically shuffled array of objects. Array 1130 serves as an inverse translator of secondary identifiers to respective primary (raw) identifiers. Inverse translation is needed for reporting results of a query to a client initiating the query. At least one object descriptor 1140 of each object is stored in database 140 (FIG. 1). Consequently, the primary identifier of each object of each of the Q key-specific sets of objects 220 (FIG. 2) is translated into a respective secondary identifier.

Figure 12:
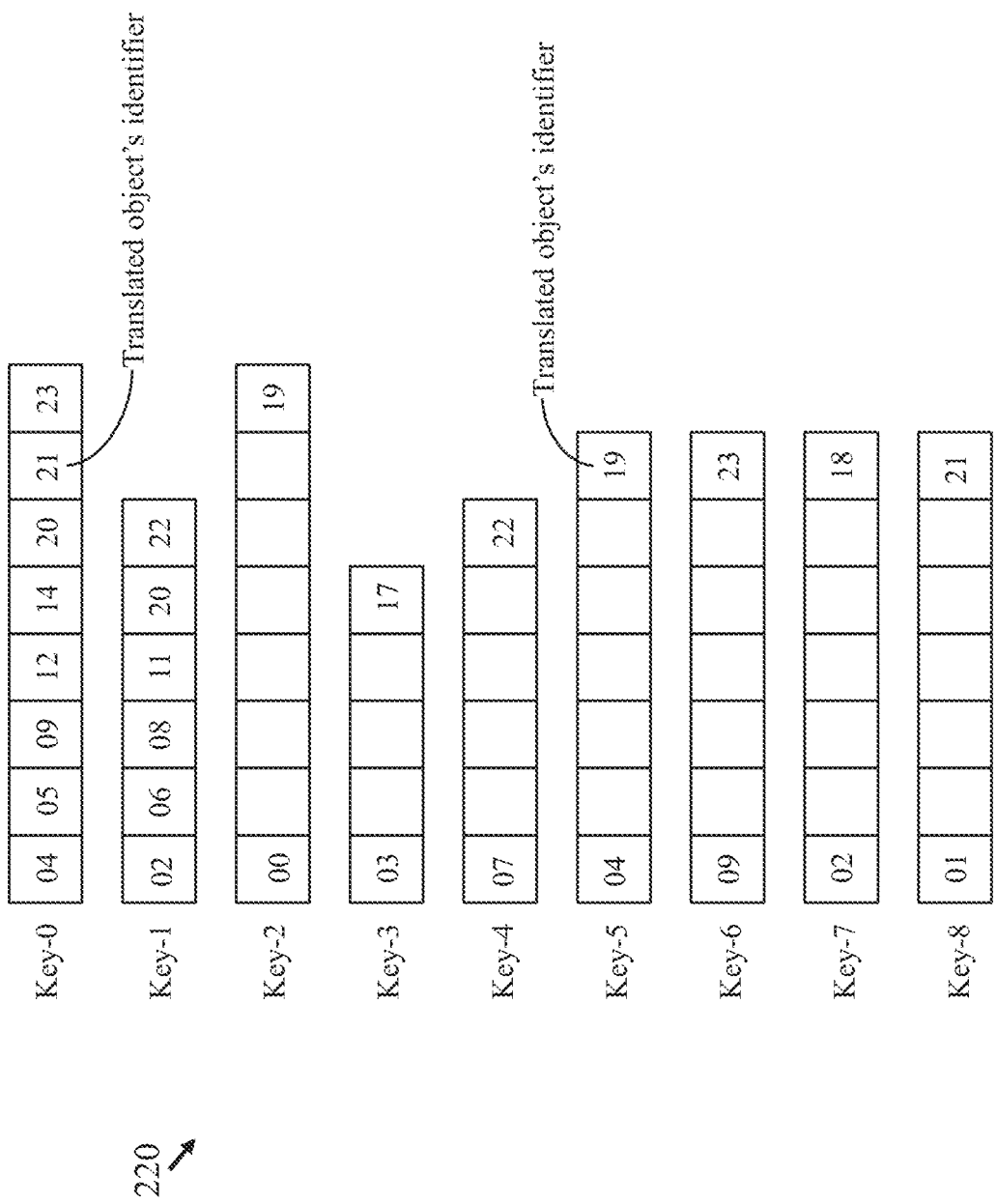
FIG. 12 illustrates exemplary key-specific sets of objects.

FIG. 12 illustrates exemplary key-specific sets 1210 of objects for the special case of Q=9 and N=23. Each key-specific set 1210 contains translated (secondary) object identifiers 1220 sorted in an ascending order.

Figure 13:
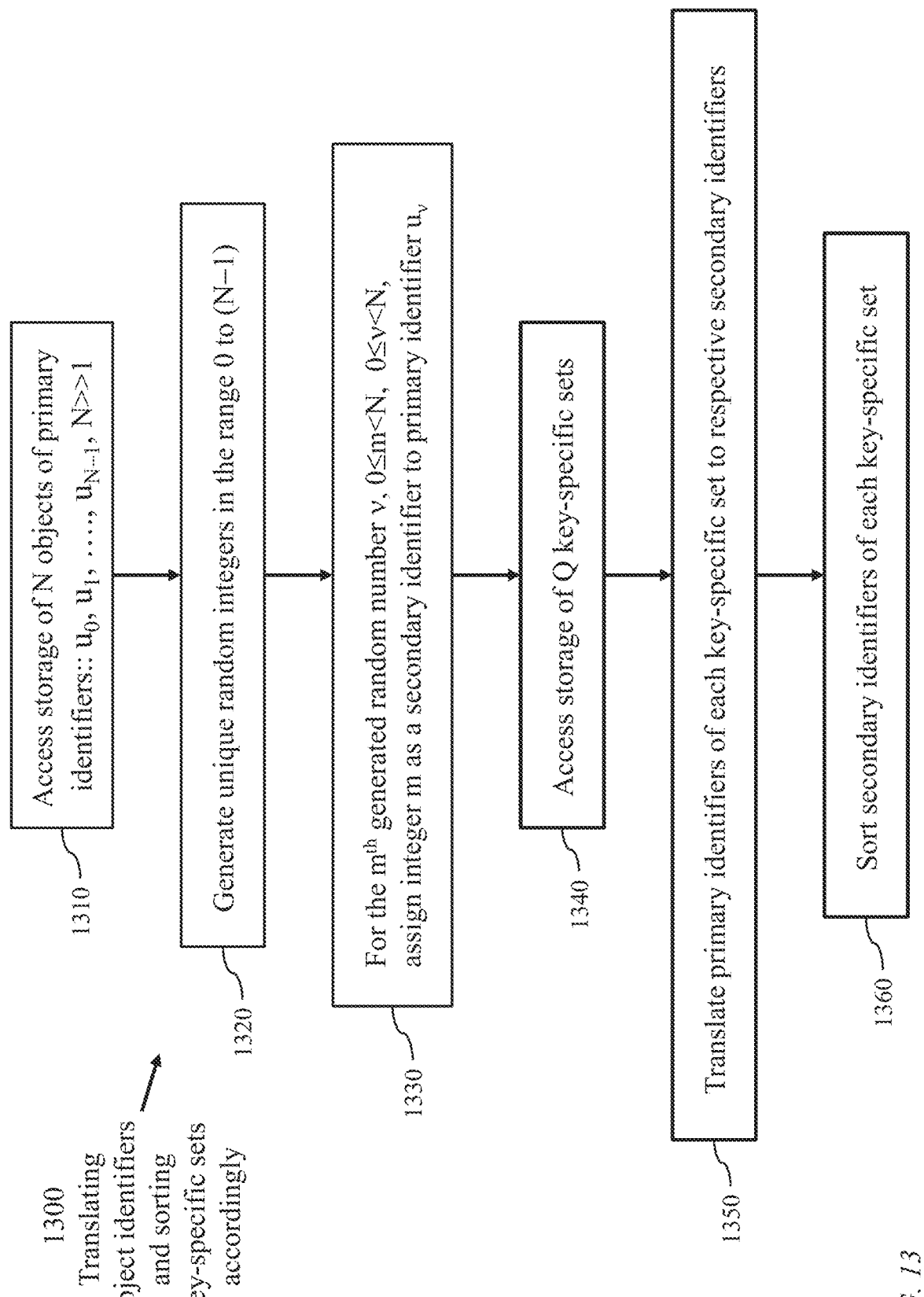
FIG. 13 illustrates object-identifier translation based on the scheme of random shuffling of FIG. 11 and key-specific sets of objects of FIG. 12, in accordance with an embodiment of the present invention.

FIG. 13 details processes 1300 of object-identifier translation based on the data structures of FIG. 11 and FIG. 12. Process 1310 accesses a storage 140 of the N objects 210 identified as $u_0, u_1, \ldots, u_{N-1}$ and indexed as 0 to (N-1). Process 1320 generates unique random integers in the range 0 to (N-1). Let $v$, $0 \le v < N$, be the $m^{th}$ generated random number, $0 \le m < N$. The number m is hereinafter considered the rank of the object of index $v$. Thus, each object of the plurality of object is assigned a rank (process 1330). The rank of an object is conveniently considered a translated identifier (a secondary identifier) of the object.

Process 1340 accesses storage 160 of the Q key-specific sets 220. Process 1350 translates the raw identifiers (the primary identifiers) of objects of each key-specific set to corresponding secondary identifiers. Process 1360 sorts the secondary identifiers of objects of each key-specific set in an ascending order.

Figure 14:
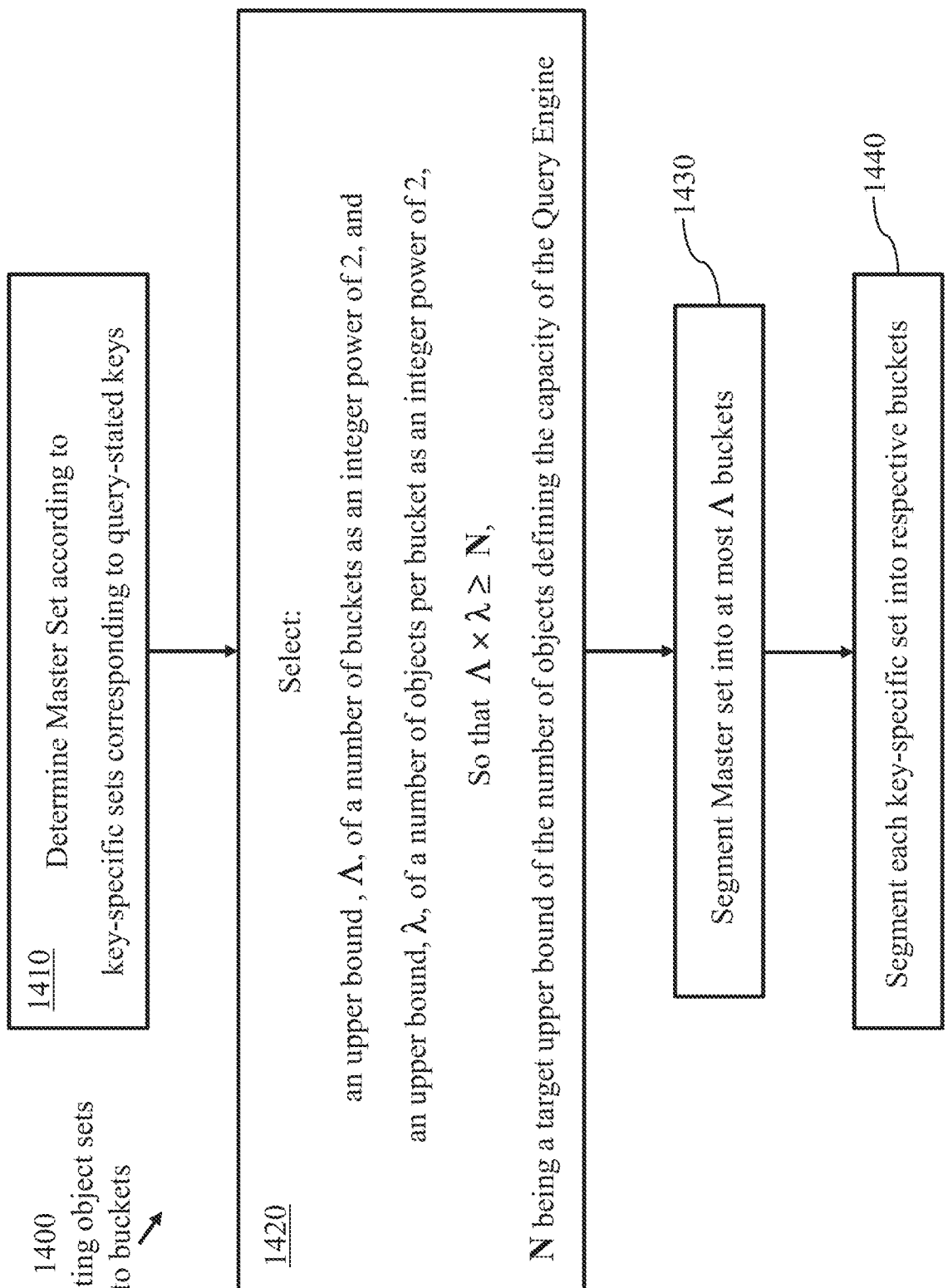
FIG. 14 illustrates processes of segmenting object sets into a specified upper bound of a number of buckets, in accordance with an embodiment of the present invention.

FIG. 14 illustrates processes 1400 of segmenting object sets, including a master set and the Q key-specific sets, into a specified upper bound, $\Lambda$, of a number of buckets, indexed as 0 to $(\Lambda-1)$, where a bucket of index J, $0 \le J < \Lambda$, contains objects within a respective range for each object set. Process 1410 determines a master set according to key-specific sets corresponding to keys stated in a query as illustrated in FIGS. 3 to 6.

Process 1420 selects the upper bound $\Lambda$ as an integer power of 2 and selects an upper bound, $\lambda$, of a number of objects within a bucket as a power of 2. The selection of $\Lambda$ and $\lambda$ is based on a target upper bound of a number N of objects that the query engine is expected to handle. Generally, $\Lambda \times \lambda \ge N$. In the case where $\Lambda \times \lambda > N$, some buckets may be empty. Also, since each of the Q key-specific sets contains a number of objects that is generally less than N, with some key-specific sets each containing a number of objects that is substantially smaller than N, several bucket of a key-specific set may be empty.

For example, with N=1,000,000,000 objects and $\lambda=2^{16}=65536$, the N objects would be segmented into at most $\lceil N/\lambda \rceil = 15259$ buckets (indexed as 0 to 15258). With $\Lambda$ selected to be $2^{14}=16384$, and the N objects are ranked as 0 to (N-1), buckets of indices 15259 to 16383 (a total of 1125 buckets) would be empty until the number of objects increases.

Process 1430 segments the master set into at most $\Lambda$ buckets. Process 1440 segments each key-specific set into respective buckets. The buckets of the master set may then be compared with counterpart buckets of each of the Q key-specific sets. A bucket of index J of the master set is compared with a bucket of the same index J of a key-specific set under consideration, $0 \le J < \Lambda$.

Figure 15:
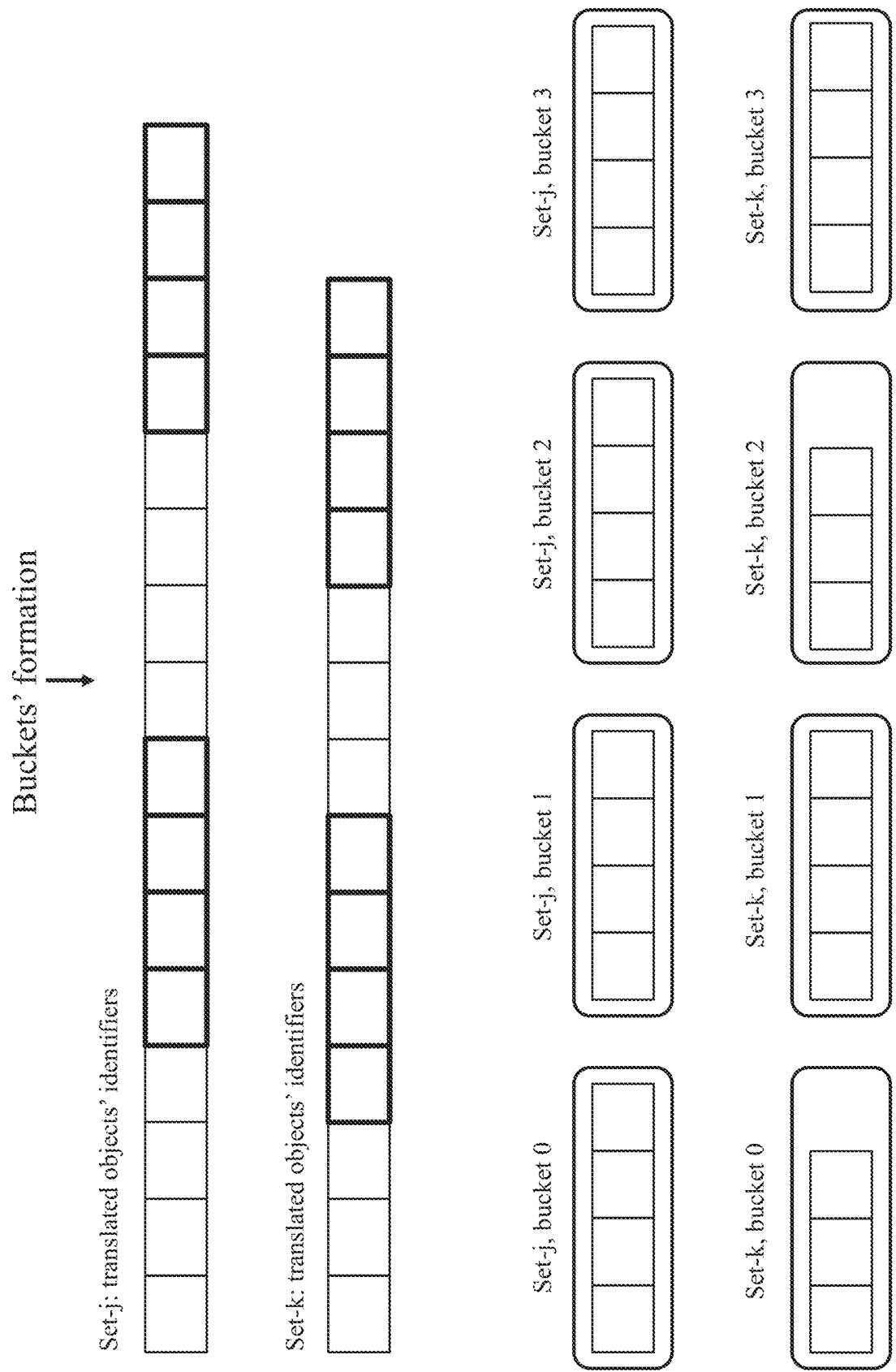
FIG. 15 illustrates an exemplary scheme of segmenting sets of objects into buckets applied to a first set of translated object identifiers and a second set of translated object identifiers, in accordance with an embodiment of the present invention.

FIG. 15 illustrates an exemplary scheme 1500 of segmenting sets of objects into buckets applied to a first set 1510 of translated object identifiers and a second set 1520 of translated object identifiers. The first set 1510 is segmented into four buckets 1550, individually identified as 1550(0) to 1550(3). The second set 1520 is segmented into four buckets 1560, individually identified as 1560(0) to 1560(3).

Figure 16:
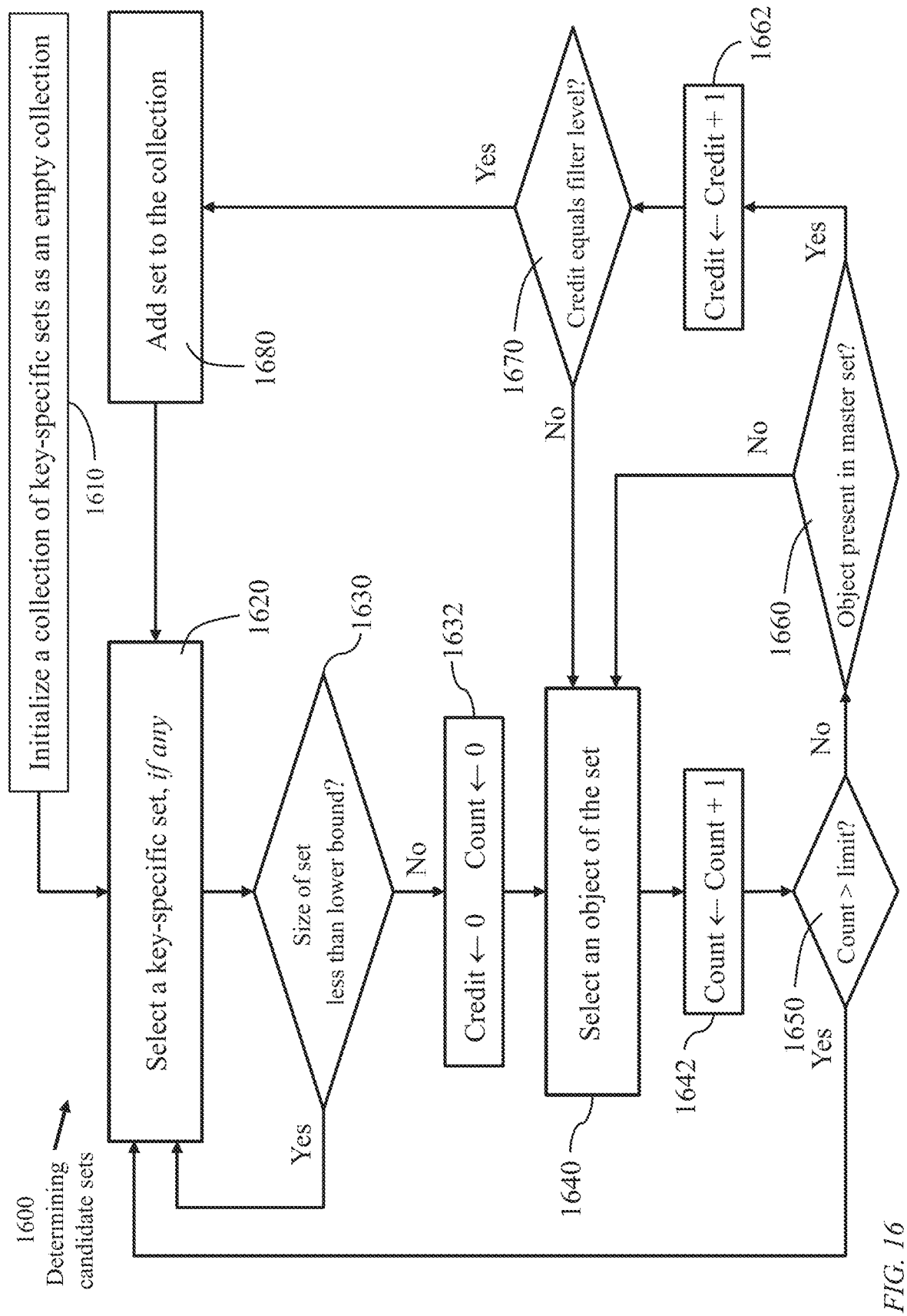
FIG. 16 illustrates a method of determining candidate key-specific sets of objects, in accordance with an embodiment of the present invention.

FIG. 16 illustrates a method 1600 of determining candidate key-specific sets of objects (730, FIG. 7). A collection of candidate sets is initialized as an empty collection (process 1610).

Process 1620 considers a key-specific set (process 1620) from the Q key-specific sets 220 maintained in storage 160. The process terminates when each of the Q key-specific sets is considered. The size (cardinality) of each key-specific set is known. If the size of a key-specific set under consideration is less than a predetermined size lower bound, process 1630 revisits process 1620 to consider another key-specific set, if any. Otherwise process 1632 initializes a sampling count as zero and an intersection credit as zero. Process 1640 selects an object at random from the set under consideration and process 1642 increase the sampling count. If the count has already exceeded a predetermined sampling limit, process 1650 revisits process 1620 to consider another key-specific set, if any. Otherwise, process 1660 determines whether the object selected in process 1640 is present in the master set. If the object is not found in the master set, process 1660 revisits process 1640 to randomly select another object. Otherwise, process 1662 increases the intersection credit. Process 1670 determines whether the accumulated credit is sufficient to promote the set under consideration to a candidate set to be further subjected to the fine filtering process 740 (FIG. 7). If the accumulated credit is not sufficient, process 1640 is revisited to randomly select another object. Otherwise, if the credit is sufficient, process 1680 adds the set under consideration to the collection of candidate sets. When all of the Q key-specific sets are considered, the outcome is a collection 730 of $\Theta$ candidate sets to be further subjected to more stringent filtering conditions in process 740.

Figure 17:
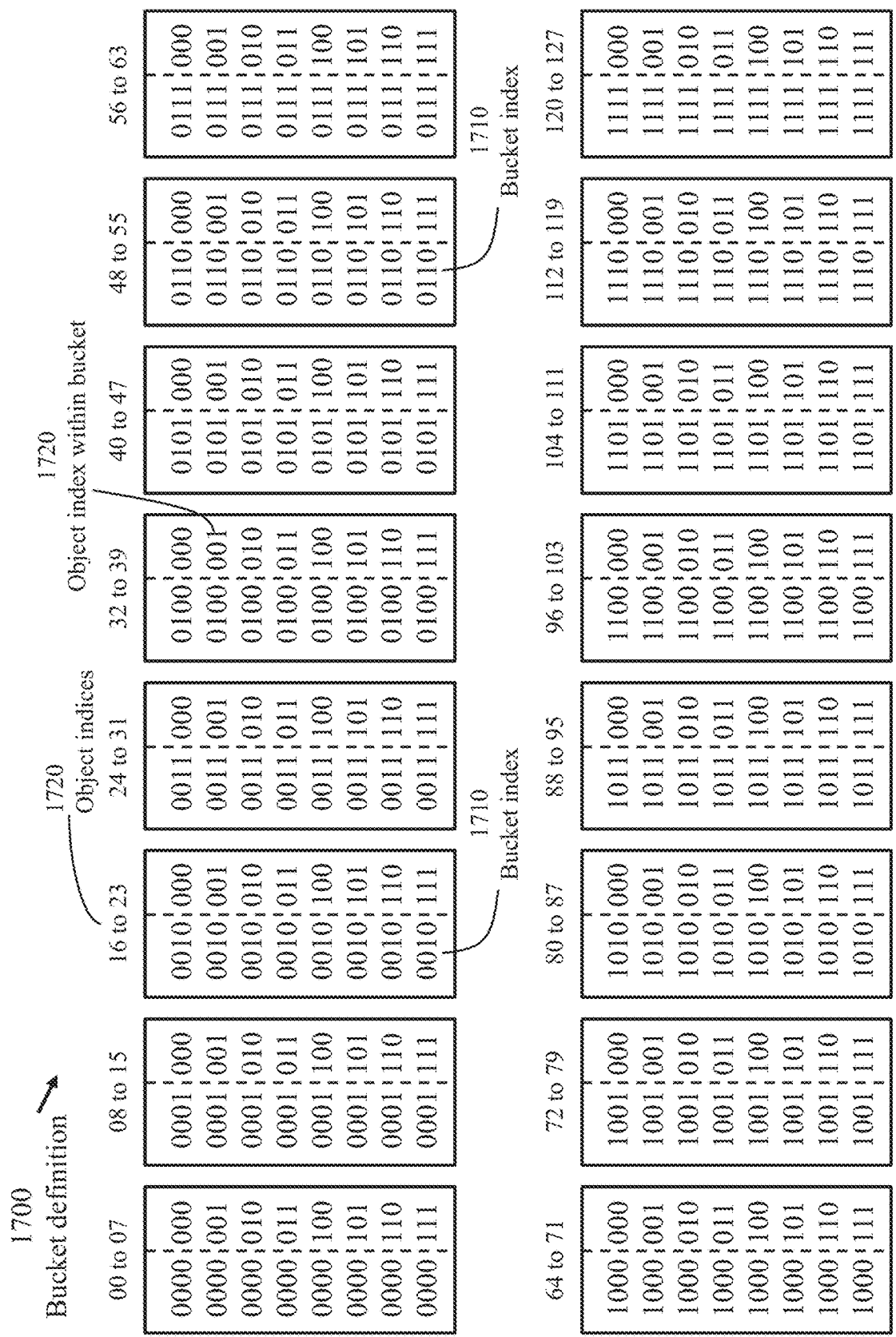
FIG. 17 illustrates an implementation of processes of FIG. 14 for selecting a number of buckets and contents per bucket, in accordance with an embodiment of the present invention.

FIG. 17 illustrates an implementation 1700 of process 1420 (FIG. 14) for selecting a number of buckets and contents per bucket. Consider a relatively small number N of objects of 90, for example. To select both the upper bound λ of the maximum number of objects per bucket and the upper bound Λ of the number of buckets to be integer powers of 2, the number N is increased to N*, the nearest integer power of 2, which is $2^7$. Selecting λ to be 8, then the upper bound Λ of the number of buckets is $2^4$. Since the current size N is only 90, which would occupy buckets of indices 0 to 11, the four buckets of indices 12 to 15 will be empty until N increases to more than 96. Thus, an object of a translated identifier (secondary identifier) k, 0≤k<N, would be assigned to position y (1730) of a bucket of an index x, where x is the most significant four bits of the binary representation of k and y is the least significant three bits of the binary representation of k. Thus, all objects of translated identifiers 1720 [0 to 7] are assigned to a bucket of index 0 (1710, "0000") and all objects of translated identifiers 1720 [80 to 87] are assigned to a bucket of index 10 (1710, "1010").

Figure 18:
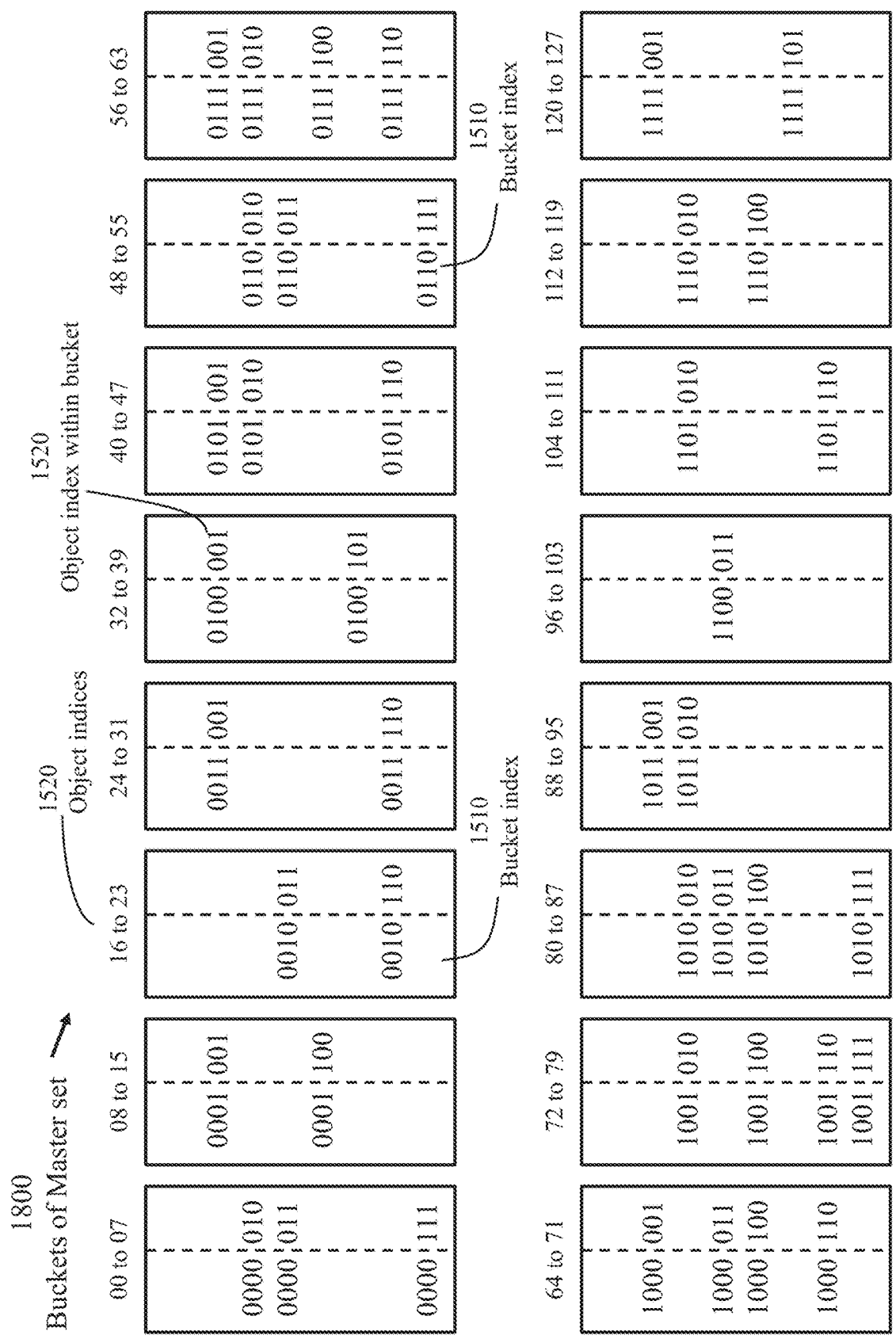
FIG. 18 illustrates an example of buckets of a master set of objects of translated identifiers.
Figure 19:
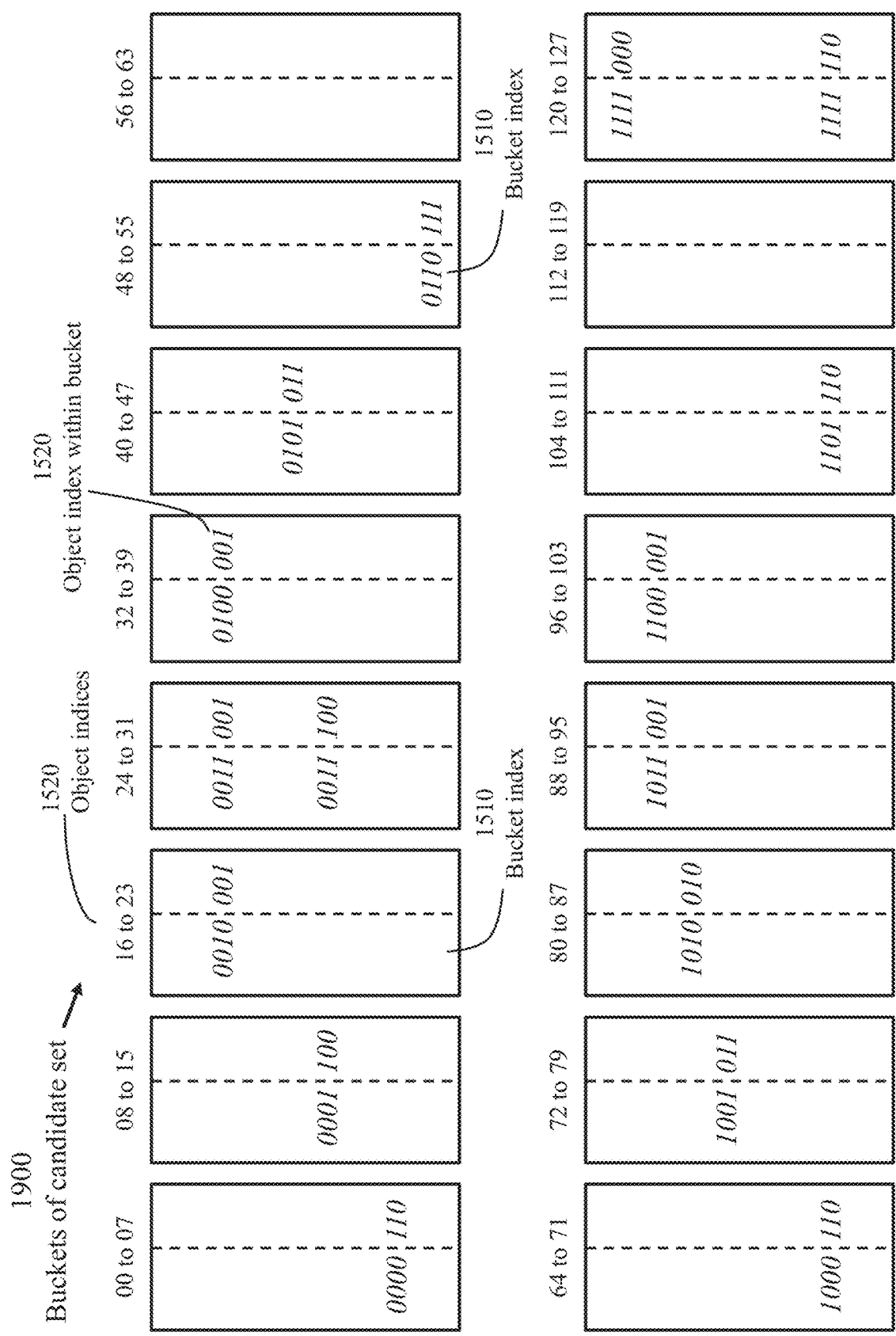
FIG. 19 illustrates another example of buckets of a key-specific set under consideration containing translated identifiers.

The illustrated buckets of FIG. 18 and FIG. 19 correspond to a case where N=128, Λ=16, and λ=8. hence any of the 16 buckets may contain objects.

FIG. 18 illustrates buckets of a master set of objects of translated identifiers {2, 3, 7, 9, 12, 19, 22, 25, 30, 33, 37, 41, 42, 46, 50, 51, 55, 57, 58, 60, 62, 65, 67, 68, 70, 74, 76, 78, 79, 82, 83, 84, 87, 89, 90, 99, 106, 110, 114, 116, 121, 125}.

FIG. 19 illustrates buckets of a key-specific set under consideration containing translated identifiers {6, 12, 17, 25, 28, 33, 43, 55, 70, 75, 82, 89, 97, 110, 120, 126}.

Figure 20:
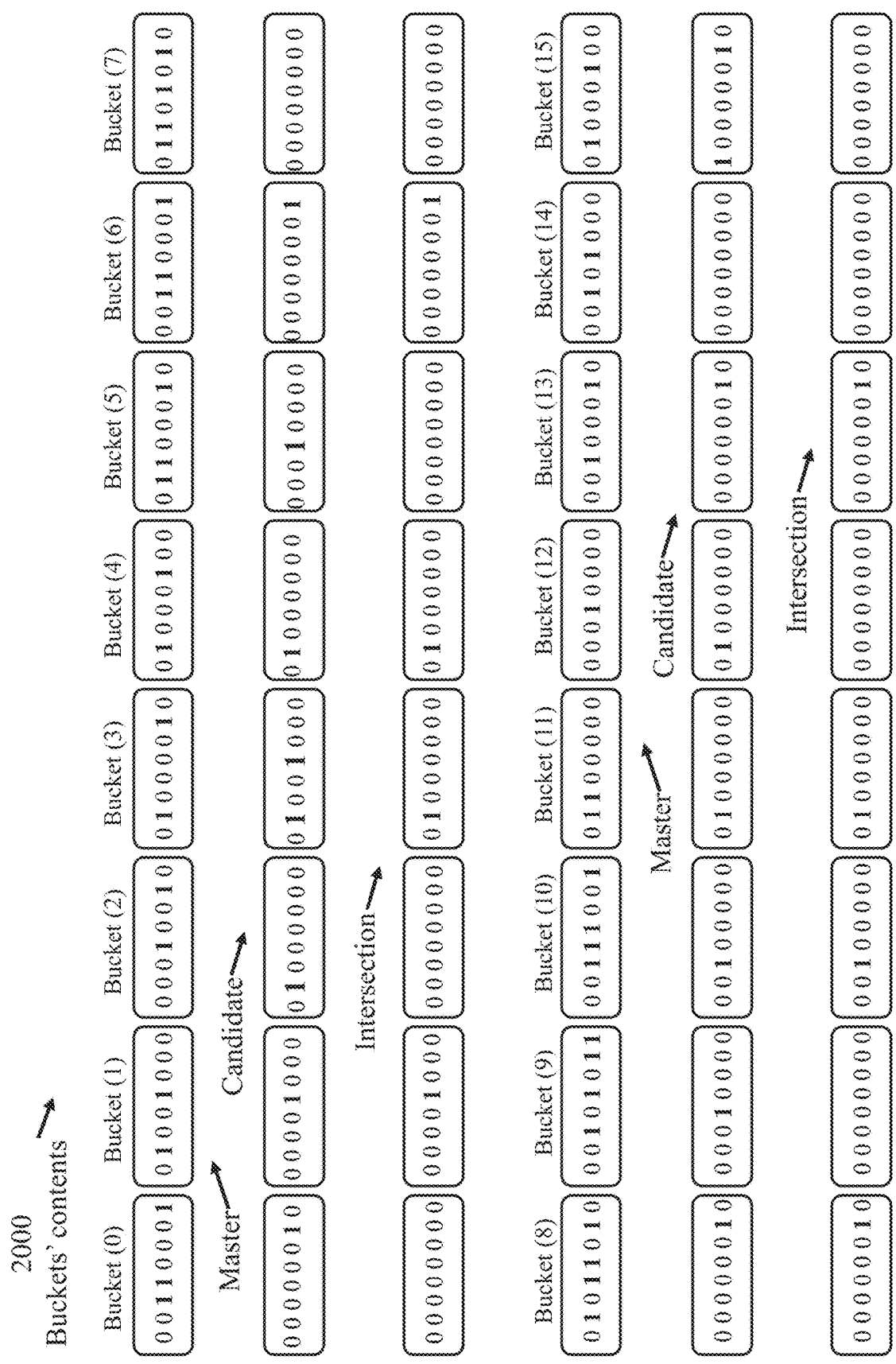
FIG. 20 illustrates buckets' content.

FIG. 20 illustrates buckets' content 2000. Bitmaps 2020 of the master set of FIG. 18 and bit maps 2040 of the key-specific set of FIG. 19 are illustrated where each object is represented as logical "1" at a respective position in a respective bucket. A logical "0" in a bit map indicates absence of a respective object. To determine a level of intersection of the key-specific set under consideration and the master set, the respective bit maps are ANDed, to produce intersection bitmaps 2060, starting with bucket-0 of each set, and a count of bits set to logical "1" of the ANDed result determines the level of intersection. With a large number of buckets, 65536, for example, counting the number of common objects, called credit as indicated in FIG. 16, starting with bucket-0, may be terminated when a target credit is reached. This early termination may be applied in the coarse filtering process 720 (FIG. 7).

FIG. 21 illustrates an implementation 2100, in accordance with an embodiment of the present invention, of the coarse filtering process 720 and the fine filtering process 740 of FIG. 7 based on use of the bitmaps of the master set and the key-specific sets. Process 2110 estimates a requisite sample size to realize a first level of intersection of a key-specific set and the master set. The first level may be selected to be a relatively small number, 1 to 5, for example, for the process of coarse filtering to weed out key-specific sets that are deemed to have low similarity to the master set.

Process 2120 applies the method of FIG. 16 with the parameter "limit" set to equal the requisite sample size determined in process 2110 and the parameter "first level" set to an integer of at least 1.

Process 2130 determines the exact intersection of each of the Θ candidate key-specific sets, resulting from application of the method of FIG. 16, with the master set based on ANDing all corresponding bits of the key-specific set under consideration and the master set. Process 2140 ranks individual candidate key-specific sets of the collection of Θ candidate sets according to respective levels of intersection with the master set. A concise result listing key-specific sets of highest levels intersection together with other insight content are communicated to the client initiating the query.

FIG. 22 illustrates a method 2200 of estimating a critical sample size. Let S be a key-specific set 220, FIG. 2, under consideration and S* be the master set of objects (FIG. 5 or FIG. 6). The cardinality |S| of set S is denoted p and the cardinality |S*| of master set S* is denoted q. The cardinality of the intersection χ is denoted r.

The probability that an unbiased observer randomly picks an object belonging to the union of S and S* that also belongs to the intersection χ is the Jaccard coefficient r/Ω.

If the observer picks a first object (any object) within S then randomly picks an object in S*, referenced as a "second object", the probability of the second object being the first object, i.e., the probability that the second object is within the intersection χ, is r/p.

Sampling the union S∪S* is herein referenced as the first sampling method while sampling set S (or generally, the smaller of two sets) is referenced as the second sampling method.

As illustrated in FIG. 20, corresponding buckets of the master set and the set under consideration are ANDed sequentially, i.e., bits representing presence ("1") or otherwise ("0") of an object in a respective set are inspected sequentially. The sequential inspection is equivalent to random sampling because the objects 212 of the universe 210 of objects have been randomly shuffled as illustrated in FIG. 11.

Thus, the probability that a randomly picked object (a sample) from union S∪S* (first sampling method) belongs to the intersection χ is r/Ω. The probability that a randomly picked object (a sample) from set S only (second sampling method) belongs to the intersection χ is r/p. The ANDing process depicted in FIG. 20 is implicitly an efficient implementation of the second sampling method.

With the first sampling method, the probability of a sample of a sequence of successive samples being outside the intersection χ is determined as:

$\pi_1 = (1 - r/\Omega)$ for the first sample;

$\pi_2 = \pi_1 \times (1 - r/(\Omega - 1))$ for the second sample;

. . .

$\pi_k = \pi_{(k-1)} \times (1 - r/(\Omega - j + 1)) = \Pi_j (1 - r/(\Omega - j + 1)), 1 \leq j \leq k, k < \Omega,$ for the $k^{th}$ sample.

$\pi_k$ is the probability that k successive samples are all outside the intersection χ, which is the probability that at least one of the k samples is within the intersection. Selecting k to yield a value of $\pi_k$ that is negligibly small (0.01, for example), then k defines a critical sample size after which the sampling process is terminated if a sample (an object) that does not belong to the intersection χ is not found.

If it is conjectured that the number k of successive samples that yields a prescribed high probability (0.99, for example) of finding at least one sample belonging to the intersection χ is much smaller the cardinality |Ω| of the union S∪S*, then $\pi_k$ may be approximated as:

$\pi_k^* = (1 - r/\Omega)^k > \pi_k.$

With the second sampling method, the probability of a sample of a sequence of successive samples being outside the intersection χ is determined as:

$\pi_1 = (1 - r/p)$ for the first sample;

$\pi_2 = \pi_1 \times (1 - r/(p - 1))$ for the second sample;

...

$$\pi_k = \pi_{(k-1)} \times (1 - r/(p-j+1)) = \Pi_j (1 - r/(p-j+1)), k \leq p, \text{ for the } k^{th} \text{ sample}.$$

As in the case of the first sampling method, $\pi_k$ is the probability that k successive samples are all outside the intersection $\chi$, which is the probability that at least one of the k samples is within the intersection. A number k that yields a value of $\pi_k$ that is negligibly small defines a critical sample size after which the sampling process is terminated if a sample (an object) that does not belong to the intersection $\chi$ is not found.

If it is conjectured that the number k of successive samples that yields a prescribed high probability (0.99, for example) of finding at least one sample belonging to the intersection $\chi$ is much smaller the cardinality $|\Omega|$ of the union $S \cup S^*$, then $\pi_k$ may be approximated as:

$$\pi_k^* = (1 - r/p)^k > \pi_k.$$

With p=50000, r=10000, $\Omega$=200000, for example:
the value of k (the critical sample size) that yields $(1-r/\Omega)^k=0.01$ is $k=\lceil -2/\log 0.95 \rceil=90$; and
the value of k (the critical sample size) that yields $(1-r/p)^k=0.01$ is $k=\lceil -2/\log 0.95 \rceil=21$.
Thus, applying the second sampling method (FIG. 20) appreciably reduces the computation effort.

FIG. 23 illustrates an exemplary dependence 2300 (logarithmic abscissa) of the requisite sample size on the total number of relevant objects (the number of objects of the smaller of a set pair) to realize a specified confidence level (e.g., 95%) and a specified confidence level (2.5%. for example).

FIG. 24 illustrates exemplary results of a method 2400 of pre-computing requisite sample sizes for different values of the total number of relevant object and different confidence parameters. Interpolated values of requisite sample sizes corresponding to other values of the total number of relevant objects and other values of confidence parameters may be determined in real time.

FIG. 25 illustrates a second implementation 2500 of the query-processing system of FIG. 1 using an alternate implementation 120B of query engine 120. A module 2521 produces a list 2524 of candidate key-specific sets 730 each having at least a first level of intersection with the master set. Thus, module 2521 implements the coarse filtering function 720 of FIG. 7. Module 2522 determines exact intersection of each candidate set with the master set and selects eligible sets 750 each having an intersection level with the master set at least equal to a prescribed fraction of the size of the master set. Thus, module 2522 performs the process 740 of fine filtering based on exact intersection, rather than an estimated intersection, with the master. The query engine 120B ranks the eligible sets 750 according to some merit criterion and formulates a concise output to be forwarded to the client that initiated the query. A buffer 2550 holds contents of a query.

Thus, the invention provides a query engine configured to process data organized into descriptors of a universe of objects and a plurality of key-specific set of objects, each set including objects of a common property (characteristic, trait, interests, . . . ) and derive insights based on rapidly computing an indicator of similarity of each key-specific set of objects to a model set of objects, also referenced as a "master set".

The engine performs a coarse filtering process to eliminate key-specific sets that are unlikely to be of sufficient similarity to the master set and retain the remaining key-specific sets as candidate sets for further processing.

The engine inspects a predetermined number of successive samples of a key-specific set to determine the likelihood of significant similarity to the master set. Where the likelihood is ascertained, the engine determines exact intersection of the key-specific set with the master set based on ANDing respective bitmaps. The predetermined number of successive samples may be based on either estimation of a level of intersection of the key-specific set to the master set, or a specified confidence level and confidence interval.

SECURE SOFTWARE-SERVICE SYSTEM

FIG. 26 illustrates conventional exchange 2600 between a general software provider 2610 and a number k of clients 2640 labeled $C_0$ to $C_{(k-1)}$, the integer k being a design parameter, k>1. According to one mode of operation, a client, such as $C_1$, sends raw proprietary data 2612 to the provider 2610 and receives insight data 2614 from the provider. According to another mode of operation, a client, such as client $C_{(k-1)}$, sends requests 2616 to acquire software modules from the provider 2610 and receives the requested software 2618 to be executed at the client's computing facility. Neither of the two conventional modes of operation is needed in the present system.

FIG. 27 illustrates a Basic Secure Software-Service Network (BSSSN) 2700 for enabling any client 2640 of a provider 2610 to securely apply software modules of the provider to the client's proprietary data to derive specific insights without importing the provider's software modules or exposing the proprietary data to the provider. The software modules may comprise UDFs of the query engine 120 of FIG. 1. The system further enables a client 2640 to share insights gained from analyzing proprietary data with other clients 2640 without exposing any part of proprietary data of the client. The system employs a computing and data-exchange facility 2720 (referenced as "exchange facility" or simply the noun "exchange") configured to:
  (i) enable provider 2610 to write UDFs to be executed at the exchange; and
  (ii) enable a client 2640 of the provider 2610 to gain and share insights based on the client's proprietary data to other clients of the provider without disclosing any part of the proprietary data.

The exchange 2720 provides a secure function feature which allows the provider 2610 to write UDFs (using, e.g., Javascript or SQL) and share the UDFs with the provider's clients 2640 at the exchange facility. This allows the clients 2640 to run the UDFs using respective database tables without seeing the UDFs' code and without the provider 2610 having the ability to access the clients' data.

The provider communicates with the exchange through a dual network path 2714 through a network 2750. To benefit from such secure application of the provider's software to a client's data, a client establishes an account with the provider 2610 and an account with the exchange facility 2720. For example, client 2640(1) of the provider is also a client of exchange 2720. Client 2640(1) communicates with the provider 2610 through a dual network path 2712 through a network 2750 and communicates with the exchange 2720 through a dual network path 2716. A client of the exchange 2720, that is not a client of provider 2610, may access insights generated in the exchange based on applying the provider's software to data of any of the other provider's clients, subject to granted permissions. For example, if client 2640(k-1) of the exchange 2720 is not a client of provider 2610, it may still acquire insights, through dual network path 2726, based on proprietary data of client 2640(1) if client 2640(1) places, in the exchange, a permission to client 2640(k−1).

The exchange is a trusted party and may reside within any commercial cloud. However, the provider 2610, not the exchange 2720, dictates the rules of data or software exchange, relevant to the provider's software, among the provider's clients through the exchange. The system requires that each provider's client also have an account with the exchange facility 2720. However, a client of the exchange 2720 may not be a client of the provider 2610.

It is noted that while FIG. 27 illustrates network 2750 interconnecting all participants of network 2700, any two participants may communicate through another medium. For example, any of dual network paths 2712, 2714, 2716, and 2726 may be a direct communication link instead.

FIG. 28 illustrates an example 2800 of data exchange through network 2700. Client-1 sends client-data 2810 to provider 2610 indicating credentials (for authentication), relevant to the client's account with provider 2610, and a request to implement a task. Client-1 also sends client-data 2820 (raw data/proprietary data) to exchange 2720 indicating credentials, relevant to the client's account with exchange 2720.

The provider's response 2812 to client-1 may include an encryption key or, preferably, a UDF with an embedded encryption key to enable the client to read the results produced at the exchange. The provider 2610 also sends messages 2830 to the exchange 2720 including an identification of the client and a set of UDFs relevant to the requested task.

Exchange 2720 applies the set of UDF's received from the provider to the client's data to produce the task's requisite results as encrypted results 2822. Client-1 may then acquire the encrypted results from exchange 2720 and use the UDF with the embedded encryption key to further process the result.

FIG. 29 illustrates processes 2900 of the data exchange of FIG. 28. Process 2910 sends a request to perform a task from a client to the provider 2610. Process 2920 sends raw data (proprietary data) from the client to the exchange 2720. Process 2930, performed at the provider's site, sends from the provider 2610:

a UDF with an embedded encryption key to client-1; and
a set of UDFs, with an embedded encryption key, to the exchange 2720.

Process 2940, performed at the exchange 2720, applies the set of UDFs to the raw data, to produce insight data. Process 2950, performed at the exchange 2720, places the insight data into a storage space assigned to the client within the exchange facility.

FIG. 30 illustrates temporal order 3000 of the processes of FIG. 29. At time $T_0$, client-1 send client-data 2810 (credentials and task request) to provider 2610 and client-data 2820 (credentials and raw data), to exchange 2720. At time $T_1$, provider 2610 receives the task request and performs steps of:

assign a task number to the received task;
assign an encryption key specific to client-1 and the received request; and
identify a set of UDFs (together with any accompanying data tabulations), of the provider's library of UDFs, that is applicable to the task indicated in the request.

At time $T_3$, provider 2610 sends the set of UDFs to the exchange (to be received at time $T_4$). At time $T_2$, exchange 2720 receives the proprietary data of client-1. At time $T_4$, exchange 2720 receives the set of UDFs from provider 2610. A processor of exchange 2720 applies the set of UDFs to the proprietary data to produce and encrypt the sought results. At time $T_7$, the processor places the encrypted result in a respective storage block of a storage space, of the exchange, allocated to client-1.

At any time, succeeding $T_1$, such as the indicated $T_5$, provider 2610 sends a UDF embedding the encryption key to client-1 to be received at time $T_6$. At time $T_8$, succeeding $T_6$, client-1 may connect to exchange 2720 to acquire the encrypted results. Optionally, at any time following $T_7$, exchange 2720 may send an alert (a courtesy message) to client-1 to indicate that fresh results have been placed in the storage space of client-1.

At time $T_9$, exchange 2720 permits client-1 to access the respective storage space and at time $T_{10}$, exchange 2720 sends the encrypted results to client-1. At time $T_{11}$, client-1 receives the encrypted results which may be decrypted to produce readable results 3080 at time $T_{12}$.

FIG. 31 illustrates a first example 3100 of data exchange within the system of FIG. 27 where a client shares insight data with another client. A specific client, $C_1$, may run the provider's application software using the client's proprietary data. The application produces encrypted results placed into a table in the client's storage space within exchange 2720. The provider would not be aware that the client activated the application. For the case where the provider's UDFs apply to the Query Engine 120 (FIG. 1), the provider has the encryption key of the encrypted roaring index associated with the exchange facility account of $C_1$. However, the provider has no access to the result. Client $C_1$ is then able to share the encrypted result with another client, $C_2$, using the exchange facility.

In this example, the requested task is a query 3110 from a client 2640(1), denoted $C_1$, presented to query engine 120 (FIG. 1) of provider 2610. $C_1$ sends raw data 3120A to the exchange facility 2720. Provider 2610 sends custom data 3128 and a set 3130 of UDFs relevant to the query to the exchange 2720. Exchange 2720 applies the UDFs, using the custom data, to raw data 3120A and 2720 places results (response to the query) 3140A in the storage space assigned to $C_1$.

To share the results with a client $C_2$ of exchange 2720, $C_1$ may:

(a) communicate to exchange 2720 a permission to share the results with $C_2$, and
(b) send the encryption key 3150 to a client $C_2$.

$C_2$, which may not be a client of provider 2610, would then be able to acquire a copy 3140B of the results.

FIG. 32 illustrates a second example 3200 of transactions between two clients within the system of FIG. 27. As in the example of FIG. 31, the requested task is a query 3110 from $C_1$ presented to query engine 120 (FIG. 1) of provider 2610. $C_1$ sends raw data 3120 to the exchange facility 2720. Provider 2610 sends custom data 3128 to the exchange facility 2720. Provider 2610 sends a set 3130 of UDFs relevant to the query to the exchange 2720. Exchange 2720 places results (response to the query) 3140A in the storage space assigned to $C_1$.

Client $C_2$ then sends a query 3212 to provider 2610 and raw data 3225 to exchange 2720. The provider then sends the exchange another custom secured UDF relevant to query 3212. The secure function has an embedded decryption key. The function produces specific results based on query 3212 from client $C_2$. The provider has no access to the encrypted data or the output of the function. Only Client $C_2$ is able to see the outputs. Client $C_1$ would be unaware of queries that client $C_2$ is running on the roaring index; other techniques, such as the hyperminhash, with other data types, may also be used.

Thus, client $C_1$ can share insights with other clients without exposing proprietary data. Other clients would be able to gain insight information derived from proprietary data of client $C_1$ and use that information to decide whether to take any action, such as running an advertising campaign, using the information. A client can also determine overlap of specific data and data of $C_1$ without sending the specific data to client $C_1$ or to the provider. This also enables the provider to process data and provide insights to many clients without accessing the clients' data.

FIG. 33 illustrates temporal order 3300 of the data exchange of FIG. 31. $C_1$ sends Query-1, 3110, to provider 2610 and sends raw data 3120 to exchange 2720. Provider 2610 sends bucket data 3128 and UDFs 3130 corresponding to query-1 to exchange 2720. Exchange 2720 applies UDFs 3130 to raw data 3120, using bucket data 3128, to produce a result 3140A which is placed in storage space 3351, within exchange 2720, assigned to client $C_1$. A copy 3140B of the query result is placed in storage space 3352, within exchange 2720, assigned to client $C_2$. In general, several clients having accounts with exchange 2720 may access the query result, subject to appropriate permissions. The actual result data would be stored in a memory block within exchange 2720 and only pointers to the memory block of interest would be placed in storage spaces of eligible clients within exchange 2720.

FIG. 34 illustrates temporal order 3400 of the data exchange of FIG. 32. The main difference between FIG. 34 and FIG. 33 is that exchange 2720 applies UDFs 3130 to amalgamated data of client-1 and client-2 (3120, 3225).

FIG. 35 illustrates a network 3500 similar to the network of FIG. 27 accommodating a large number, L, of clients 2640(0) to 2640(L-1). Network 3500 employs a number of exchanges 3520(j), 0≤j<J, labeled $X_0$, $X_1$, ... $X_{(J-1)}$. The clients, the software providers, and the exchanges may communicate through network 2750. The exchanges may reside in public clouds.

FIG. 36 illustrates an exemplary structure 3600 of an exchange 3520. The exchange communicates with clients 2640 and the provider 2610 through a network interface 3610. A collaboration software module 3620 governs the entire operation of the exchange. As described above, the provider 2610 may send UDFs to an exchange in response to a request from a client. However, it may be more efficient that the provider maintain a library of UDFs that are frequently applied. As illustrated, the provider maintains a software library 3630 within the exchange. Thus, the provider would only send to the exchange a pointer to a requisite UDF that is present in the library.

To facilitate tracking and control of numerous software activations at the cloud, the collaboration software module 3620 causes the processor to establish a security-control data structure 3640 of task permissions holding current permissions, from the provider and clients, associated with each active task. Preferably, each task permission is structured as a tuple:

{request index, grantor identifier, grantee identifier, permission list}.

The grantor may be any client of the cloud and the grantee may be a software provider or any other client of the cloud. The grantor may also be a software provider and the grantee may be any client of the cloud. The Security-control data structure 3640 may take the form of the control matrix of FIG. 44 or the control matrix of FIG. 46.

The permission list specifies at least one permissible action. The grantor assigns the request index. Preferably, the request index is a recycled integer within a specified range for ease of tracking.

The permission list may comprise itemized permissions of numerous actions such as UDF activation, UDF copying, access to raw data, modification of raw data, access to result, insertion of new data, and task expiry (hence removal of task data from the security-control data structure).

Any client of the plurality of clients, may perform processes of: (1) placing a specific set of UDFs into the cloud; (2) placing, in the security-control data structure 3640, a specific task permission naming any other client, of the plurality of clients, as a grantee, and (3) prompting the collaboration software module to apply the specific set of UDFs to proprietary data of the named client without exposing the specific set of UDFs to the named client.

Alternatively, a client may perform processes of: (a) placing a specific data file and a specific set of UDFs into the cloud; (b) placing a specific task permission in the security-control data structure naming any other client, of the plurality of clients, as a grantee; and (c) prompting the collaboration software module to apply the set of UDFs to combined data of the data file and proprietary data of the named client to produce a respective result, and permit the named client to access the respective result.

A memory space 3650 stores information relevant to tasks in progress. A memory space 3660 stores data tracking the state of each task in progress. A common data-storage space 3680 holds temporary content data, control data, as well as software instructions from clients. A set of hardware processors, referenced as 3690, of a cloud hosting the exchange, operating concurrently in a parallel arrangement or a pipelined arrangement, implements the processes of the exchange.

The collaboration software module 3620 may be placed into each cloud of a set of designated clouds (FIG. 35) hosting exchange facilities 3520(0) ... 3520(J-1), J>1. A client may then instruct the software provider 2610 to direct secure UDFs to a specific cloud of the set of designated clouds. Each client of the plurality of clients is communicatively coupled to at least one cloud of the set of designated clouds.

It is noted that the Secure UDFs are comparable to regular functions built into a typical database, or API. Users have the ability to call the functions from within a cloud APIs or database queries, but the source code behind those functions is not exposed. The software may be a "plugin" from a third party.

FIG. 37 illustrates an exemplary large-scale system 3700 similar to the system of FIG. 27 accommodating a large number, L, of clients 2640(0) to 2640(L-1). System 3700 employs two software providers 3710 (first provider 3710 (0), labeled $P_0$, second provider 3710(1), labeled $P_1$) and three exchanges 3720 (first exchange facility 3720(0), second exchange facility 3720(1), third exchange facility 3720 (2), labeled $X_0$, $X_1$, and $X_2$, respectively). The clients, the software providers, and the exchanges may communicate through network 2750 (the dashed lines represent network paths) or through other means.

FIG. 38 illustrates a first example 3800 of data exchange of the system of FIG. 37. Client-1, labeled $C_1$, sends to provider 3710(0), labeled $P_0$, client-data 3810 which comprise client-1 credentials relevant to $P_0$ and a first task request. $C_1$ further sends to exchange 3720(0), labeled $X_0$, client-data 3820 which comprise client-1 credentials relevant to $X_0$, proprietary data, and permission to share results (not the proprietary data) with a client $C_9$ (client-9) of exchange $X_0$; $C_9$ may not be a client of $P_0$.

$P_0$ sends to $C_1$ an encryption key 3812, which may be embedded within a UDF. $P_0$ sends to $X_0$ provider-data 3830 which comprise an identifier of $C_1$ and a set of UDFs, with an encryption key embedded therewith, relevant to the requested task.

$X_0$ applies the set of UDFs to the proprietary data to produce the sought results which are encrypted to produce encrypted results 3840 accessible to $C_1$ (3840A) and $C_9$ (3840B). $C_9$ sends own credentials 3850 to $X_0$ to access the results.

The collaboration software module 3620 is configured to receive from a client, such as client 2640(1), labeled $C_1$, a specific task permission naming another client, such as client 2640(9), labeled $C_9$, as a grantee. The collaboration software module then causes a processor to apply a proprietary set of UDFs of $C_1$, which is placed in the cloud, to proprietary data of $C_9$ without exposing the specific set of UDFs to $C_9$.

The collaboration software module 3620 is also configured to receive from $C_1$ a specific data file and a specific task permission naming $C_9$ as a grantee with permissions to: apply the set of UDFs to the data file as well as proprietary data of the other client, which is placed into the cloud, to produce a respective result; and permit $C_9$ to access the respective result.

FIG. 39 illustrates processes 3900, outlined below, of the data exchange of FIG. 38.
(i) A first client, $C_1$ of $P_0$ sends a request to $P_0$ (process 3910).
(ii) $C_1$ sends to a selected exchange, $X_0$, for example, raw data and an access permission to allow a second client $C_9$ of $X_0$ to access results based on the proprietary data of $C_1$ (process 3920). However, $C_9$ is not permitted to access the proprietary data of $C_1$.
(iii) $P_0$ sends user-defined functions [UDFs]$^{(0)}$ with an embedded encryption key $\kappa_0$, to $X_0$ (process 3930).
(iv) $X_0$ applies UDFs]$^{(0)}$ to the raw data to generate insight data (process 3940).
(v) $X_0$ places the insight data into a storage space assigned to $C_1$ and a storage space assigned to $C_9$ (process 3950).

FIG. 40 illustrates temporal order 4000 of the processes of FIG. 39. The main differences from FIG. 30 are:
(i) at time $T_7$ (reference 4030) a processor of exchange 2720 places the encrypted result in respective storage blocks of storage spaces of the exchange allocated to $C_1$ and $C_9$; and
(ii) at time $T_{13}$, $C_9$ sends own credentials to $X_0$, to be received at time $T_{14}$, then, at time $T_{15}$, $X_0$ sends a copy 3840B of encrypted results to $C_9$ to be received at $T_{16}$.

FIG. 41 illustrates a second example 4100 of data exchange of the system of FIG. 37.

Client $C_1$ sends to provider $P_0$, client-data 3810 which comprise $C_1$ credentials relevant to $P_0$ and a first task request. $C_1$ further sends to exchange $X_0$ client-data 3820 which comprise credentials of $C_1$ relevant to $X_0$, proprietary data, and permission to share results (but not the proprietary data) with a client $C_9$ of exchange $X_0$.

$P_0$ sends to $C_1$ a first encryption key 3812, labeled $\kappa_0$, which may be embedded within a UDF. $P_0$ sends to $X_0$ provider-data 3830 which comprise an identifier of $C_1$ and a first set of UDFs, with the encryption key embedded, relevant to the first task.

Likewise, client $C_9$ sends to provider $P_1$, client-data 4110 which comprise $C_9$ credentials relevant to $P_1$ and a second task request. $C_9$ further sends to exchange $X_0$ client-data 4120 which comprise credentials of $C_9$ relevant to $X_0$, proprietary data, and permission to share results (but not the proprietary data) with client $C_1$ of exchange $X_0$.

$P_1$ sends to $C_9$ a second encryption key 4112, labeled $\kappa_1$, which may be embedded within a UDF. $P_1$ sends to $X_0$ provider-data 4130 which comprise an identifier of $C_9$ and a second set of UDFs, with encryption key embedded, relevant to the second task.

$X_0$ applies the first set of UDFs to the proprietary data of $C_1$ and the second set of UDFs to the proprietary data of $C_9$ to produce insight data based on raw data of both $C_1$ and $C_9$ which are encrypted to produce encrypted results 4140 accessible to both $C_1$ (4140A) and $C_9$ (4140B). $C_9$ sends own credentials to $X_0$ to access the results.

FIG. 42 illustrates processes 4200 of the data exchange of FIG. 41; outlined below.
(1) A first client, $C_1$, of $P_0$ sends a request to $P_0$ (process 3910).
(2) $C_1$ sends to a selected exchange, $X_0$, for example, raw data and an access permission to allow a second client $C_9$ of $X_0$ to access results based on the proprietary data of $C_1$ (process 3920). However, $C_9$ is not permitted to access the proprietary data of $C_1$.
(3) $P_0$ sends user-defined functions [UDFs]$^{(0)}$ with an embedded encryption key $\kappa_0$, to $X_0$ (process 3930).
(4) A second client, $C_9$ of $P_1$ sends a request to $P_1$ (process 4210).
(5) $C_9$ sends to $X_0$ raw data and an access permission to allow client $C_1$ of $X_0$ to access results based on the proprietary data of $C_9$ (process 4220). However, $C_1$ is not permitted to access the proprietary data of $C_9$.
(6) $P_1$ sends user-defined functions [UDFs]$^{(0)}$ with an embedded encryption key $\kappa_1$, to $X_0$ (process 4230).
(7) $X_0$ applies [UDFs]$^{(0)}$ to the raw data of $C_1$ to generate a first result and applies [UDFs]$^{(1)}$ to the raw data of $C_9$ to generate a second result (process 4240).
(8) $X_0$ merges results; for example, datasets of the results of the same type (hashed emails, phone numbers, etc.) can be combined.
(9) $X_0$ places the insight data into a storage space assigned to $C_1$ and a storage space assigned to $C_9$ (process 4250).

FIG. 43 illustrates an exemplary organization 4300 of content data and software modules maintained at a storage medium 4310 associated with an exchange 2720 or 3720. Provider 2610, having an account with exchange 2720, is allocated storage space 4320 within exchange 2720. Provider 2610 stores UDFs 4322, labeled UDF(0) to UDF(m−1), the provider's own proprietary data 4324, and insight data 4326 of different natures, labeled as insight-data (0) to insight data (p−1), m>0, p>0.

Client-0, denoted $C_0$, having an account with exchange 2720, is allocated storage space 4330(0) within exchange 2720. $C_0$ stores a number $\lambda_0$ of raw-data blocks 4334(0), $\lambda_0$>1, of different types and corresponding encrypted results 4336(0). Likewise, client-j, denoted 0≤j<k, having an account with exchange 2720, is allocated storage space 4330(j) within exchange 2720. $C_1$ stores a number $\lambda_j$ of raw-data blocks 4334(j), $\lambda_j$>1, and corresponding encrypted results 4336(j).

Proprietary data and results belonging to a client 2640 are protected following the steps of:
(a) placing the client's raw data, or intermediate data, into the exchange facility; for example, intermediate data, such as a set of custom format records, is transferred as binary records which contain several fields;
(b) using UDFs to execute the provider's applications producing outputs; and (c) encrypting results of executing UDFs for the client, placing encrypted results into a memory division dedicated to the client (associated with an account of the client) within exchange 2720 (the provider has no access to clients' proprietary data or the encrypted results).

FIG. 44 illustrates a transaction-control table 4400 maintained at the exchange 2720. The provider 2610 places a permission vector, governing transactions with client $C_1$. Client $C_1$ places a permission vector relevant to provider 2610. Client $C_1$ places a permission vector relevant to transactions with client $C_0$. Generally, each entity having an account at exchange 2720 may place permissions (or instructions) relevant to any other entity.

FIG. 45 illustrates an exemplary configuration 4500 of the large-scale system of FIG. 37 employing two software providers $P_0$ and $P_1$ communicatively coupled to two exchanges $X_0$ and $X_1$. Each of ten clients (L=10) labeled $C_0$ to $C_9$ may connect to either or both of the providers and either or both of the exchanges. In this example:

(a) each of clients $\{C_0, C_1, C_2, C_3,$ and $C_4\}$ has an account with software provider $P_0$ and ability to establish a network path 4510 to provider $P_0$;

(b) each of clients $\{C_5, C_6, C_7, C_8,$ and $C_9\}$ has an account with software provider $P_1$ and ability to establish a network path 4520 to $P_1$;

(c) each of clients $C_1$ and $C_3$ has an account with $P_1$ and the ability to establish a network path 4530 to $P_1$;

(d) each of clients $C_6$ and $C_7$ has an account with $P_0$ and ability to establish a respective network path 4540 to $P_0$;

(e) each of clients $\{C_0, C_1, C_2, C_3,$ and $C_4\}$ has an account with exchange $X_0$ and ability to establish a network path 4550 to provider $X_0$;

(f) each of clients $\{C_5, C_6, C_7, C_8,$ and $C_9\}$ has an account with exchange $X_1$ and ability to establish a network path 4560 to $X_1$;

(g) Client $C_3$ has an account with $X_1$ and ability to establish a network path 4570 to $X_1$;

(h) Provider $P_0$ has an account with $X_0$ and an account with $X_1$, with ability to establish a network path 4580 to $X_0$ and a network path 4581 to $X_1$;

(i) Provider $P_1$ has an account with $X_0$ and an account with $X_1$, with ability to establish a network path 4590 to $X_0$ and a network path 4591 to $X_1$.

Consider a system accommodating a number L of clients, L>>1, employing a number p* of (software) providers and a number x* of exchanges, p*>1, x*>1. let R(p, c) denote results of applying software of a provider of index p to raw data of a client of index c, $0 \le p < p^*$, $0 \le c < L$. The result R(p,c) is placed in a storage memory assigned to client c in an exchange of index x, $0 \le x < x^*$, with which each of provider p and client c has a respective account. In the example of FIG. 45, p*=2, x*=2, and L=10.

In the example of FIG. 45, client $C_0$ has an account with $P_0$, and each of client $C_0$ and provider $P_0$ has an account with $X_0$. Thus, R(0,0) resulting from applying the software of $P_0$, to data of $C_0$ is placed in $X_0$ only. Client $C_1$ has an account with $P_0$ and an account with $P_1$. Each of client $C_1$ and provider $P_0$ has an account with $X_0$. Thus, R(0,1) resulting from applying the software of $P_0$ to data of $C_1$, is placed in $X_0$ only ($C_1$ does not have an account with $X_1$). R(1,1) resulting from applying the software of $P_1$, to data of $C_1$ is also placed in $X_0$ only; although $P_1$ has an account with $X_1$, $C_1$ does not have an account with $X_1$, hence R(1,1) cannot be produced in $X_1$. R(0,3) resulting from applying the software of $P_0$, to data of $C_3$ may be produced in $X_0$ or $X_1$ since $C_3$ has accounts with both $P_0$ and $P_1$, $P_0$ has accounts with both $X_0$ and $X_1$, and $P_1$ has accounts with both $X_0$ and $X_1$.

Exchange $X_0$ may hold the results:
R(0,0), R(0, 1), R(0, 2), R(0, 3), R(0, 4), R(1, 1), R(1,3).
Exchange $X_1$ may hold the results:
R(0, 3), R(0,6), R(0, 7), R(1, 5), R(1,6), R(1,7), R(1,8), R(1,9)

FIG. 46 illustrates a task-permission table 4600, as one form of the security-control data structure 3640) maintained at an exchange associated with the system of FIG. 37 which comprises two software providers 3710(0) and 3710(1), labelled $P_0$ and $P_1$, respectively.

As described above, in order to facilitate tracking and control of numerous software activations at the cloud, a security-control data structure 3640 of task permissions is established and continually updated. Preferably, each task permission is structured as a tuple:

{request index, grantor identifier, grantee identifier, permission list}, the grantor being any client of the cloud and the grantee being any other client of the cloud. A circle in the table denotes a permission list. For example, software provider $P_0$ is the grantor of task permission 4610 to client $C_7$, software provider $P_1$ is the grantor of task permission 4620 to client $C_8$, and client $C_2$ is the grantor of task permission 4630 to client $C_8$.

FIG. 47 illustrates task handling 4700 at an exchange. As illustrated in FIG. 36, an exchange is a software entity placed in a cloud and uses resources of the cloud, such as the hardware processor, or the set of hardware processors, 3690. FIG. 47 illustrates use of multiple processing units 4730, operating in parallel. The tasks, originating from clients, are placed in a task queue 4720 and completed results are held in result queue 4740. To track progress of the tasks, information 4710 such as an identifier of an originating client, a request index with respect to the originating client, an identifier of the software provider (e.g., $P_0$ versus $P_1$), etc., are associated with each task.

FIG. 48 illustrates an exemplary structure 4800 of an exchange 3720. The exchange communicates with clients 2640 and providers 3710 through a network interface 4810. A collaboration software module 4820 governs the entire operation of the exchange. As described above, a provider 3710 may send UDFs to an exchange in response to a request from a client. However, it may be more efficient that each provider having an account with an exchange maintain a library of UDFs that are frequently applied. As illustrated, provider $P_0$ maintains a software library 4830, provider $P_1$ maintains a library 4831, etc., within the exchange. Thus, a provider would only send to the exchange a pointer to a requisite UDF that is present in a respective library.

4840 Memory Space Holding Current Permissions from Providers and Clients

A memory space 4840 stores current permissions, from providers and clients, associated with each active task. A memory space 4850 stores information relevant to tasks in progress. A memory space 4860 stores data tracking the state of each task in progress. A common data-storage space 4880 holds temporary content data, control data, as well as software instructions from clients. A set of hardware processors, referenced as 4890, operating concurrently in a parallel arrangement or a pipelined arrangement, implements the processes of the exchange.

FIG. 49 illustrates a first scheme 4900 of realizing secure software services. Client 2640(1), labeled client-1, of the Single-Provider Secure Software-Service Network (SPSSSN) 3500 sends a request 4910 to provider 2610 to perform a specific task. Client-1 also sends raw data 4920 to a selected exchange 3520(0), labeled $X_0$, with which both client-1 and provider 2610 have respective accounts. In response to the request, provider 2610 sends UDFs 4930, with an embedded encryption key, as well as an identifier of client-1, to exchange $X_0$. The collaboration software module 3620, residing within exchange $X_0$, causes processor 3690 to perform process 4940 of applying the UDFs to raw data 4920 to produce a result 4950 as requested in the specific task. The result is accessible based on identities of eligible clients, In order to share the result 4950 with other clients of exchange $X_0$, client-1 sends to exchange $X_0$ a list 4960 of identifiers of clients, including client 2640(2), labeled client-2, of exchange $X_0$ that are eligible to access result 4950.

Subsequently, client-1 may send a message 4971 to exchange $X_0$ requesting access to result 4950. The request would be granted based on the identifier of client-1 (which would be implicitly known to exchange $X_0$ when client-1 gained access to the cloud hosting exchange $X_0$). Client-1 would receive a copy 4972 of result 4950. Likewise, client-2 may send a request 4981 to exchange $X_0$ requesting access to result 4950. The request would be granted based on the identifier of client-2 (which would be known to exchange $X_0$). Client-2 would receive a copy 4982 of result 4950.

Provider 2610 would be unaware of permissions to access the result given to any entity other than client-1. Provider 2610 has no access to the raw data of client-1 or the result 4950, unless the originator (client-1) of request 4910 grants permission to the provider 2610 through the exchange $X_0$ (security-control data structure 3640).

FIG. 50 illustrates a second scheme 5000 of realizing secure software services. As in the first scheme 4900, client-1 sends a request 4910 to provider 2610 to perform a specific task. Client-1 also sends raw data 4920 to selected exchange $X_0$. In response to the request, provider 2610 sends UDFs 5030, with an embedded encryption key, to exchange $X_0$. The collaboration software module 3620, residing within exchange $X_0$, causes processor 3690 to perform process 4940 of applying the UDFs to raw data 4920 to produce a result 4950 as requested in the specific task. The result is accessible to any user accessing exchange $X_0$ based solely on the encryption key. Thus, provider 2610 sends the encryption key to client-1 (message 5032). In order to share the result 4950 with a selected client, such as client-2 of exchange $X_0$, client-1 sends the encryption key to the selected client (message 5034).

Subsequently, client-1 may send a request 5071, together with the encryption key, to exchange $X_0$ to access to result 4950. The request would be granted based only on the encryption key. Client-1 would receive a copy 4972 of result 4950. Likewise, client-2 may send a request 5081, together with the encryption key, to exchange $X_0$ to access to result 4950. The request would be granted based on the encryption key. Client-2 would receive a copy 4982 of result 4950. Client-2 of exchange $X_0$ may not be a client of provider 2610. Naturally, a client of exchange $X_0$ is a client of the cloud hosting the exchange.

FIG. 51 illustrates a third scheme 5100 of realizing secure software services. As in the first scheme 4900, client-1 sends a request 4910 to provider 2610 to perform a specific task. Client-1 also sends raw data 4920 to selected exchange $X_0$. In response to the request, provider 2610 sends UDFs 4930, with an embedded encryption key, as well as an identifier of client-1, to exchange $X_0$.

The collaboration software module 3620, residing within exchange $X_0$, causes processor 3690 to perform process 4940 of applying the UDFs to raw data 4920 to produce a result 4950 as defined in the specific task. The result is accessible based on both the encryption key and a client's identity. In order to share the result 4950 with other clients of exchange $X_0$:
(a) client-1 sends to exchange $X_0$ a list 4960 of identifiers of clients of exchange $X_0$, including client 2640(2), labeled client-2, that are eligible to access result 4950;
(b) provider 2610 sends the encryption key to client-1 (message 5032); and
(c) client-1 sends the encryption key to selected clients; for example, client-1 sends message 5034 to client-2 indicating the encryption key.

Subsequently, client-1 may send a request 5081, together with the encryption key to exchange $X_0$ (the identifier of client-1 is implicitly known to exchange $X_0$) to access to result 4950. The request would be granted based on both the encryption key and the identity of client-1. Client-1 would receive a copy 4972 of result 4950. Likewise, client-2 may send a request 5081, together with the encryption key and the identifier of client-2 (implicitly known), to exchange $X_0$ to access to result 4950. The request would be granted based on the encryption key and the identity of client-2. Client-2 would receive a copy 4982 of result 4950.

In schemes 4900, 5000, and 5100, the provider 2610 has no access to the raw data of client-1 or the result 4950.

Thus, the invention provides a network 2700, FIG. 27, for secure sharing of software applications among a plurality of clients. The network comprises a cloud hosting a collaboration software module 3620 (FIG. 36) and a software provider 2610 maintaining a library of user-defined functions (UDFs).

The software provider is configured to:
(1) receive a request 2810 (FIG. 28), 4910 (FIG. 49) to perform a task from a first client 26410(1);
(2) identify a set of UDFs 4930 (FIG. 49) applicable to the task;
(3) embed an encryption key into the set of UDFs to produce a set of secure UDFs; and
(4) send the secure UDFs and a first identifier of the first client to the cloud;

The collaboration software module 3620 (FIG. 36) is configured to cause a processor 3690 (FIG. 36) of the cloud to:
(i) apply the set of UDFs to raw data (process 4940, FIG. 49) of the first client placed in the cloud to produce requisite information 4950 subject to a determination that the first identifier matches a cloud's known identifier of the first client;
(ii) place the requisite information in a memory space of the cloud; and
(iii) permit the first client to access the requisite information based on the first identifier (processes 4971, 4972).

The collaboration software module is further configured to cause the processor to receive from the first client a second identifier of a second client (list 4960, FIG. 49) and to permit the second client to access the requisite information subject to a determination that the second identifier matches a cloud's known identifier of the second client (processes 4981, 4982).

The collaboration software module is further configured to cause the processor to:
(a) receive from the first client a second identifier of a second client, of the plurality of clients (list 4960, FIG. 51);

(b) receive from the second client the encryption key, (5181, FIG. 51);

(c) permit the second client to access the requisite information based on the encryption key and a match of the second identifier to a cloud's known identifier of the second client (5181, 5182).

The network further comprises a security-control data structure 3640 holding task permissions placed in a memory space of the cloud, each task permission being a tuple:

{request index, grantor identifier, grantee identifier, permission list}, where the grantor is any client of the cloud, the grantee is any other client of the cloud, the grantor assigns the request index, and the permission list specifies at least one permissible action. The request index is preferably a recycled integer within a specified range.

FIG. 52 illustrates a multi-provider secure software-service network 5200 supporting the L clients {2640(0), 2640(1), . . . , 2640(L−1)}. L>>1. The network comprises a number K of software providers 5210(0), 5210(1), . . . , 5210(K−1), K>1, and the plurality of clouds each supporting one of exchange facilities 3720(0), 3720(1), . . . , 3720(J−1), J>1. The clients, providers, and clouds may be interconnected through a network, although pairwise connections through other means may be used. Each client is associated with, and communicatively coupled to, at least one provider and at least one cloud. The network operates in a manner similar to the operation of networks 2700 and 3500 with the added benefit of a client's interaction with multiple software providers of a variety of application and cloud selection.

Thus, the invention provides a network 3700, 5200 for secure sharing of software applications among a plurality of clients 2640. The network comprises a plurality of clouds. each hosting a collaboration software module, and a plurality of software providers 5210, each software provider maintaining a respective library of user-defined functions (UDFs).

Each software provider 5210 is configured to:
(a) receive from a specific client, of the plurality of clients, a request to perform a task and an identifier of a specific cloud for placing a result of the task;
(b) identify a set of UDFs applicable to the task; and
(c) send the UDFs and an identifier of the specific client to the specific cloud;

The collaboration software module of the specific cloud is configured to cause a processor to:
(A) apply the set of UDFs to raw data of the specific client placed in the specific cloud to produce requisite information subject to a determination that the identifier matches an identifier of the specific client known to the specific cloud;
(B) place the requisite information in a memory space of the specific cloud; and
(C) permit the specific client to access the requisite information based on the identifier.

The collaboration software module of the specific cloud is further configured to cause the processor to enable clients, other than the specific client, to access the requisite information subject to permissions received at the specific cloud from the specific client.

The invention provides a method of secure software activation. The method comprises interaction of a plurality of clients 2640 (FIG. 27) with a software provider 2610 through a cloud hosting an exchange facility 2720. A first client, of the plurality of clients, sends a request to perform a task to the software provider and raw data to the cloud (FIG. 26). The software provider 2610 maintains a library of user defined functions (UDFs). The cloud hosts a collaboration software module (3620, FIG. 36).

Upon receiving the request, the software provider identifies a set of UDFs of the library of UDFs applicable to performing the task. The software provider further embeds an encryption key into the set of UDFs to produce a set of secure UDFs then sends the secure UDFs and an identifier of the first client, referenced as a first identifier, to the cloud. The collaboration software module 3620, residing in the cloud, causes a processor of the cloud to apply the set of UDFs to the raw data, subject to a determination that the first identifier matches a cloud's known identifier of the first client, and to place a result of applying the UDFs in a memory space of the cloud. The first client is permitted to accesses the result based on the first identifier.

To grant a second client (FIG. 38, FIG. 49), of the plurality of clients, access to the result at the cloud, the first client may send an identifier, herein referenced as a second identifier, of the second client to the cloud. Upon receiving the second identifier at the cloud, the collaboration software module causes the processor to permit the second client to access the result subject to a determination that the second identifier matches an identifier, of the second client, known to the cloud. The second client may further process the result using the cloud's resources.

Alternatively (FIG. 51), as a stricter security measure, the software provider sends the encryption key to the first client which, in turn, sends the received encryption key to a second client. Additionally, the first client sends the second identifier to the cloud. Subsequently, the collaboration software module causes the processor to permit the second client's access to the result based on both the encryption key and a match of the second identifier to a cloud's known identifier of the second client.

Methods of the embodiments of the invention may be performed using at least one hardware processor, executing processor-executable instructions causing the at least one hardware processor to implement the processes described above. Computer executable instructions may be stored in processor-readable storage media such as floppy disks, hard disks, optical disks, Flash ROMs (read only memories), non-volatile ROM, and RAM (random access memory). A variety of processors, such as microprocessors, digital signal processors, and gate arrays, may be employed.

Systems of the embodiments of the invention may be implemented as any of a variety of suitable circuitry, such as one or more microprocessors, digital signal processors (DSPs), application-specific integrated circuits (ASICs), field programmable gate arrays (FPGAs), discrete logic, software, hardware, firmware or any combinations thereof. When modules of the systems of the embodiments of the invention are implemented partially or entirely in software, the modules contain a memory device for storing software instructions in a suitable, non-transitory computer-readable storage medium, and software instructions are executed in hardware using one or more processors to perform the methods of this disclosure.

It should be noted that methods and systems of the embodiments of the invention and data described above are not, in any sense, abstract or intangible. Instead, the data is necessarily presented in a digital form and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst due the complexity and vast numbers of intermediate results generated for processing and analysis of even quite modest amounts of data. Instead, the methods described herein are necessarily carried out by electronic computing systems having processors on electronically or magnetically stored data, with the results of the data processing and data analysis digitally stored in one or more tangible, physical, data-storage devices and media.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

The invention claimed is:

1. A method of secure software activation, comprising:
receiving, on a server system, from a first client in a plurality of clients, a request to perform a task using the server system,
receiving, on a cloud system hosting a collaboration software module, from the first client, a set of raw data associated with the first client;
accessing, on the server system, a library of user-defined functions (UDFs);
after accessing the library, identifying, by action of the server system, a set of UDFs in the library applicable to said task, based on an intended result of the task;
embedding an encryption key into the set of UDFs to produce a set of secure UDFs;
sending, from the server system to the cloud system, the secure UDFs and a first identifier of the first client;
executing, with a processor of the cloud system configured to provide theft collaboration software module, processes of:
storing, on the cloud system, a known cloud identifier of the first client prior to provision of the first identifier of the first client to the cloud system by the server system, and determining upon receipt of the first identifier of the first client on the cloud system, that the first identifier matches the known cloud identifier of the first client;
upon a determination that the first identifier matches the cloud's known identifier of the first client, applying the set of UDFs to the raw data;
placing a result of said applying in a memory space of the cloud and making the result accessible to the first client; and
receiving and granting an access request from the first client to access the result based on the first identifier.

2. The method of claim 1, further comprising:
receiving, on the cloud system, from the first client, a second identifier of a second client in the plurality of clients;
with the collaboration software module, receiving and granting a second client access request from the second client to access the result based on the second identifier.

3. The method of claim 1, further comprising:
receiving, on the cloud system, from the first client, a second identifier of a second client;
providing, from the server system, to the first client, the encryption key;
with the collaboration software module, receiving and granting a second client access request from the second client to access the result based on the second identifier, wherein said second client access request includes a copy of the encryption key obtained from the first client by the second client.

4. The method of claim 1, further comprising:
with the collaboration software module, establishing a security control data structure of task permissions, each task permission being a tuple having a form {request index, grantor identifier, grantee identifier, permission list},
wherein:
said grantor is any client of said cloud;
said grantee is any other client of said cloud;
said grantor assigns said request index; and
said permission list specifies at least one permissible action.

5. The method of claim 4, wherein said request index is a recycled integer within a specified range.

6. The method of claim 4, further comprising:
receiving, from the any client, an identified set of UDFs, and storing the identified set of UDFs in the cloud system;
receiving, from the any client, a task permission, and storing, in the security control data structure, the task permission, wherein the task permission names the any other client as a grantee; and
associating, with the task permission, an instruction to apply the identified set of UDFs to proprietary data of said any other client without exposing the identified set of UDFs to said any other client.

7. The method of claim 4, further comprising:
receiving, from the any client, a data file and an identified set of UDFs, and storing the identified set of UDFs in the cloud system;
receiving, from the any client, a task permission, and storing, in the security control data structure, the task permission, wherein the task permission names the any other client as a grantee;
associating, with the data file, the identified set of UDFs,
combining, with the data file, proprietary data of the any other client into a combined data set;
applying, to the combined data set, the identified set of UDFs to produce a respective result; and
receiving and granting an any other client access request from the any other client and providing the respective result in response to the any other client access request.

8. The method of claim 4, wherein said permission list comprises:
UDF activation;
UDF copying;
access to raw data;
modification of raw data;
access to result;
insertion of new data; and
task expiry.

9. The method of claim 1, further comprising:
associating said collaboration software module with each cloud of a set of designated clouds; and
receiving, from the first client, an identifier of a cloud in the set of specific clouds, and associating said identifier with the cloud and the first client.

10. The method of claim 9, wherein each client of said plurality of clients is communicatively coupled to at least one cloud of said set of designated clouds.

11. A network for secure sharing of software applications among a plurality of clients, comprising:
at least one server configured to provide a cloud hosting a collaboration software module; and at least one data connection to a software provider configured to maintain a library of user-defined functions (UDFs) and configured to:
receive a request to perform a task from a first client;
after accessing the library, identify a set of UDFs applicable to the task, based on an intended result of the task;
embed an encryption key into the set of UDFs to produce a set of secure UDFs; and
send the secure UDFs and a first identifier of the first client to the cloud;
the collaboration software module being configured to cause a processor of the cloud to:
store, on the cloud, a cloud's known identifier of the first client prior to provision of the first identifier of the first client to the cloud system, and determine, upon receipt of the first identifier of the first client on the cloud system, that the first identifier matches the cloud's known identifier of the first client;
apply the set of UDFs to raw data of said first client placed in said cloud to produce requisite information subject to a determination that the first identifier matches the cloud's known identifier of the first client;
place the requisite information in a memory space of the cloud; and
permit the first client to access the requisite information based on the first identifier.

12. The network of claim 11 wherein the collaboration software module is further configured to cause the processor to:
receive, from said first client, a second identifier of a second client in the plurality of clients;
determine that the second identifier matches a cloud's known identifier of the second client; and
based on the determination that the second identifier matches the cloud's known identifier of the second client, permit the second client to access the requisite information.

13. The network of claim 11 wherein the collaboration software module is further configured to cause the processor to:
receive from said first client a second identifier of a second client, of the plurality of clients;
receive from said second client said encryption key;
permit the second client to access the requisite information based on the encryption key and a match of the second identifier to a cloud's known identifier of the second client.

14. The network of claim 11 further comprising:
a security-control data structure of task permissions placed in a memory space of the cloud, each task permission being a tuple having a form {request index, grantor identifier, grantee identifier, permission list}, wherein:
said grantor is any client of said cloud;
said grantee is any other client of said cloud;
said grantor assigns said request index; and
said permission list specifies at least one permissible action.

15. The network of claim 14 wherein said request index is a recycled integer within a specified range.

16. The network of claim 14 wherein said permission list comprises:
UDF activation;
UDF copying;
access to raw data;
modification of raw data;
access to result;
insertion of new data; and
task expiry.

17. The network of claim 14 wherein the collaboration software module is further configured to:
receive from any client of the plurality of clients a specific task permission naming any other client, of the plurality of clients, as a grantee; and
apply a proprietary set of UDFs of said any client, placed into the cloud, to proprietary data of said any other client without exposing the specific set of UDFs to said any other client.

18. The network of claim 14 wherein the collaboration software module is further configured to receive from any client of the plurality of clients a specific data file and a specific task permission naming any other client, of the plurality of clients, as a grantee with a permission list to:
apply said set of UDFs to said data file as well as proprietary data of said any other client, placed into the cloud, to produce a respective result; and
permit said any other client to access said respective result.

19. A network for secure sharing of software applications among a plurality of clients, comprising:
a plurality of servers configured to provide a plurality of clouds each hosting a collaboration software module; and
a plurality of data connections to a plurality of software providers, each software provider maintaining a respective library of user-defined functions (UDFs) and configured to:
receive from a specific client, of the plurality of clients, a request to perform a task and an identifier of a specific cloud, of said plurality of clouds, for placing a result of said task;
after accessing the respective library of at least one software provider, identify a set of UDFs applicable to the task, based on an intended result of the task; and
send the UDFs and an identifier of the specific client to the specific cloud;
the collaboration software module of said specific cloud being configured to cause a processor to:
store, on said specific cloud, an identifier of the specific client known to the specific cloud prior to provision of the identifier of the specific client to the cloud system, and determine, upon receipt of the identifier of the specific client on the cloud system, that the identifier matches the identifier of the specific client known to the specific cloud;
apply the set of UDFs to raw data of the specific client placed in said specific cloud to produce requisite information subject to a determination that the identifier matches the identifier of the specific client known to the specific cloud;
place the requisite information in a memory space of the specific cloud; and
permit the specific client to access the requisite information based on said identifier.

20. The network of claim 19 wherein the collaboration software module of said specific cloud is further configured to cause said processor to:
receive, from the specific client, a set of permissions, and store the set of permissions in connection with the specific client;
receive one or more requests for access to said requisite information from clients other than the specific client;

determine, based on the permissions associated with the specific client, that the clients associated with the one or more requests are authorized to access the requisite information;

provide access to the requisite information based on the set of permissions received from the specific client.

\* \* \* \* \*